US011920799B2

(12) United States Patent
Xu et al.

(10) Patent No.: US 11,920,799 B2
(45) Date of Patent: Mar. 5, 2024

(54) CLOSED COOKING CAVITY, CLOSED COOKING SYSTEM AND COOKING MACHINE

(71) Applicant: SHANGHAI AICAN ROBOT (GROUP) CO., LTD., Shanghai (CN)

(72) Inventors: Jinbiao Xu, Shanghai (CN); Guang He, Shanghai (CN); Qing He, Shanghai (CN); Luoya Zeng, Shanghai (CN)

(73) Assignee: SHANGHAI AICAN ROBOT (GROUP) CO., LTD., Shanghai (CN)

(*) Notice: Subject to any disclaimer, the term of this patent is extended or adjusted under 35 U.S.C. 154(b) by 743 days.

(21) Appl. No.: 16/862,635

(22) Filed: Apr. 30, 2020

(65) Prior Publication Data

US 2020/0271327 A1 Aug. 27, 2020

Related U.S. Application Data

(63) Continuation of application No. PCT/CN2018/113945, filed on Nov. 5, 2018.

(30) Foreign Application Priority Data

Nov. 3, 2017 (CN) ......................... 201711081136.X
Nov. 3, 2017 (CN) ......................... 201711081145.9
(Continued)

(51) Int. Cl.
*F24C 15/20* (2006.01)
*A47J 36/32* (2006.01)
(Continued)

(52) U.S. Cl.
CPC ........... *F24C 15/2007* (2013.01); *A47J 36/32* (2013.01); *A47J 36/34* (2013.01); *A47J 36/38* (2013.01);
(Continued)

(58) Field of Classification Search
CPC .. A47J 36/06; A47J 36/12; A47J 36/08; A47J 36/34; A47J 36/38; A47J 37/101;
(Continued)

(56) References Cited

U.S. PATENT DOCUMENTS

2005/0051038 A1* 3/2005 Bartelick .............. F24C 15/327 99/482
2005/0193901 A1* 9/2005 Buehler .................... A23L 5/10 99/468
(Continued)

FOREIGN PATENT DOCUMENTS

CN 1552265 A 12/2004
CN 101238954 A 8/2008
(Continued)

OTHER PUBLICATIONS

International Search Report of PCT Patent Application No. PCT/CN2018/113945 dated Jan. 30, 2019.

*Primary Examiner* — Tu B Hoang
*Assistant Examiner* — Bonita Khlok

(57) ABSTRACT

Provided is a closed cooking cavity (100) formed by means of a shell in a sealed manner; a working space for accommodating main cooking equipment is formed in an interior of the cooking cavity (100), the shell is provided with communicating openings which are corresponding to the main cooking equipment and adapted for communicating the interior and exterior of the cooking cavity (100), and accessory cooking equipment arranged at the exterior of the cooking cavity (100) is connected with corresponding main cooking equipment arranged in the interior of the cooking cavity through corresponding communicating openings so as to achieve corresponding cooking functions. A closed cooking system comprises the cooking cavity (100) and a cooking machine comprises the closed cooking system.

7 Claims, 49 Drawing Sheets

(30) Foreign Application Priority Data

Nov. 3, 2017 (CN) ......................... 201711081493.6
Nov. 3, 2017 (CN) ......................... 201711081495.5
Nov. 3, 2017 (CN) ......................... 201711083522.2
Nov. 3, 2017 (CN) ......................... 201721459045.0

(51) Int. Cl.

| | |
|---|---|
| ***A47J 36/34*** | (2006.01) |
| ***A47J 36/38*** | (2006.01) |
| ***A47J 37/10*** | (2006.01) |
| ***A47J 44/00*** | (2006.01) |
| ***H05B 6/12*** | (2006.01) |
| *A47J 37/12* | (2006.01) |
| *F24C 14/00* | (2006.01) |

(52) U.S. Cl.
CPC ............. *A47J 37/101* (2013.01); *A47J 44/00* (2013.01); *H05B 6/1227* (2013.01); *A47J 37/105* (2013.01); *A47J 37/1228* (2013.01); *F24C 14/005* (2013.01)

(58) Field of Classification Search
CPC .. A47J 37/105; A47J 37/1228; A47J 37/1261; A47J 37/1257; A47J 37/1271; A47J 37/128; A47J 37/1285; A47J 37/129; A47J 44/00; A47J 44/02; A47J 37/1295; F24C 14/005; F24C 15/2007; F24C 15/20; F24C 15/2035; F24C 15/001; F24C 15/002; F24C 15/006; F24C 15/32; F24C 15/322; H05B 6/1227
USPC ........................... 99/325, 467–469, 471–481
See application file for complete search history.

(56) References Cited

U.S. PATENT DOCUMENTS

| | | | | |
|---|---|---|---|---|
| 2012/0272947 A1* | 11/2012 | Phillips | F24C 15/2007 | 126/21 R |
| 2015/0059595 A1* | 3/2015 | Rand | F24C 15/2035 | 219/401 |
| 2016/0106259 A1* | 4/2016 | Xu | G07F 9/105 | 700/275 |
| 2018/0289216 A1* | 10/2018 | Casey | A47J 37/1214 | |

FOREIGN PATENT DOCUMENTS

| | | | |
|---|---|---|---|
| CN | 201348300 | Y | 11/2009 |
| CN | 101718448 | A | 6/2010 |
| CN | 103126515 | A | 6/2013 |
| CN | 103284583 | A | 9/2013 |
| CN | 203168901 | U | 9/2013 |
| CN | 203302842 | U | 11/2013 |
| CN | 203576262 | U | 5/2014 |
| CN | 105433759 | A | 3/2016 |
| CN | 105662107 | A | 6/2016 |
| CN | 105686016 | A | 6/2016 |
| CN | 105942136 | A | 9/2016 |
| CN | 205548288 | U | 9/2016 |
| CN | 106166026 | A | 11/2016 |
| CN | 106618161 | A | 5/2017 |
| CN | 206152542 | U | 5/2017 |

* cited by examiner

CLOSED COOKING CAVITY, CLOSED COOKING SYSTEM AND COOKING MACHINE

CROSS REFERENCE TO RELATED APPLICATIONS

The present application is a Continuation Application of PCT Application No. PCT/CN2018/113945 filed on Nov. 5, 2018, which claims the benefit of Chinese Patent Application Nos. 201711081145.9, 201711081495.5, 201711083522.2, 201711081493.6, 201721459045.0 and 201711081136.X filed on Nov. 3, 2017. All the above are hereby incorporated by reference.

FIELD OF THE INVENTION

The present invention relates to the technical field of intelligent manufacturing and intelligent service, in particular to a closed cooking cavity, a closed cooking system and a cooking machine for achieving full-closed cooking.

BACKGROUND OF THE INVENTION

Chinese culinary art is extensive and profound and has a variety of cooking techniques, which mainly comprise: stir frying, stewing, deep frying, boiling, steaming, pan frying, grilling, etc. The essence of various cooking techniques is to cook ever-changing dishes with various tastes and flavors by changing food match and controlling heating. Up to now, cooking process involves a lot of manual labor and relies very much on the cooker's experience and skills. Nowadays, an intelligent cooking machine appears, and the cooking machine can automatically complete the cooking process as long as a user puts food ingredients into the cooking machine, so that the user can enjoy delicious food very conveniently. An existing cooking machine generally comprises an ingredient feeding device adapted for containing and putting food ingredients, a wok, a wok rotating mechanism, a wok heating device, a seasoning adding device, a control device and the like, and the working principle of the existing cooking machine is that: the food ingredients are placed in the ingredient feeding device, when the cooking machine starts a cooking procedure, the control device controls the ingredient feeding device to throw the food ingredients in the ingredient feeding device into the wok, at the moment, the control device controls the wok heating device to heat the wok, the control device further controls the wok rotating mechanism to rotate the wok, and in the cooking process, the control device further controls the seasoning adding device to add seasoning into the wok; after a preset cooking procedure is completed, the cooking process can be completed.

However, when the invention is implemented, the inventor finds that the internal working space of existing intelligent cooking machine is a high-temperature, high-humidity and high-acidity-alkalinity environment, the structure and electrical components which are matched with the operation of the internal working space are difficult to work effectively and durably under such an environment, and the internal working space of the cooking machine has problems of insufficient food safety, sanitation and environmental protection.

SUMMARY OF THE INVENTION

The embodiment of the present invention aims to provide a closed cooking cavity, a closed cooking system and a cooking machine for achieving full-closed cooking, which can effectively solve the problems of insufficient food safety, sanitation and environmental protection of internal cooking equipment of an existing cooking machine.

In order to achieve the above goal, an embodiment of the present invention provides a closed cooking cavity, the cooking cavity is formed by means of a shell in a sealed manner, a working space for accommodating main cooking equipment is formed in an interior of the cooking cavity, the shell is provided with communicating openings which are corresponding to the main cooking equipment and adapted for communicating the interior and exterior of the cooking cavity, and accessory cooking equipment arranged at the exterior of the cooking cavity is connected with corresponding main cooking equipment arranged in the interior of the cooking cavity through corresponding communicating openings so as to achieve corresponding cooking functions.

Therefore, according to the closed cooking cavity provided by the embodiment of the present invention, the cooking cavity arranged in the sealed manner is constructed to serve as a sealed cooking working space by means of a hollow shell, main cooking equipment is arranged in a closed cooking space in the cooking cavity, accessory cooking equipment is arranged outside the cooking cavity, and communicating openings communicating the interior and the exterior of the cooking cavity are formed in the position, corresponding to the main cooking equipment, of the shell; accessory cooking equipment arranged outside the cooking cavity is connected with main cooking equipment arranged inside the cooking cavity through the corresponding communicating openings so as to achieve the corresponding cooking functions, so that the safety and sanitation of main cooking equipment which is in direct contact with food in the cooking cavity can be guaranteed, and the working space related to food safety, sanitation and environmental protection is guaranteed.

Preferably, each of the communication openings is provided with a sealing element to seal the cooking cavity.

Preferably, the main cooking equipment comprises an ingredient feeding device, a wok device and a dish discharging device; a feeding area, a cooking area and a dish discharging area are formed in the interior of the cooking cavity; and the ingredient feeding device, the wok device and the dish discharging device which are respectively arranged in the feeding area, the cooking area and the dish discharging area are arranged in a matched manner to complete feeding, cooking and dish discharging processes.

In order to achieve the above goal, an embodiment of the present invention provides a closed cooking system, the closed cooking system comprises the cooking cavity of any embodiment; the closed cooking system further comprises an ingredient feeding and cooking system, a cooking fume treatment system and a flushing system which are constructed by taking the cooking cavity as a core in a combined manner, the ingredient feeding and cooking system, the cooking fume treatment system and the flushing system are each mainly formed by connecting main cooking equipment arranged in an interior of the cooking cavity and accessory cooking equipment arranged at an exterior of the cooking cavity; the shell is provided with communicating openings which are corresponding to the main cooking equipment and adapted for communicating the interior and the exterior of the cooking cavity, and the accessory cooking equipment arranged at the exterior of the cooking cavity is connected with corresponding main cooking equipment arranged in the interior of the cooking cavity through corresponding communicating openings so as to achieve corresponding ingredient feeding and cooking function, cooking fume treatment function or flushing function.

Preferably, the closed cooking system further comprises a seasoning adding system, the seasoning adding system is mainly formed by connecting the main cooking equipment arranged in the interior of the cooking cavity and the accessory cooking equipment arranged at the exterior of the cooking cavity, and the accessory cooking equipment arranged at the exterior of the cooking cavity is connected with corresponding main cooking equipment arranged in the interior of the cooking cavity through corresponding communicating openings so as to achieve seasoning adding function.

Therefore, according to the closed cooking system provided by the embodiment of the present invention, the cooking cavity arranged in the sealed manner is constructed to serve as a sealed cooking working space by means of a hollow shell, the ingredient feeding and cooking system, the cooking fume treatment system, the seasoning adding system and the flushing system which are combined into a whole are constructed by taking the cooking cavity as a core; according to each system, main cooking equipment is arranged in a closed cooking space in the cooking cavity, accessory cooking equipment is arranged outside the cooking cavity, and communicating openings communicating the interior and the exterior of the cooking cavity are formed in the position, corresponding to the main cooking equipment, of the shell; accessory cooking equipment arranged outside the cooking cavity is connected with main cooking equipment arranged inside the cooking cavity through the corresponding communicating openings so as to achieve the corresponding discharging cooking function, the cooking fume treatment function and the seasoning adding or flushing function. Therefore, the safety and sanitation of main cooking equipment which is in direct contact with food in the cooking cavity can be guaranteed, and the working space related to food safety, sanitation and environmental protection is guaranteed.

Preferably, the ingredient feeding cooking system comprises a wok device and an ingredient feeding device both arranged in the interior of the cooking cavity, a cooking area for accommodating the wok device is arranged in a middle portion of the interior of the cooking cavity, and a feeding area for accommodating the ingredient feeding device is arranged at an upper portion of the interior of the cooking cavity and positioned above the cooking area; wherein the wok device comprises a wok, a furnace body device adapted for bearing and heating the wok, and a wok rotating device adapted for controlling the wok to rotate; a side portion of the shell forming the cooking cavity is provided with an ingredient container guiding opening corresponding to the feeding area, the ingredient feeding device guides in food materials through the ingredient container guiding opening and feeds the food materials into the wok, the furnace body device heats the wok and the wok rotating device rotates the wok, thereby achieving cooking processing of the food materials in the wok.

Preferably, the ingredient feeding device comprises an ingredient-dropping chamber for containing the food materials and at least one compartment door driving mechanism; a bottom wall of the ingredient-dropping chamber is provided with at least one ingredient-dropping opening aligned with an opening of the wok in ingredient feeding process, each ingredient-dropping opening is provided with a compartment door, and each compartment door driving mechanism is adapted for driving corresponding compartment door to be opened and closed;

a side face of the ingredient-dropping chamber is provided with an ingredient-receiving opening for an ingredient container to go in and out, and the ingredient container guiding opening is correspondingly arranged with the ingredient-receiving opening; a door plate capable of being opened and closed is arranged on the outer side of the ingredient container guiding opening, and a sealing strip is arranged at the juncture of the door plate and the shell.

Preferably, the ingredient feeding device further comprises a flipping mechanism, and the flipping mechanism is adapted for turning the ingredient feeding device as a whole up and down; when the ingredient feeding device guides in the food materials, each ingredient-dropping opening faces the direction opposite to the opening of the wok, and the ingredient-receiving opening is aligned with the ingredient container guiding opening; after the ingredient feeding device guides in the food materials, the ingredient feeding device is overturned by the flipping mechanism, so that each ingredient-dropping opening faces the opening of the wok to achieve feeding;

two side walls of the shell forming the cooking cavity are respectively provided with installing holes for installing the ingredient feeding device in the feeding area, and a sealing ring is arranged at a juncture of the ingredient feeding device and each of the installing holes; the accessory cooking equipment comprises an ingredient feeding device working position conversion motor or/and an ingredient feeding device working position detection device, and the ingredient feeding device working position conversion motor or/and the ingredient feeding device working position detection device is/are installed in a matched manner with the ingredient feeding device arranged in the cooking cavity via the installing holes, respectively.

Preferably, the wok device further comprises a wok working position controlling device for driving the wok to turn; before the ingredient feeding device feeds the food materials into the wok, the wok working position controlling device drives the wok to turn until an opening of the wok faces the ingredient feeding device;

two side walls of the shell are respectively provided with installing grooves for installing the wok device in the cooking area, and a sealing ring is arranged at a juncture of the wok device and each of the installing grooves; the accessory cooking equipment comprises a wok working position conversion motor or/and a wok working position detection device arranged outside the cooking cavity, and the wok working position conversion motor or/and the wok working position detection device is/are connected with the wok device via the installing grooves, respectively.

Preferably, the wok device further comprises a wok lid for closing or opening the wok; after the ingredient feeding device guides in food materials and feeds the food materials into the wok, the wok working position controlling device drives the wok to turn until the opening of the wok faces the wok lid so as to close the wok, then the furnace body device heats the wok and the wok rotating device rotates the wok, thereby achieving cooking processing of the food materials in the wok; after the wok lid closes the wok, the wok lid rotates along with the wok when the wok rotates.

Preferably, the accessory cooking equipment comprises a wok lid driving device arranged at the exterior of the cooking cavity and adapted for controlling the wok lid to move up and down in the interior of the cooking cavity, and the wok lid is moved directionally towards or away from the opening of the wok by the wok lid driving device so as to close or open the wok;

an opening is formed in a side portion of the shell, the wok lid driving device is connected with the wok lid via the opening to drive the wok lid, and a juncture of the wok lid driving device and the opening in is provided with sealing member.

Preferably, the accessory cooking equipment comprises a wok moving control device arranged outside the cooking cavity and adapted for driving the wok to move up and down inside the cooking area; the wok lid is fixed in the cooking cavity by a wok lid fixing device, and the opening of the wok is moved directionally towards or away from the wok lid by the wok moving control device so as to realize the closing or opening of the wok;

each of the installing grooves further serves as a wok moving installing groove for a connecting shaft of a wok moving control device, and the wok moving installing groove limits the movement range of the wok.

Preferably, a front side wall of the shell is provided with an observation opening corresponding to the cooking area, the observation opening is provided with a door plate capable of being opened and closed at the outer side, and a sealing strip is arranged at a juncture of the door plate and the shell.

Preferably, the ingredient feeding cooking system further comprises a dish discharging device, and a dish discharging area for accommodating the dish discharging device is arranged below the cooking area in the cooking cavity; after the cooking processing of the food materials in the wok is achieved, the wok is driven by the wok working position controlling device to turn until the opening of the wok faces a dish plate on the dish discharging area so as to achieve dish discharging;

a front side wall of the shell is provided with a dish discharging outlet corresponding to the dish discharging area, the dish discharging outlet is provided with a door plate capable of being opened and closed at the outer side, and a juncture of the door plate and the shell is provided with a sealing strip.

Preferably, the feeding area, the cooking area and the dish discharging area are sequentially communicated; the ingredient feeding device, the wok device and the dish discharging device which are respectively arranged in the feeding area, the cooking area and the dish discharging area are arranged in a matched manner to complete feeding, cooking and dish discharging processes. the wok device further comprises a wok working position controlling device for driving the wok to turn; before the ingredient feeding device feeds the food materials into the wok, the wok working position controlling device drives the wok to turn until an opening of the wok faces the ingredient feeding device.

Therefore, according to the ingredient feeding and cooking system in the closed cooking system provided by the embodiment of the invention, the cooking cavity which is arranged in the sealed manner is used as the closed cooking working space, and the ingredient feeding device and the wok device which are in direct contact with the food are arranged in the closed cooking space in the cooking cavity; and accessory cooking equipment for assisting the ingredient feeding device and the wok device to realize the ingredient feeding and cooking function is arranged outside the cooking cavity, so that the safety and sanitation of main cooking equipment which is in direct contact with food in the cooking cavity can be ensured, and the working space related to food safety, sanitation and environmental protection is ensured.

Preferably, the cooking fume treatment system comprises the wok device arranged in the interior of the cooking cavity and a cooking fume treatment device arranged at the exterior of the cooking cavity, a side wall of the shell is provided with a first exhaust port for connecting the cooking fume treatment device, and cooking fume generated by the wok device in the cooking process is gathered in the cooking cavity and exhausted to the cooking fume treatment device from the first exhaust port to be treated.

Preferably, the wok device further comprises a wok lid for closing or opening the wok; the wok lid is provided with a smoke outlet corresponding to the first exhaust port; the smoke outlet is communicated with a cooking fume inlet of the cooking fume treatment device via a cooking fume pipeline; the cooking fume generated in the cooking process with the wok being closed is discharged to the cooking fume treatment device from the smoke outlet to be treated; cooking fume escaping into the cooking cavity is exhausted to the cooking fume treatment device from the smoke outlet to be treated when the wok is opened.

Preferably, a side wall or bottom wall of the shell is provided with an exhaust gas return port communicated with a cooking fume outlet of the cooking fume treatment device, and cooking fume exhausted after being treated by the cooking fume treatment device enters the cooking cavity from the exhaust gas return port to be subjected to circulating cooking fume treatment so as to achieve zero emission of the cooking fume.

Preferably, a side wall of the shell is further provided with a second exhaust port communicated with the cooking fume treatment device; the cooking fume escaping into the cooking cavity and the cooking fume entering the cooking cavity from the exhaust gas return port are exhausted to the cooking fume treatment device from the second exhaust port to be treated.

Preferably, the cooking fume treatment device comprises a first cooking fume treatment device and a second cooking fume treatment device, a cooking fume inlet of the first cooking fume treatment device is communicated with the first exhaust port, a cooking fume outlet of the first cooking fume treatment device is communicated with a cooking fume inlet of the second cooking fume treatment device through a cooking fume pipeline, and a cooking fume outlet of the second cooking fume treatment device is communicated with the exhaust gas return port.

Preferably, the cooking fume inlet of the first cooking fume treatment device is further in communication with the second exhaust port.

Therefore, according to the cooking fume treatment system in the closed cooking system provided by the embodiment of the invention, the cooking fume generated by the cooking fume generated in the cooking process of the cooking equipment is gathered in the cooking cavity so as to avoid environmental pollution caused by no cooking fume treatment and discharge, and in addition, the cooking fume treated by the cooking fume is returned to the interior of the cooking cavity for circulating cooking fume treatment so as to realize zero discharge of the cooking fume; therefore, the pollution of the cooking fume to the environment can be really avoided.

Preferably, the flushing system comprises a spraying piece arranged in the cooking cavity and adapted for flushing the ingredient feeding device and the wok device in the cooking cavity, and an opening adapted for being connected with a water outlet is formed in a bottom portion of the cooking cavity so as to drain water generated after spraying piece flush the ingredient feeding device and the wok device; the flushing system comprises further comprises a spraying water pipe and a spraying head switch, the spraying piece is connected to an external water source via the spraying water pipe, and the spraying head switch is adapted for controlling the opening and closing of the spraying piece.

Preferably, the spraying piece comprises an ingredient feeding device spraying piece arranged at a top portion of the cooking cavity and faces the ingredient feeding device, and the ingredient feeding device is directly flushed by the ingredient feeding device spraying piece.

Preferably, when the ingredient feeding device is flushed by the ingredient feeding device spraying piece, an opening of the wok is driven to face the ingredient feeding device spraying piece and the ingredient feeding device, water sprayed by the ingredient feeding device spraying piece enters and flushes an interior of the ingredient feeding device from an opening at a top portion of the ingredient feeding device, and then flows out from an opening at a bottom portion of the ingredient feeding device and falls into the wok from the opening of the wok, and therefore an interior of the wok is indirectly flushed.

Preferably, the spraying piece comprises a wok spraying piece arranged at a side portion or a bottom portion of the cooking cavity, and an interior of the wok is directly flushed by the wok spraying piece when the wok is driven to turn until the opening of the wok faces the wok spraying piece.

Preferably, the wok is driven by the wok rotating device to rotate around the central axis of the wok to be matched with flushing in the process of flushing the interior of the wok by the wok spraying piece.

Preferably, after the interior of the wok is flushed by the wok spraying piece, the wok is driven to turn to a position where the opening of the wok faces an opening at a bottom portion of the cooking cavity, so that flushed water falls into the opening at the bottom portion of the cooking cavity to be drained.

Preferably, the opening at the bottom portion of the cooking cavity is connected with the water outlet via a water draining device, and the opening at the bottom portion of the cooking cavity is in sealed connection with the water draining device.

Preferably, a draining guiding cavity is formed in the bottom of the cooking cavity, and an outlet of the draining guiding cavity is provided as the opening at the bottom portion of the cooking cavity to be connected with the water outlet.

Preferably, an outlet of the draining guiding cavity is connected with the water outlet via a garbage processor, and the outlet of the draining guide cavity is in sealed connection with an inlet of the garbage processor.

Preferably, when the wok spraying piece is fixed to a side portion of the cooking cavity, the wok spraying piece is disposed above and proximate to the opening at the bottom portion of the cooking cavity.

Preferably, the bottom portion of the cooking cavity is provided with a dish discharging area drain outlet for discharging sewage falling into the dish discharging area; or, the bottom portion of the cooking cavity is provided with a dish discharging tray and a flushing piece, the flushing piece is arranged at one end of a top face of the dish discharging tray, the top face of the dish discharging tray gradually inclines downwards from the one end to the other end, and the other end of the top face of the dish discharging tray is connected with the opening at the bottom portion of the cooking cavity.

Therefore, according to the flushing system in the closed cooking system provided by the embodiment of the invention, an spraying piece capable of washing the cooking equipment is arranged in the cooking cavity; an opening used for being connected with a water outlet is formed in the bottom of the cooking cavity so as to discharge water generated after the spraying piece washes the cooking equipment. The cooking equipment in the cooking cavity is washed by the spraying piece, washing is more comprehensive, the efficiency is higher, the washing effect is better, and the cleanness and sanitation of the working space in the cooking cavity can be effectively kept. In addition, under the airtight protection effect of the cooking cavity arranged in the sealed manner, water sprayed out by the spraying piece and water for washing the cooking equipment can be limited in the sealed cooking cavity, and the problems that the water splashes out of the cooking cavity to influence the cooking function inside the sealed cooking cavity are solved.

Preferably, the seasoning adding system comprises a seasoning adding device arranged at the exterior the cooking cavity, the seasoning adding device comprises seasoning bottles adapted for containing liquid seasonings, each of the seasoning bottles is communicated with the wok device via a seasoning pipe, and a seasoning pump is arranged at the seasoning pipe.

Preferably, the seasoning adding device further comprises a seasoning rack for accommodating the seasoning bottles, and the seasoning rack is arranged below the shell.

Preferably, each of the seasoning bottles is communicated with a seasoning adding channel arranged at a wok lid via the seasoning pipe.

Preferably, each of the seasoning bottles is communicated with a smoke outlet formed in a wok lid and a first exhaust port which is formed in the shell and corresponds to the smoke outlet via the seasoning pipe, and the seasoning adding device is adapted for adding seasonings in a cooking process with the wok closed.

Therefore, according to the seasoning adding system in the closed cooking system provided by the embodiment of the invention, on the basis of the sealed cooking cavity constructed by the shell, the seasoning adding device is arranged outside the cooking cavity, the seasoning adding device comprises the seasoning bottles filled with the liquid seasoning, each seasoning bottle is connected with the wok device arranged inside the cooking cavity via the seasoning pipe and the seasoning pump, and therefore, seasonings can be added into the wok device at any time in the cooking process so as to complete the cooking processing of food.

The embodiment of the present invention correspondingly provides a cooking machine for achieving full-closed cooing, and the cooking machine comprises the closed cooking system in any embodiment.

According to the cooking machine provided by the embodiment of the present invention, the closed cooking system is arranged, the cooking cavity arranged in the sealed manner is constructed to serve as a sealed cooking working space by means of a hollow shell, the ingredient feeding and cooking system, the cooking fume treatment system, the seasoning adding system and the flushing system which are combined into a whole are constructed by taking the cooking cavity as a core; according to each system; main cooking equipment is arranged in a closed cooking space in the cooking cavity, accessory cooking equipment is arranged outside the cooking cavity, and communicating openings communicating the interior and the exterior of the cooking cavity are formed in the position, corresponding to the main cooking equipment, of the shell; accessory cooking equipment arranged outside the cooking cavity is connected with main cooking equipment arranged inside the cooking cavity through the corresponding communicating openings so as to achieve the corresponding discharging cooking function, the cooking fume treatment function and the seasoning adding or flushing function. Therefore, the safety and sanitation of main cooking equipment which is in direct contact with food in the cooking cavity can be guaranteed, and the working space related to food safety, sanitation and environmental protection is guaranteed.

Preferably, the cooking machine further comprises an outer shell and an inner shell arranged inside the outer shell, and the cooking cavity is formed inside the inner shell.

Preferably, the main cooking equipment is arranged in the interior of the sealed cooking cavity, and the accessory cooking equipment for assisting the main cooking device in achieving corresponding functions is arranged at the exterior of the cooking cavity and positioned in a region formed between the outer shell and the inner shell.

Preferably, the accessory cooking equipment comprises a cooking fume treatment device, the cooking fume treatment device is located at an upper portion of the rear wall of the inner shell.

Preferably, the accessory cooking equipment comprises a seasoning adding device, the seasoning adding device is arranged below the inner shell and far away from an opening at the bottom portion of the cooking cavity.

Preferably, the accessory cooking equipment device comprises a garbage processor, the garbage processor is disposed below the inner shell and in sealed connection with an opening at the bottom portion of the cooking cavity.

Preferably, the accessory cooking equipment device further comprises an electric member, a circuit member, a power supply, a transmission line and a pipeline component.

Preferably, the cooking machine further comprises a left rack and a right rack, and the left rack and the right rack are connected with the inner shell to fix the inner shell inside the outer shell.

Preferably, the tops of the two side walls of the inner shell are each provided with a connecting upper edge opening, and the tops of the left rack and the right rack are each provided with a first connecting hole position correspondingly connected with the connecting upper edge opening; the two side parts of the front side wall of the inner shell are each provided a connecting front edge opening, and the side portions of the left rack and the right rack are each provided with a second connecting hole position correspondingly connected with the connecting front edge opening.

Preferably, the outer shell comprises a bottom plate, a left side plate, a right side plate and a rear plate which are fixedly connected with the left rack and the right rack; the outer shell further comprises a middle door plate adapted for opening/closing an ingredient container guiding opening and a dish discharging outlet of the inner shell, a top cover door plate adapted for opening/closing a top cover opening of the inner shell, and a seasoning bin door plate adapted for opening/closing a seasoning area which is formed between the inner shell and the bottom plate and adapted for containing a seasoning adding device.

Preferably, the middle door plate and the seasoning bin door plate are integrally formed.

Preferably, the left and right racks are each provided with an ingredient feeding device installation position and a wok device installation position; the ingredient feeding device installation position is corresponding to ingredient feeding mechanism installation hole which is formed in the inner shell and used for installing the ingredient feeding device in the feeding area, and the wok device installation position is corresponding to installation groove which is formed in the inner shell and used for installing the wok device in the cooking area.

Preferably, the accessory cooking equipment device further comprises a wok moving control device, and the wok moving control device is arranged on at least one of the wok device installation positions of the left and right racks.

Therefore, according to the cooking machine for achieving full-closed cooking provided by the embodiment of the present invention, all the functional components are combined into a whole with the sealed cooking cavity as the core, and main cooking equipment, such as the ingredient feeding device, the furnace body device and the wok lid device, making direct contact with food materials is arranged in the closed space of the cooking cavity; and the spraying piece is arranged in the cooking cavity to flush the cooking equipment, so that water and smoke are blocked in the sealed cooking cavity, the flushed water is discharged in a unified manner after being treated, and environmental pollution caused by cooking fume discharge is avoided. In addition, accessory cooking equipment (including an electric appliance, a circuit, a power supply, a transmission line, a pipeline part and the like which are arranged in a matched manner with the main cooking equipment to work) for assisting the main cooking equipment in realizing a cooking function is arranged outside the cooking cavity and is an area formed between the outer shell and the inner shell of the cooking machine; therefore, the working space, related to food safety, sanitation and environmental protection, in the cooking machine can be guaranteed.

DETAILED DESCRIPTION OF ILLUSTRATED EMBODIMENTS

Figure 1:
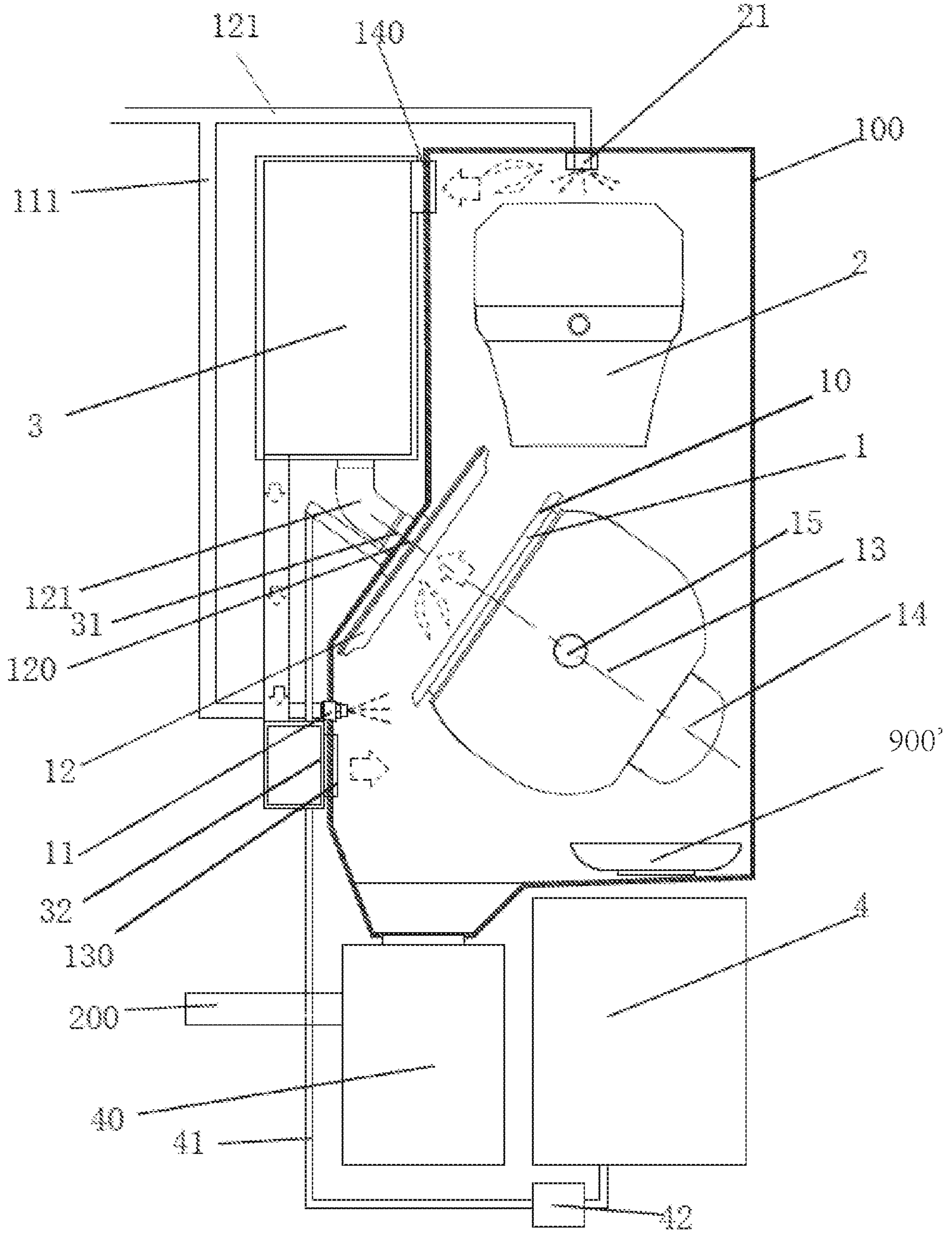
FIG. 1 is a block diagram of a structural assembly of a closed cooking system according to an embodiment of the present invention.

Technical solutions in embodiments of the present invention will be described clearly and fully hereinafter in conjunction with the accompanying drawings in embodiments of the present invention, and obviously, the described embodiments are only a part of, and not all, embodiments of the present invention. Based on the embodiments of the present invention, all other embodiments obtained by one of ordinary skill in the art without creative work fall within the scope of the present invention.

With reference to FIGS. 1, 2*a*-2*c*, the embodiment of the present invention provides a closed cooking system, a cooking cavity 100 is formed by using a shell, a working space for accommodating main cooking equipment is formed in the cooking cavity 100, the shell is provided with communicating openings which are corresponding to the main cooking equipment and adapted for communicating the interior and the exterior of the cooking cavity 100, and the accessory cooking equipment arranged at the exterior of the cooking cavity is connected with corresponding main cooking equipment arranged in the interior of the cooking cavity 100 through corresponding communicating openings so as to achieve corresponding cooking functions. Each of the communication openings is provided with a sealing element to seal the cooking cavity 100.

According to the closed cooking system provided by the embodiment of the invention, the ingredient feeding and cooking system, the cooking fume treatment system, the seasoning adding system and the flushing system are constructed by taking the cooking cavity as a core in a combined manner; the ingredient feeding and cooking system, the cooking fume treatment system, the seasoning adding system and the flushing system are each mainly formed by connecting main cooking equipment arranged in an interior of the cooking cavity and accessory cooking equipment arranged at an exterior of the cooking cavity; the shell is provided with communicating openings which are corresponding to the main cooking equipment and adapted for communicating the interior and the exterior of the cooking cavity, and the accessory cooking equipment arranged at the exterior of the cooking cavity is connected with corresponding main cooking equipment arranged in the interior of the cooking cavity through corresponding communicating openings so as to achieve corresponding ingredient feeding and cooking function, cooking fume treatment function, seasoning adding function or flushing function.

It can be understood that when the closed cooking system provided by the embodiment of the present invention is applied to a specific implementation environment (such as a cooking machine), all the functional components are combined into a whole by taking the sealed cooking cavity as a core; main cooking equipment, such as the ingredient feeding device, the furnace body device and the wok lid device, making direct contact with food materials is arranged in the closed space of the cooking cavity; and the spraying piece is arranged in the cooking cavity to flush the cooking equipment, so that water and smoke are blocked in the sealed cooking cavity, the flushed water is discharged in a unified manner after being treated, and environmental pollution caused by cooking fume discharge is avoided. In addition, accessory cooking equipment (including an electric appliance, a circuit, a power supply, a transmission line, a pipeline part and the like which are arranged in a matched manner with the main cooking equipment to work) for assisting the main cooking equipment in realizing a cooking function is arranged outside the cooking cavity and is an area formed between the outer shell and the inner shell of the cooking machine; therefore, the working space, related to food safety, sanitation and environmental protection, in the cooking machine can be guaranteed.

Figure 2A:
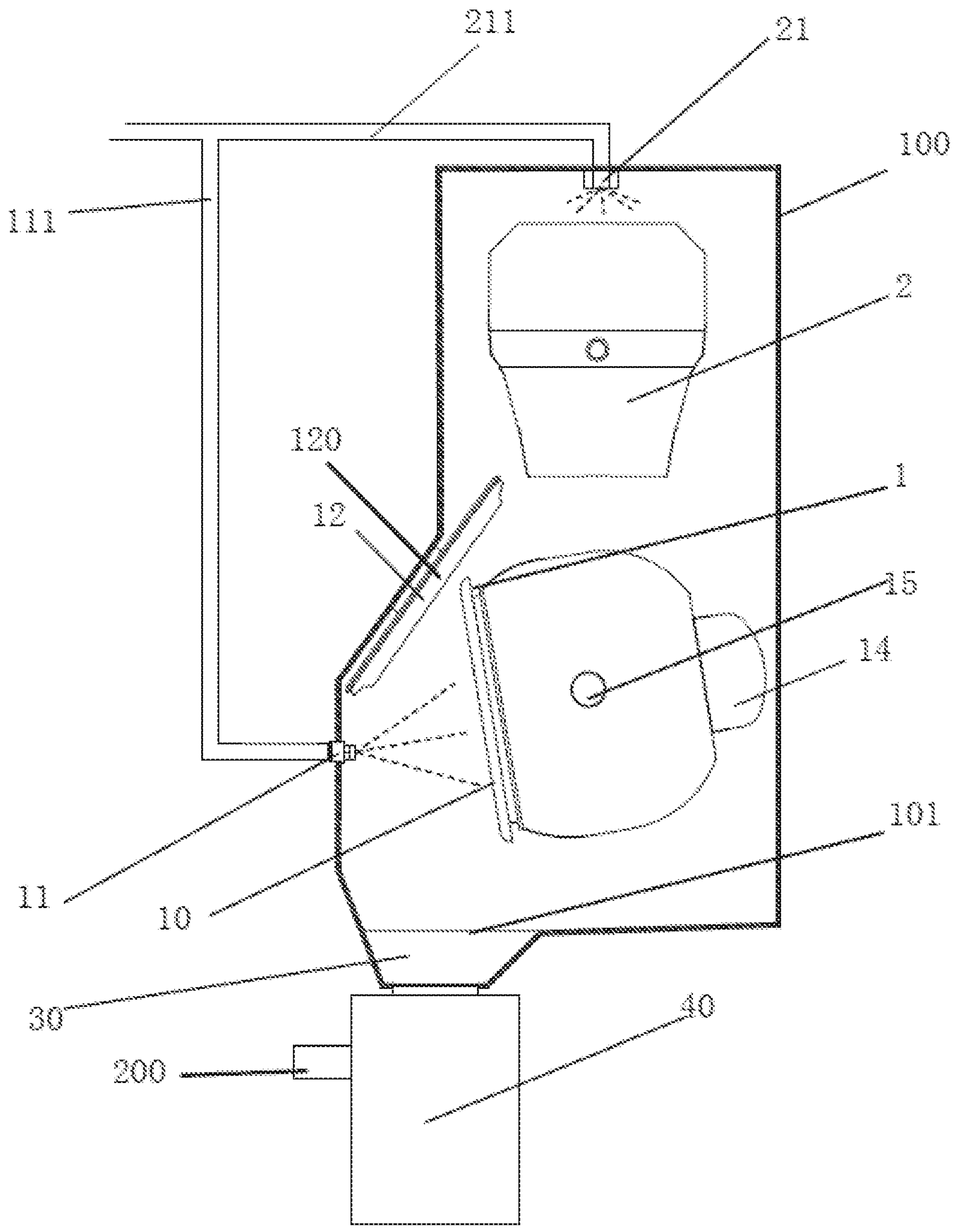
FIG. 2*a* is a structural block diagram of a flushing system of the closed system according to an embodiment of the present invention.
Figure 2B:
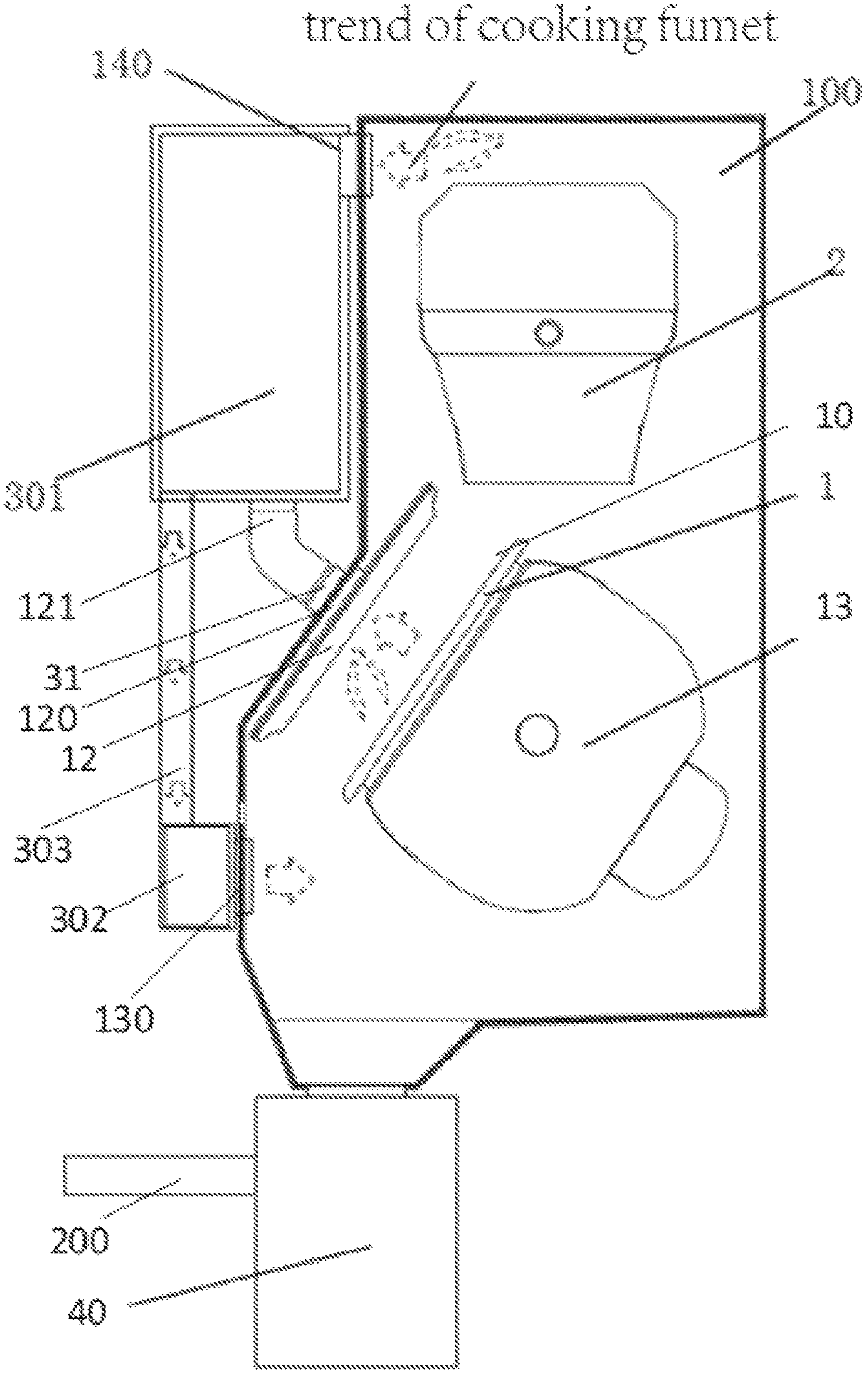
FIG. 2*b* is a structural block diagram of a cooking fume treatment system of the closed cooking system according to an embodiment of the present invention.
Figure 2C:
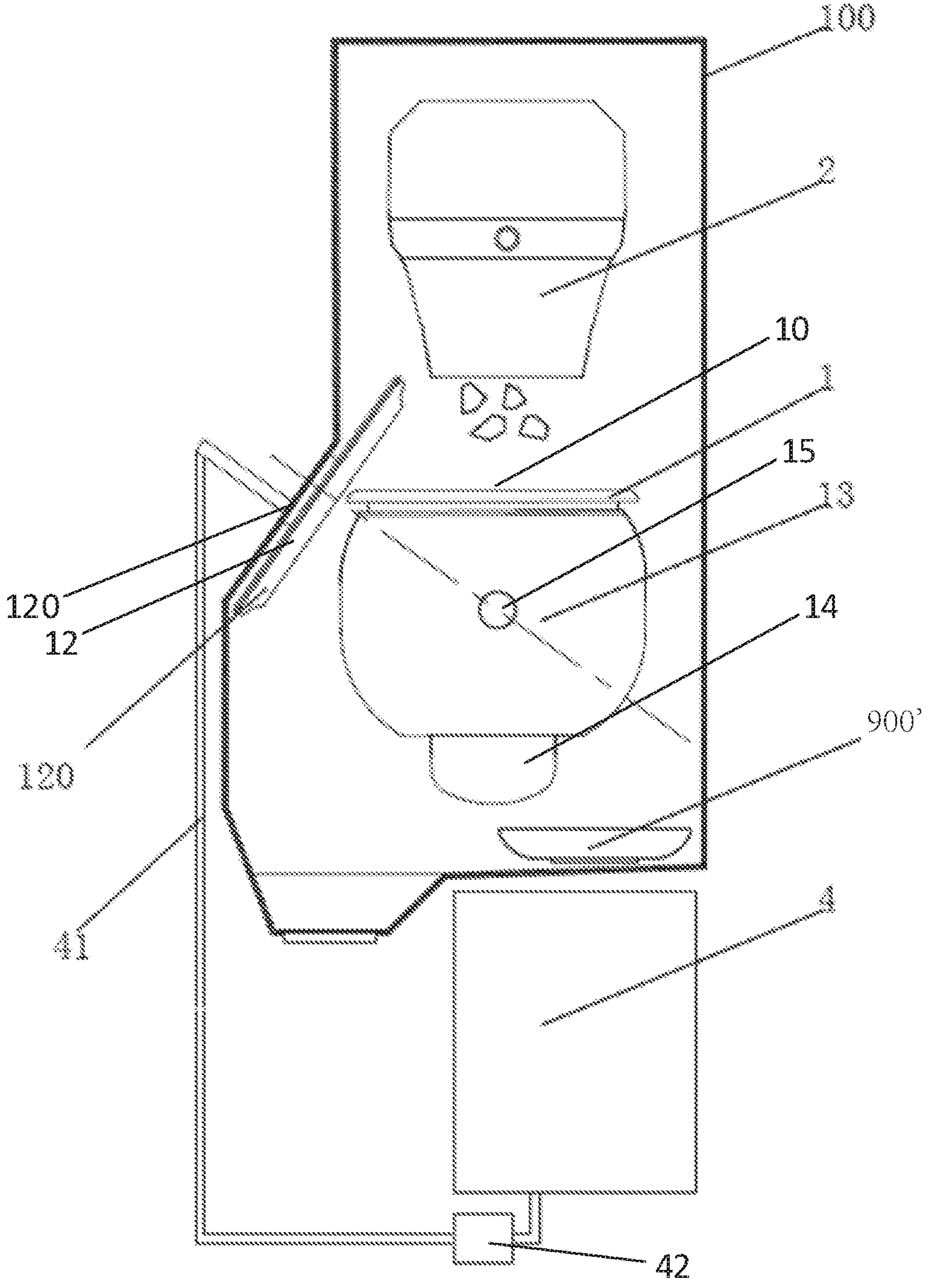
FIG. 2*c* is a structural block diagram of an ingredient feeding and cooking system and a seasoning adding system of the closed cooking system according to an embodiment of the present invention.

FIGS. 2*a*-2*c* show various main functional systems of the closed cooking system provided in the embodiment, including a flushing system, a cooking fume treatment system, an ingredient feeding and cooking system, and a seasoning adding system.

With reference to FIG. 2*a*, the flushing system comprises a cooking cavity 100 formed in sealed manner and cooking equipment arranged in the cooking cavity 100, the flushing system further comprises a spraying piece arranged in the cooking cavity 100 to flush the cooking equipment. An opening 101 used for being connected with the draining opening 200 is formed in the bottom of the cooking cavity 100, so that water generated after the spraying piece washes the cooking equipment can be drained. The cooking equipment comprises a wok 1, and when the wok 1 is driven by a wok working position controlling device 15 to turn until the wok opening 10 face to a spraying piece, the interior of the wok 1 is flushed by the spraying piece.

In an embodiment of the flushing system, the cooking equipment further comprises an ingredient feeding device 2 arranged above the wok 1; a cooking area used for containing the wok 1 is arranged in the middle portion of the interior of the cooking cavity 100, a feeding area used for containing the ingredient feeding device 2 is arranged at the position, located above the cooking area, of the interior of the cooking cavity 100, and the feeding area is communicated with the cooking area. The spraying piece comprises an ingredient feeding device spraying piece 21 which is arranged on the top portion of the cooking cavity 100 and faces the ingredient feeding device 2, and the ingredient feeding device is directly flushed by the ingredient feeding device spraying piece 21. Specifically, openings communicating with the interior of the ingredient feeding device 2 are formed in the top portion and the bottom portion thereof correspondingly; when the ingredient feeding device 2 is flushed by the ingredient feeding device spraying piece 21, water sprayed out of the ingredient feeding device spraying piece 21 flushes the interior of a cavity of the ingredient feeding device 2 from the top openings of the ingredient feeding device 2, and then the water flows out from the bottom openings of the ingredient feeding device 2. Before the ingredient feeding device 2 is flushed by the ingredient feeding device spraying piece 21, the wok 1 is driven by the wok working position controlling device 5 to be turned till the wok opening 10 faces the ingredient feeding device spraying piece 21 and the ingredient feeding device 2, and then the ingredient feeding device 2 is flushed by the ingredient feeding device spraying piece 21; water sprayed by the ingredient feeding device spraying piece 21 enters and flushes the interior of the ingredient feeding device 2 from a top opening of the ingredient feeding device 2, and the water flows out from a bottom opening of the ingredient feeding device 2 and falls into the wok 1 from the wok opening 10, and therefore the interior of the wok 1 is indirectly flushed. After the interior of the ingredient feeding device 2 and the interior of the wok are flushed by the ingredient feeding device spraying piece 21, the wok 1 is driven by the wok working position controlling device 15 to be turned to the position where the wok opening 10 faces the bottom opening of the cooking cavity 100, and therefore washed water is poured out and falls into the bottom opening 101 of the cooking cavity 100 to be drained. Preferably, when the ingredient feeding device 2 is flushed by the ingredient feeding device spraying piece 21, the water outlet center axis of the ingredient feeding device spraying piece 21 coincides with the center axis of the ingredient feeding device 2 and the center axis of the wok opening 10. The ingredient feeding device spraying piece 21 is fixed to the top portion of the cooking cavity 100, and the included angle between the water outlet center axis of the ingredient feeding device spraying piece 21 and the horizontal plane is 90 degrees.

In another embodiment or as an improvement on the above embodiment, the spraying piece comprises a wok spraying piece 11 arranged on a side portion or the bottom portion of the cooking cavity 100, and when the wok 1 is driven by the wok working position controlling device 5 to be turned to the wok opening 10 faces the wok spraying piece 11, the wok spraying piece 11 sprays water to directly flush the inner cavity of the wok 1. Preferably, when the wok spraying piece 11 is fixed to the side portion of the cooking cavity 100, the included angle between the water outlet center axis of the wok spraying piece 11 and the horizontal plane is 0-45 degrees; and when the wok spraying piece 11 is fixed at the bottom of the cooking cavity 100, the included angle between the water outlet central axis of the wok spraying piece 11 and the horizontal plane is 45-90 degrees. In addition, when the wok spraying piece 11 is fixed to the side portion of the cooking cavity 100, the bottom opening 101 of the cooking cavity 100 is close to the side portion where the wok spraying piece 11 is arranged, and the wok spraying piece 11 is arranged above the bottom opening 101 of the cooking cavity 100. Thus, when the inner cavity of the wok 1 is directly flushed by the wok spraying piece 11, the wok opening 10 simultaneously faces the wok spraying piece 11 and the bottom opening 101 of the cooking cavity 100, so that the sewage after flushing the interior of the wok can be drained in the flushing process, and the flushing effect and efficiency are further improved.

Further, the ingredient feeding device spraying piece 21 comprises a high-pressure spraying head, the flushing system further comprises a top spraying water pipe 211 and a top spraying head switch (not shown) which are arranged outside the cooking cavity 100, and the ingredient feeding device spraying piece 21 is connected with an external water source via the top spraying water pipe 211; the top spray header switch is used for controlling the opening and closing of the ingredient feeding device spraying piece 21.

Furthermore, the wok spraying piece 11 comprises a high-pressure spraying head, the flushing system further comprises a side spraying water pipe 111 and a side spraying head switch (not shown) which are arranged outside the cooking cavity 100, and the wok spraying piece 11 is connected with an external water source via the side spraying water pipe 111; the side spray header switch is used for controlling the opening and closing of the wok spraying piece 11.

It will be appreciated that top spraying head switch of the ingredient feeding device spraying piece 21 and the side spraying water pipe of the wok spraying piece 11 described above may be the same switch, for example employing a multi-way valve to achieve simultaneous control of opening and closing of the ingredient feeding device spraying piece 21 and the wok spraying piece 11.

Therefore, according to the flushing system provided by the embodiment of the present invention, the sealed cooking cavity is used as the sealed cooking working space, the cooking equipment is arranged in the sealed cooking space in the cooking cavity to realize the cooking function, the spraying piece capable of flushing the cooking equipment is arranged in the cooking cavity, and an opening used for being connected with a water outlet is formed in the bottom of the cooking cavity so as to discharge water generated after the spraying piece flushes the cooking equipment. The cooking equipment in the cooking cavity is flushed by the spraying piece, washing is more comprehensive, the efficiency is higher, the washing effect is better, and the cleanness and sanitation of the working space in the cooking cavity can be effectively kept. In addition, under the airtight protection effect of the cooking cavity arranged in the sealed manner, water sprayed out by the spraying piece and water for washing the cooking equipment can be limited in the sealed cooking cavity, and the problems that the water splashes out of the cooking cavity to influence the cooking function inside the sealed cooking cavity are solved.

As shown in FIG. 2*b*, the cooking fume treatment system comprises a wok device (comprising a wok 1) arranged in the cooking cavity 100 and a wok lid 12 used for being matched with the wok opening 10 to open or close the wok 1, the wok lid 12 is provided with an exhaust port 120, and the exhaust port 120 is communicated with a smoke inlet 31 of a cooking fume treatment device 3 arranged outside the cooking cavity 100 via a cooking fume pipeline 121.

The wok device further comprises a furnace body device 51 used for bearing and heating the wok 1, the cooking fume generated in the closed cooking process of the wok 1 is discharged to the cooking fume treatment device 3 from the exhaust port 120 for cooking fume treatment, and the cooking fume escaping into the cooking cavity 100 is discharged to the cooking fume treatment device 3 from the exhaust port 120 for cooking fume treatment when the wok 1 is opened.

Preferably, a cooking fume outlet 32 of the cooking fume treatment device 3 is communicated with the interior of the cooking cavity 100 (the cavity is provided with an exhaust gas return port 130), and cooking fume discharged after being treated by the cooking fume treatment device 3 enters the cooking cavity 100 from the cooking fume outlet 32 to be subjected to circulating cooking fume treatment so as to achieve zero emission of the cooking fume. Preferably, a cooking fume inlet 31 of the cooking fume treatment device 3 is further directly communicated with the interior of the cooking cavity 100 (the cavity is provided with an exhaust port 140), and cooking fume in the cooking cavity 100 is exhausted to the cooking fume treatment device 3 from the exhaust port for cooking fume treatment. Thus, cooking fume escaping into the cooking cavity 100 in the cooking process and cooking fume flowing back into the cooking cavity 100 after being treated by the cooking fume treatment device 3 can be exhausted to the cooking fume treatment device 3 from the exhaust port for cooking fume treatment.

Preferably, the cooking fume treatment device 3 comprises a first cooking fume treatment device 301 and a second cooking fume treatment device 302, the cooking fume inlet 31 of the first cooking fume treatment device 301 is communicated with the exhaust port 120 formed in the wok lid and directly communicated with the interior of the cooking cavity 100 (the cavity is provided with an exhaust port 140), a cooking fume outlet of the first cooking fume treatment device 301 is communicated with a cooking fume inlet of the second cooking fume treatment device 302 via a cooking fume pipeline 303, and the cooking fume outlet 32 of the second cooking fume treatment device 302 is communicated with the interior of the cooking cavity 100 (the cavity is provided with an exhaust gas return port 130). Therefore, after the cooking fume in the cooking cavity is treated by the first cooking fume treatment device 301, the cooking fume continues to be treated by the second cooking fume treatment device 302 and then returns to the interior of the cooking cavity, cooking fume is not discharged outwards, so that the cooking fume treatment effect and efficiency are improved, and zero emission of cooking fume in a real sense is realized. In addition, oil, water and gas condensed and collected by the first cooking fume treatment device and the secondary cooking fume treatment device are discharged out by the garbage treater 40 along with water from the draining cavity.

As shown in FIG. 2*c*, the ingredient feeding and cooking system comprises an ingredient feeding device 2*a*, a wok device and a dish discharging device which are arranged in cooking cavity 100. The wok device comprises a wok 1, a wok lid 12 which is matched with the opening of the wok and used for closing or opening the wok 1, a furnace body device 13 used for bearing and heating the wok, and a wok rotating device 14 used for controlling the wok to rotate for cooking, a wok working position controlling device 15 used for driving the wok to turn and a wok moving control device (arranged outside the cooking cavity and not shown) for controlling the wok 1 to move towards or away the wok lid 12 in a directional mode. A feeding area for accommodating the ingredient feeding device 2, a cooking area for accommodating the wok device and a dish discharging area for accommodating the dish discharging device sequentially arranged in the cooking cavity 100 from top to bottom. When ingredient feeding are cooking are to be performed, food materials are guided in and fed into the wok 1 by the ingredient feeding device 2, and the wok 1 is turned to a feeding working position (the wok opening 10 faces the ingredient feeding device 2) under the action of the wok working position controlling device 15; and then the wok 1 is turned to a cooking working position (the opening of the wok faces the wok lid 12) and is closed under the action of the wok moving control device for heating and stir-frying. After cooking is finished, the wok 1 is turned to a dish discharging working position (the opening of the wok faces the dish plate 900' in the dish discharging area) to discharge dishes. It will be appreciated that as an alternative embodiment, in the ingredient feeding, cooking and heating system, the configuration and manner in which the wok lid 12 is movable in direction to close the wok 1 may be adopted.

As shown in the FIG. 2*c*, the seasoning adding system comprises a seasoning device 4 arranged outside the cooking cavity 100 (preferably arranged below the cooking cavity 100 and far away from the bottom opening 101 of the cooking cavity 100), and the seasoning device 4 comprises seasoning bottles (not shown) and a seasoning rank 401 used for containing the seasoning bottles; each seasoning bottle is communicated with the exhaust port 120 of the wok lid 12 via an a seasoning pipe 41 (and a seasoning pump 42) so as to realize automatic addition of seasonings (liquid seasonings) in the whole cooking process.

In the following, specific implementation structures, specific implementation modes and working principles of the closed cooking system provided by the embodiment of the present invention applied to a specific implementation environment (such as a cooking machine) are described and explained in detail in combination with a plurality of specific embodiments.

Embodiment 1

Figure 3:
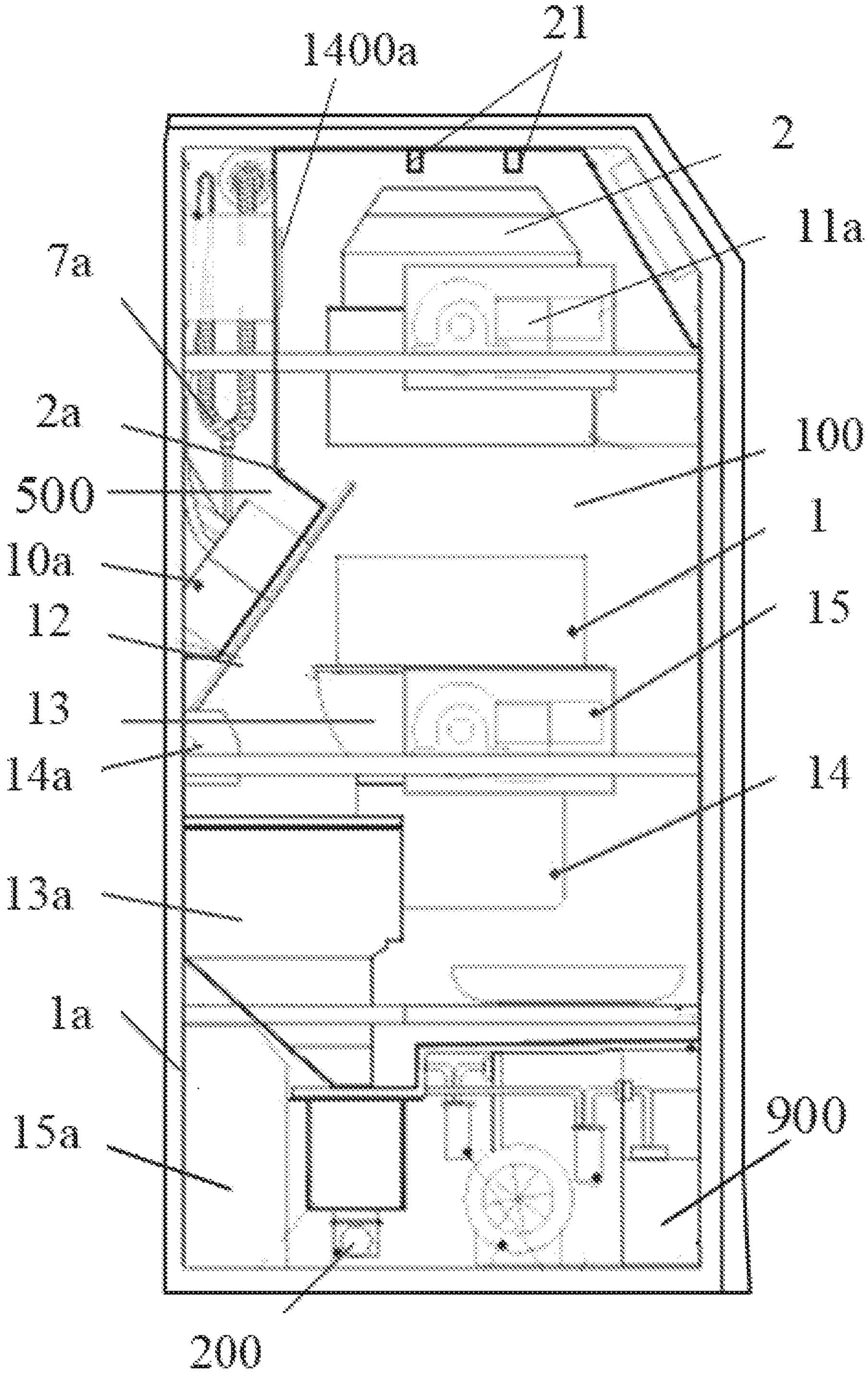
FIG. 3 is a structural schematic diagram of the cooking machine provided by the first embodiment of the present invention.

Referring to FIG. 3, an intelligent cooking machine for realizing full-closed cooking provided by the embodiment of the present invention comprises an outer shell 1*a*, an inner shell 2*a* arranged inside the outer shell 1*a*, a wok 1, a wok device 13, a wok working position controlling device 15, a wok rotating device 14, a first cooking fume treatment device 7*a* and a main control device 900. The inner shell 2*a* is provided with a cooking cavity 100 which is arranged in a sealed manner, and the wok 1, the wok device 13, the wok working position controlling device 15 and the wok rotating device 14 are arranged in the cooking cavity 100. A cooking fume treatment area 500 is formed between the inner shell 2*a* and the outer shell 1*a*, the first cooking fume treatment device 7*a* is arranged at the cooking fume treatment area 500, and the first cooking fume treatment device 7*a* is provided with a cooking fume inlet end communicated with the interior of the cooking cavity 100 so as to be used for treating cooking fume in the cooking cavity 100. The wok device 13 is used for carrying and heating the wok 1; the wok working position controlling device 15 is used for driving the wok 1 to turn up and down; and the wok rotating device 14 is used for controlling the wok 1 to rotate around the central axis of the wok 1 to cook. The wok device 13, the wok working position controlling device 15, the wok rotating device 14 and the first cooking fume treatment device 7 are electrically connected with the main control device 900 so as to receive a control command sent by the main control device 900 according to a preset recipe program and perform corresponding operation according to the control command.

In the embodiment of the present invention, the specific structures of the wok device 13, the wok working position controlling device 15 and the wok rotating device 14 may be referred to the prior art (for example, a patent application with the patent publication number of CN103126515A, entitled "Programmable Controlled Intelligent Cooking Machine"; or a patent application with the patent publication number CN103110339A, entitled "Wok Device For A Full-automatic Cooking Machine", etc.), and are not specifically limited and described herein.

In the embodiment of the present invention, the cooking process of the intelligent cooking machine is as follows: during cooking, the wok device 13 heats the wok 1 according to the control command of the main control device 900, the wok working position controlling device 15 controls the wok 1 to turn according to the control command of the main control device 900, and the wok rotating device 14 drives the wok 1 to rotate according to a control command of the main control device 900, so that food materials in the wok 1 are stir-fried.

In the embodiment of the present invention, the intelligent cooking machine can be controlled through the human-computer interaction interface 8*a* arranged on the outer side of the outer shell 1*a*, and the human-computer interaction interface 8*a* is electrically connected with the main control device 900.

In the embodiment of the present invention, preferably, the outer shell 1*a* and the inner shell 2*a* form a box shape structure, the lower half part of the outer shell 1*a* is a square structure, the upper half part of the outer shell 1*a* is of a halfpace-shaped structure, and the human-computer interaction interface 8*a* is arranged on the inclined plane of the halfpace-shaped structure. In this way, a user can operate the human-computer interaction interface 8*a* conveniently.

In the embodiments of the present invention described above, it should be noted that an automatic seasoning adding device (not shown) used for adding various seasoning into the wok 1 according to a control command of the main control device 900, an automatic ingredient feeding device (not shown) used for automatically feeding main food ingredients into the wok 1 according to a control command of the main control device 900 and the like can be further arranged in the intelligent cooking machine. The structures of the devices may be referred to the prior art (the patent application with the patent publication number of CN103126515A, entitled "Programmable Controlled Intelligent Cooking Machine", etc.) and are not specifically limited here. The ingredient feeding device 2 is arranged in the cooking cavity and located above the wok 1, and the ingredient feeding device spraying piece 21 of the spray washing device is arranged in the cooking cavity and located light above the ingredient feeding device 2. In addition, a dish discharging area is arranged in the cooking cavity 100 and located below the wok 1, a dish discharging device is arranged in the dish discharging area, and a seasoning box (seasoning adding device) for containing various seasoning containers is further arranged in the outer shell 1*a* and located outside the cooking cavity 100 (preferably below the cooking cavity).

In the embodiment of the present invention, the first cooking fume treatment device 7*a* is arranged in the cooking fume treatment area 500 formed between the outer shell 1*a* and the inner shell 2*a*, and the wok 1, the wok device 13, the wok working position controlling device 15 and the wok rotating device 14 are arranged in the cooking cavity 100; therefore, when the intelligent cooking machine is used for cooking, due to the fact that the interior of the inner shell 2*a* is a closed cooking area, cooking fume generated by the wok 1 can only be gathered in the cooking area and cannot diffuse to other places in the outer shell 1*a*, meanwhile, the first cooking fume treatment device 7*a* can perform cooking fume treatment on the cooking fume in the cooking area (even directly on the cooking fume in the wok 1), so that the cooking fume generated in the cooking area can be effectively isolated from other places in the outer shell, and the cooking fume in the outer shell can be treated in time. Therefore, the interior of the outer shell can be kept clean, cooking fume can be prevented from polluting related devices in the cooking machine, and the normal work of the related devices in the cooking machine can be guaranteed.

In the embodiment of the present invention, further referring to FIG. 1, the intelligent cooking machine further includes a wok lid 12 and a wok lid driving device 10*aa* used for driving the wok lid 12 to cover/leave the opening of the wok 1, the wok lid 12 is arranged in the cooking cavity 100, and the wok lid driving device 10*aa* is arranged in the outer shell 1*a* and electrically connected with the main control device 900. The specific working principle that the wok lid 12 covers/leaves the opening of the wok 1 is as follows: when the wok lid 12 is required to cover the opening of the wok 1, the wok working position controlling device 15 drives the wok 1 to turn according to related control commands of the main control device 900, so that the opening of the wok 1 faces the wok lid 12, and at the moment, the wok lid driving device 10*aa* drives the wok lid 12 to move towards the direction of the opening of the wok 1 according to the control commands of the main control device 900, so that the wok lid 12 covers the opening of the wok 1; when the wok lid 12 is required to leave the opening of the frying pot 1, the wok lid driving device 10*aa* drives the wok lid 12 to move in the direction away from the opening of the wok 1 according to the control commands of the main control device 900, so that the wok lid 12 leaves the opening of the wok 1.

In the embodiment of the present invention, referring to FIGS. 4-10, the ingredient feeding device spraying piece 21 is communicated with a water source via a top spraying water pipe 211 and a top spraying head switch 9*b*, the ingredient feeding device spraying piece 21 is arranged on the inner side wall of the top of the inner shell 1*a* and aligned with the ingredient feeding device 2 located right below it; the wok 1 is arranged right below the ingredient feeding device 2, and a draining device 13*a* is arranged below the wok 1. The ingredient feeding device 2 comprises an ingredient-containing chamber 40*b* used for containing food ingredients, the top wall of the ingredient-containing chamber 40*b* is provided with water spraying openings 401*b* allowing water sprayed by the ingredient feeding device spraying piece 21 to fall in, the bottom wall of the ingredient-containing chamber 40*b* is provided with ingredient-dropping openings 402*b* allowing the food ingredients/water to fall in the wok 1, and each of the ingredient-dropping opening 402*b* is provided with a corresponding compartment door 403*b*; the ingredient feeding device 2 further comprises compartment door driving mechanisms 41*b* used for correspondingly controlling the opening and closing of the compartment doors 403*b*. A wok working position conversion motor 6*b*, a wok working position detection device 7*b*, the compartment door driving mechanisms 41*b* and the top spraying head switch 9*b* are electrically connected with the main control device 900 so as to receive control commands sent by the main control device 900 according to a preset recipe program and perform corresponding operations according to the control commands.

Figure 5:
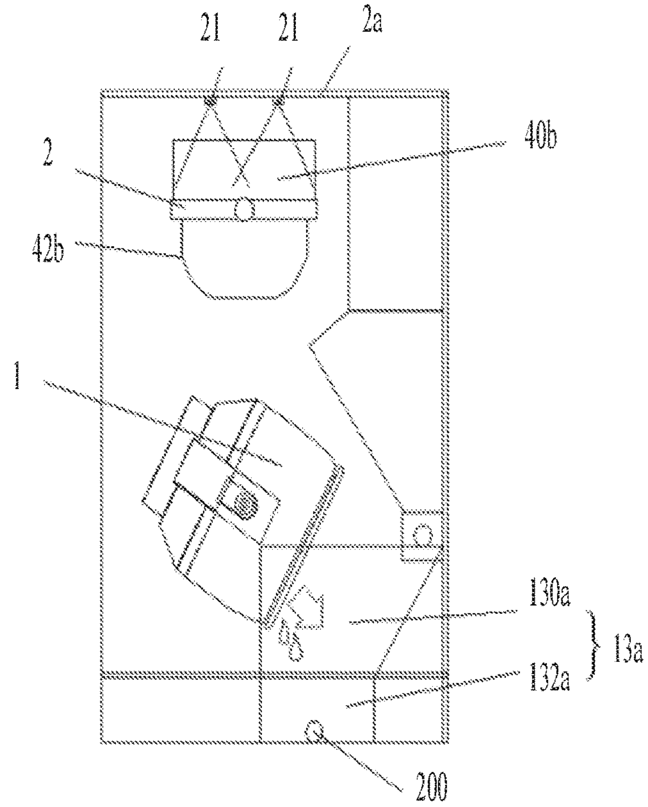
FIG. 5 is another angular configuration diagram of the cooking machine provided in FIG. 4.
Figure 9:
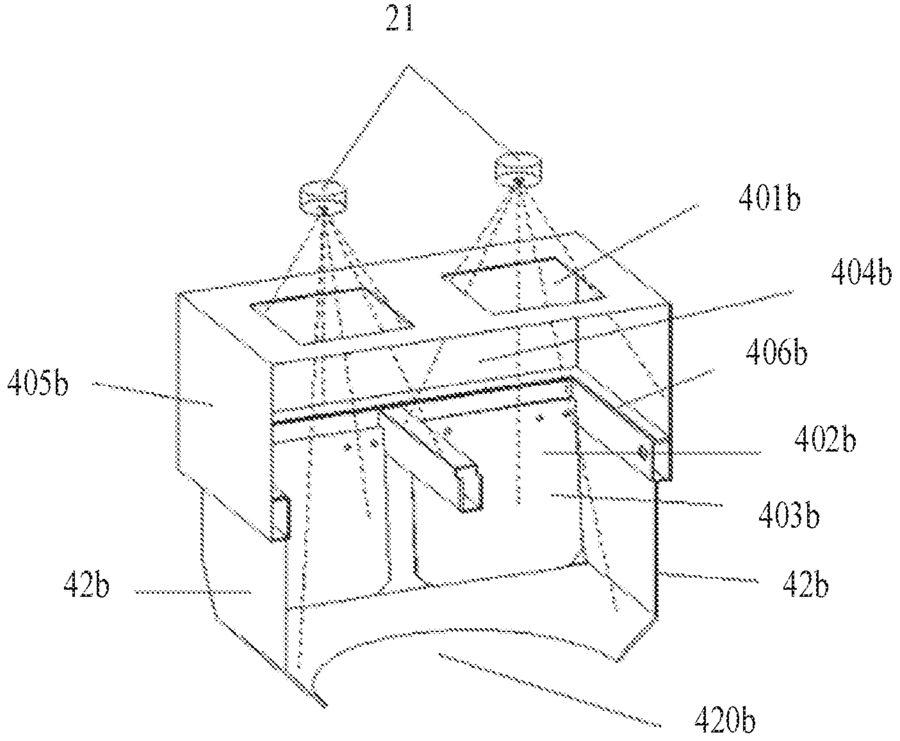
Figure 10:
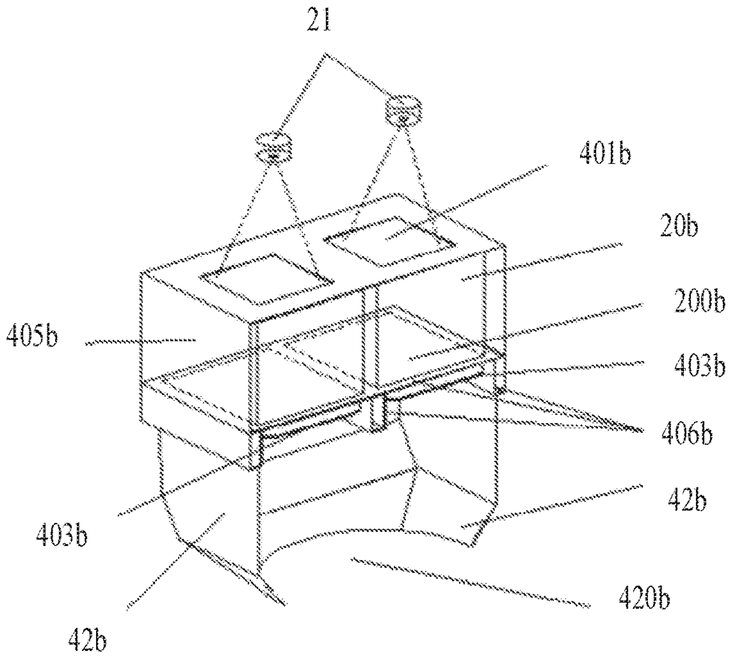
FIG. 10 is a schematic view of the ingredient feeding device in FIG. 7 contained with a multi-compartment container.

The working principle of the embodiment of the present invention is as follows: after the full-automatic cooking machine finishes a dish discharging process, the wok working position detection device 7*b* sends detected turning angle data of the wok 1 to the main control device 900, the main control device 900 controls the wok working position conversion motor 6*b* to drive the wok 1 to turn according to the turning angle data received at the moment, so that the opening of the wok 1 is aligned with the ingredient-dropping opening 402*b* of the ingredient feeding device 2, and the main control device 900 sends corresponding operation commands to the compartment door driving mechanisms 41*b* to control it open the compartment doors 403*b* according to the operation command (as shown in FIG. 9), and at the moment, the main control device 900 controls the top spraying head switch 9*b* to be opened so as to supply high-pressure water to the ingredient feeding device spraying piece 21, so that the ingredient feeding device spraying piece 21 sprays and washes the ingredient feeding device 2 below it, water sprayed by the ingredient feeding device spraying piece 21 fall into the ingredient-containing chamber 40*b* from the water spraying openings 401*b*, ingredient residues in the ingredient-containing chamber 40*b* are washed down from the ingredient-dropping openings 402*b*, the ingredient residues attached to the compartment doors 403*b* can be washed down by the water from the ingredient-dropping openings 402*b*, and the flushed ingredient residues and water fall into the wok 1 located right below the ingredient-containing chamber 40*b*. After the ingredient feeding device spraying piece 21 stops spraying water, the main control device 900 controls the wok working position conversion motor 6*b* to drive the wok 1 to turn according to the turning angle data received at the moment, so that the opening of the wok 1 faces the draining device 13*a* (as shown in FIG. 5), water and ingredient residues in the wok 1 fall into the water draining device 13*a* to be filtered, and finally, drained out from the draining opening 200, and thereby completing the washing of the ingredient feeding device 2. As can be seen from the above analysis, referring to FIG. 11, which is a schematic diagram showing the water flow of the cooking machine when washing the ingredient feeding device 2 as follows: the ingredient feeding device spraying piece 21—the ingredient feeding device 2—the wok 1—the draining device 13*a*—the draining opening 200.

It will be appreciated that the cooking machine may also wash the ingredient feeding device 2 before placing food ingredients into the ingredient-containing chamber 40*b*, the washing process may be referred to the above, and will not be described in detail herein.

It should be noted that the top spraying head switch 9*b* is connected with the ingredient feeding device spraying piece 21 via a water pipe. Preferably, the top spraying head switch 9*b* is a water pump arranged inside or outside the inner shell 1*a*, and the water pump can suck in cleaning fluid from a cleaning fluid supply device (not shown) arranged outside or inside the inner shell 1*a* of the full-automatic cooking machine and supply the cleaning fluid to the spraying pieces 21, so that the ingredient feeding device 2 can be flushed by the cleaning liquid sprayed by the spraying piece 21. It will be appreciated that the top showerhead switch 9*b* may also be an electrically operated valve provided inside or outside the inner shell 1*a*.

In the embodiment of the present invention, the specific structure of the wok working position conversion motor 6*b* refers to the prior art (for example, a patent application with the patent publication number of CN103126515A, entitled "Programmable Controlled Intelligent Cooking Machine"; or a patent application with the publication number CN103110339A, entitled "Wok Device For A Full-Automatic Cooking Machine", etc.), the structure of which is not specifically limited and described herein.

As can be seen from the analysis, the full-automatic cooking machine provided by the embodiment of the present invention has a function of washing the ingredient feeding device 2, so that the ingredient feeding device 2 can be kept clean and sanitary.

Figure 4:
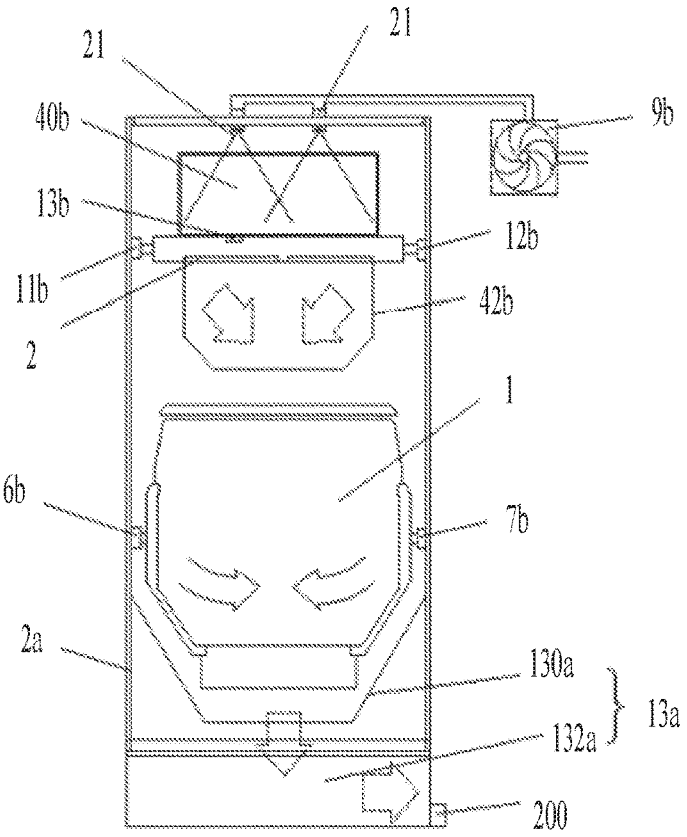
FIG. 4 is a structural schematic diagram of the cooking machine provided by the first embodiment of the present invention and shows the state of spraying the ingredient feeding device and the wok by adopting the ingredient feeding device spraying piece.
Figure 26:
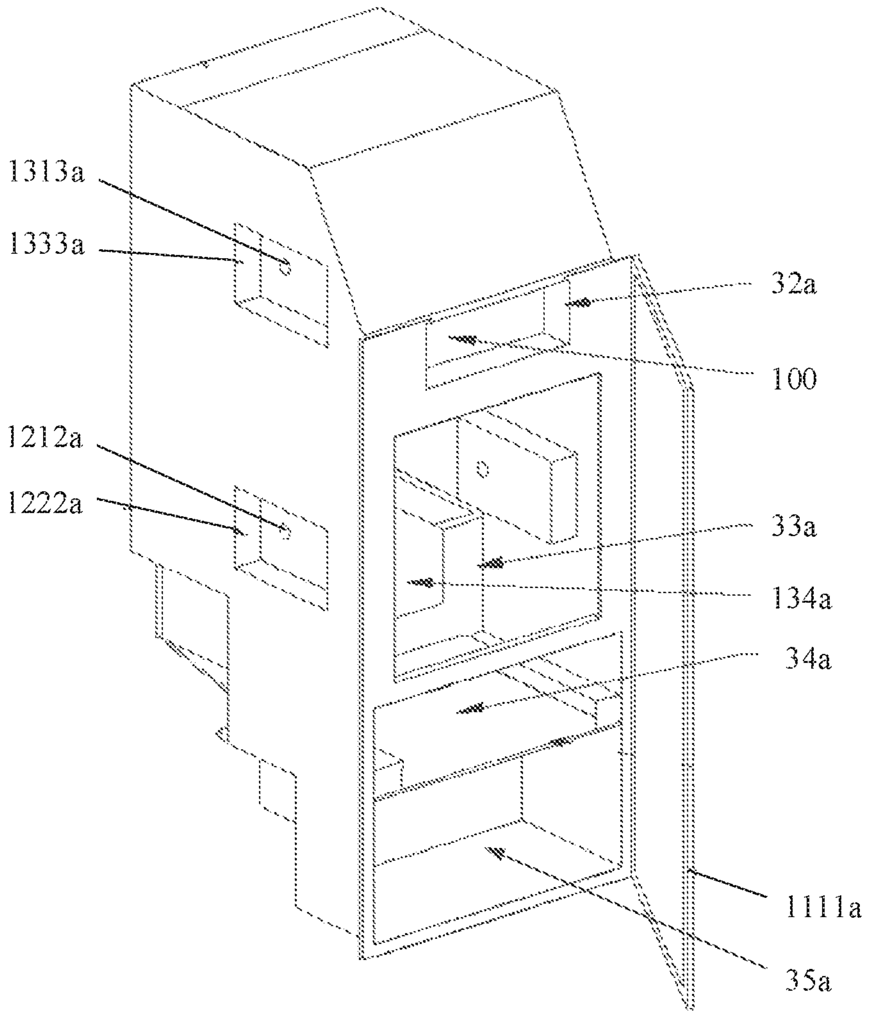
FIG. 26 is a front view of the inner shell shown in FIG. 3.

The embodiment of the present invention will be further described below with reference to FIGS. 4-10, the automatic cooking machine provided by the embodiment of the present invention further includes a flipping mechanism 11*a* electrically connected with the main control device 900, and the ingredient-containing chamber 40*b* provided by the embodiment of the present invention is provided with a receiving space 404*b*; the receiving space 404*b* is used for receiving a multi-compartment ingredient container 20*b* containing food ingredients, each compartment of the multi-compartment ingredient container 20*b* is provided with compartment openings 200*b* corresponding to the ingredient-dropping openings 402*b* in a one-to-one mode, and each compartment is used for containing the same or different food ingredients. When the multi-compartment ingredient container 20*b* is received in the receiving space 404*b*, the compartment openings 200*b* of the multi-compartment ingredient container 20*b* are aligned with the water spraying openings 401*b* of the ingredient-containing chamber 40*b* in a one-to-one mode, and the multiple ingredient-dropping openings 402*b*, the multiple compartment doors 403*b* and the multiple compartments correspond to one another in a one-to-one mode. When the multi-compartment ingredient container 20*b* is contained in the receiving space 404*b* (as shown in FIG. 4), the automatic cooking machine is in a feeding procedure, the flipping mechanism 11*a* controls the ingredient feeding device 2 to achieve upwards overturning, so that the multi-compartment ingredient container 20*b* in the ingredient-containing chamber 40*b* is inverted, therefore, the food ingredients in the multi-compartment ingredient container 20*b* are dropped onto the compartment doors 403*b* (the compartment doors 403*b* are in a closed state at the moment, as shown in FIGS. 10-13), and the ingredient-dropping openings 402*b* are aligned with the wok 1; in this way, in the feeding procedure of the full-automatic cooking machine, the compartment door driving mechanisms 41*b* controls the corresponding compartment doors 403*b* to be opened, so that food ingredients in the inverted multi-compartment ingredient container 20*b* are dropped into the wok 1 from the corresponding ingredient-dropping openings 402*b*. When the multi-compartment ingredient container 20*b* is taken out of the ingredient-containing chamber 40*b* (at the moment, the full-automatic cooking machine completes the dish discharging procedure), the main control device 900 sends a turning control command to the flipping mechanism 11*a* according to a recipe program command, so that the flipping mechanism 11*a* controls the ingredient feeding device 2 to achieve upwards overturning, the ingredient-dropping openings 402*b* are aligned with the wok 1 and the water spraying openings 401*b* are aligned with the spraying pieces 21 (as shown in FIG. 9). Thus, in the process of washing the ingredient feeding device 2, water sprayed by the ingredient feeding device spraying piece 21 can fall into the ingredient-containing chamber 40*b* from the water spraying openings 401*b* and fall into the wok 1 from the ingredient-dropping openings 402*b*, so that the food ingredient residues in the ingredient-containing chamber 40*b* can be flushed down into the wok 1. When the top spray head switch 9*b* stops supplying water, the wok 1 is turned over, so that all accumulated water and food ingredient residues in the wok 1 are dropped into the draining device 13*a*, and sewage is discharged from the draining opening 200 after being filtered by the draining device 13*a*. In addition, one side face of the inner shell 1*a* is provided with an ingredient container guiding opening 32*a* (as shown in FIG. 26) for the multi-compartment ingredient container 20*b* to go in and out of the ingredient-containing chamber 40*b*, and the ingredient-containing chamber 40*b* is provided with an ingredient-receiving opening 407*b* for the multi-compartment ingredient container 20*b* to go in and out of the receiving space 404*b*. The process that the multi-compartment ingredient container 20*b* received in or taken out of the receiving space 404*b* is as follows with reference to FIG. 12: the main control device 900 controls the ingredient feeding device 2 to overturn downwards to enable the ingredient-receiving opening 407*b* to be aligned with the ingredient container guiding opening 32*a*, and at the moment, the multi-compartment ingredient container 20*b* can be put into or taken out of the receiving space 404*b* from the ingredient container guiding opening 32*a* and the ingredient-receiving opening 407*b*.

It should be noted that the position relation (such as the top wall and the bottom wall of the ingredient-containing chamber 40*b*) of the components of the ingredient feeding device 2 will be changed along with overturning of the ingredient-receiving opening.

In addition, the flipping mechanism 11*a* and the compartment door driving mechanism 41*b* refer to an existing compartment door driving technology (for example, a patent with a patent publication number of CN103126515A, entitled "Programmable Controlled Intelligent Cooking Machine", etc.), and description is not carried out here. Exemplarily, the compartment door driving mechanisms 41*b* include motors (not shown) correspondingly connected to the compartment doors 403*b* in a one-to-one mode, the motors are fixed to the bottom of the ingredient-containing chamber 40*b*, and the motors are electrically connected with the main control device 900 and correspondingly drive the doors 403*b* in a one-to-one mode.

In the embodiment of the present invention, preferably, the receiving space 404*b* is used for receiving a four-compartment ingredient container 20*b* (i.e., the multi-compartment ingredient container 20*b* with four individual compartments), and the number of the ingredient-dropping opening 402*b* and the number of the compartment doors 403*b* are four. Thus, a user can match main ingredients and accessory ingredients according to different dishes and stock the main ingredients and accessory ingredients in individual compartments (compartment A, compartment B, compartment C and compartment D) of a four-compartment ingredient container. Based on a preset recipe program, the ingredient feeding device 2 puts into the wok the food ingredients in different individual compartments at a predetermined time in a predetermined sequence. In this embodiment, the four individual compartments allow up to 24 combinations of putting sequence. A Chinese dish usually consists of one to three main ingredients and several accessory ingredients. For example, the dish "stir-fried Shredded Cabbage" has cabbage as a main ingredient, and chili and garlic as two accessory ingredients. The dish "Shredded Meat with Dry Tofu and Green Pepper" has shredded meat, dry tofu and green pepper as three main ingredients, and garlic and red pepper as two accessory ingredients. The raw ingredients are stocked in different individual compartments. Those raw ingredients that will be put into the wok at the same time can be stocked in a same individual compartment. In this embodiment, the raw ingredients are contained in four individual compartments, which means the raw ingredients can be put into the wok at four different moments, thus there are at most 24 combinations (ABCD, ABDC, ACBD, ACDB, ADBC, ADCB, BACD, BADC, BDAC, BDCA, BCAD, BCDA, CABD, CADB, CBAD, CBDA, CDAB, CDBA, DABC, DACB, DBAC, DBCA, DCAB, DCBA). A four-compartment container is already enough for most of the dishes. However, an over-four-compartment container, such as six-compartment container or eight-compartment container can be used to meet the requirement of some more complex dishes. It should be understood that the multi-compartment ingredient container 20*b* can comprise four individual compartments, six individual compartments or eight individual compartments, while the corresponding multi-compartment ingredient-containing chamber 40*b* should accordingly comprise four individual compartments, six individual compartments or individual eight compartments. In the present invention, all the raw ingredients for one dish, including the main ingredients and the accessory ingredients, are packaged and stocked in the individual compartments of the multi-compartment container. Therefore, the industrialization of the cooking machine is expectable. As a result, an industrial chain, including the production of agricultural products, pretreatment (cleaning and cutting etc.), package, delivery, distribution and consumption, can thus be established. This also leads to a new life style, since people no longer need to buy agricultural products in vegetable markets and thus less garbage will be produced. In addition, adopting a standard package helps guarantee food security.

Figure 14:
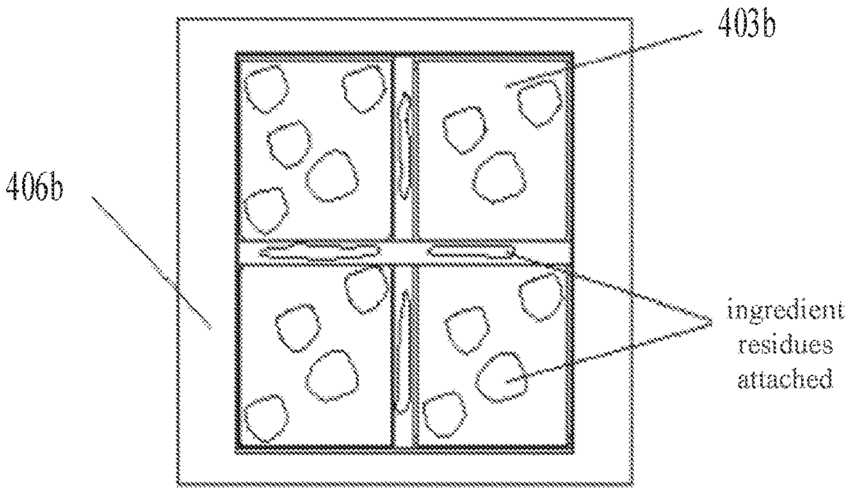
FIGS. 14-16 illustrate the location of the ingredient feeding device shown in FIG. 13 with food ingredient debris adhered thereto.
Figure 15:
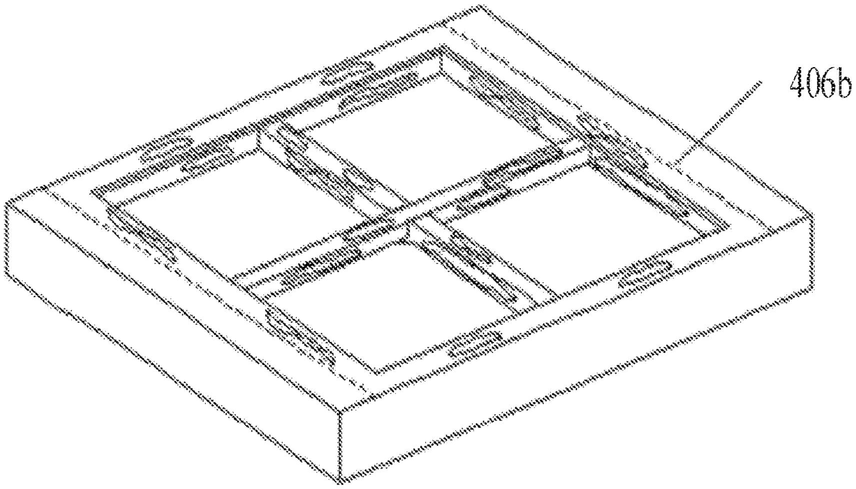

Referring to FIGS. 7-10, as a further improved embodiment, the ingredient-containing chamber 40*b* includes a hollow square ingredient-feeding shell 405*b* and a supporting frame 406*b*, and the supporting frame 406*b* is used for supporting the inverted multi-compartment ingredient container 20*b*. The supporting frame 406*b* is provided with a transverse bar 4060*b*, a longitudinal bar 4061*b* and four side bars 4062*b*, the side bars 4062*b* are sequentially connected end to end to form a rectangular frame, the transverse bar 4060*b* is arranged between the middles of two opposite side bars 4062*b* by the two ends thereof connected with the two side bars 4062*b* in a one-to-one correspondence mode; the longitudinal bar 4061*b* is arranged between the middles of the other two opposite side bars 4062*b* of the rectangular frame by the two ends thereof connected with the other two side bars 406*b*2 in a one-to-one correspondence mode. In addition, the middle of the transverse bar 4060*b* is connected with the middle of the longitudinal bar 4061*b* in a crossed mode, namely, the supporting frame 406*b* is a framework shaped like a Chinese character 'tian'. Thus, the transverse bar 4060*b* and the longitudinal bar 4061*b* divide a rectangular hollow area defined by the rectangular frame into the four rectangular ingredient-dropping openings 402*b*. Besides, one side face of the ingredient-feeding shell 405*b* is provided with the ingredient-receiving opening 407*b*, the bottom wall of the ingredient-feeding shell 405*b* is in an opening shape, and the top wall of the ingredient-feeding shell 405*b* is provided with the four water spraying openings 401*b* corresponding to the ingredient-dropping openings 402*b* in a one-to-one mode. Therefore, in the process that the ingredient feeding device 2 is washed by the spraying pieces 21, the compartment doors 403*b* which is arranged at the ingredient-dropping openings 402*b* and is in an open state can be washed by each of the water spraying openings 401*b*. The edges of the side end faces which are close to the bottom end faces of the ingredient-feeding shell 405*b* are connected with the side bars 4062*b* in a one-to-one correspondence mode, and in other words, the ingredient-feeding shell 405*b* and the supporting frame 406*b* are connected to each other to form the receiving space 404*b*, and the ingredient-receiving opening 407*b* is formed in one side wall of the ingredient-feeding shell 405*b*. In the embodiment of the present invention, when the multi-compartment ingredient container 20*b* is received in the receiving space 404*b* (that the full-automatic cooking machine is in a feeding process at the moment), with reference to FIGS. 10-13, the flipping mechanism 11*a* controls the ingredient feeding device 2 to flip, so that the multi-compartment ingredient container 20*b* in the ingredient-containing chamber 40*b* is inverted, the multi-compartment ingredient container 20*b* is inverted on the supporting frame 406*b*, food ingredients in the multi-compartment ingredient container 20*b* are dropped on the compartment doors 403*b*, and then the food ingredients in the multi-compartment ingredient container 20*b* can be dropped into the wok 1 by controlling the compartment doors 403*b* to be opened. Besides, after the multi-compartment ingredient container 20*b* is taken out of the material ingredient-containing chamber 40*b* (that the full-automatic cooking machine is running at a washing working position at the moment), the flipping mechanism 11*a* controls the ingredient feeding device 2 to flip, so that the ingredient-dropping opening 402*b* is aligned with the opening of the wok 1, and the water spraying openings 401*b* is aligned with the ingredient feeding device spraying piece 21. Referring now to FIGS. 14 and 15, when the multi-compartment ingredient container 20*b* is inverted on the supporting frame 406*b*, the food ingredient residues may adhere to the supporting frame 406*b* and the compartment doors 403*b*, so that the ingredient feeding device 2 is required to be washed, and the washing process can be referred to the embodiment described above and is not repeated here.

It should be noted that the material ingredient-containing chamber 40*b* can also be of other structure, for example, the material ingredient-containing chamber 40*b* can be of a hollow cylindrical structure with a plurality of water spraying openings 401*b* formed in the top wall and a plurality of ingredient-dropping openings 402*b* formed in the bottom end face, or the material ingredient-containing chamber 40*b* can be of a circular truncated cone structure with a plurality of water spraying openings 401*b* on the top wall and a plurality of ingredient-dropping openings 402*b* on the bottom end face, and specific limitation is not conducted here.

Figure 16:
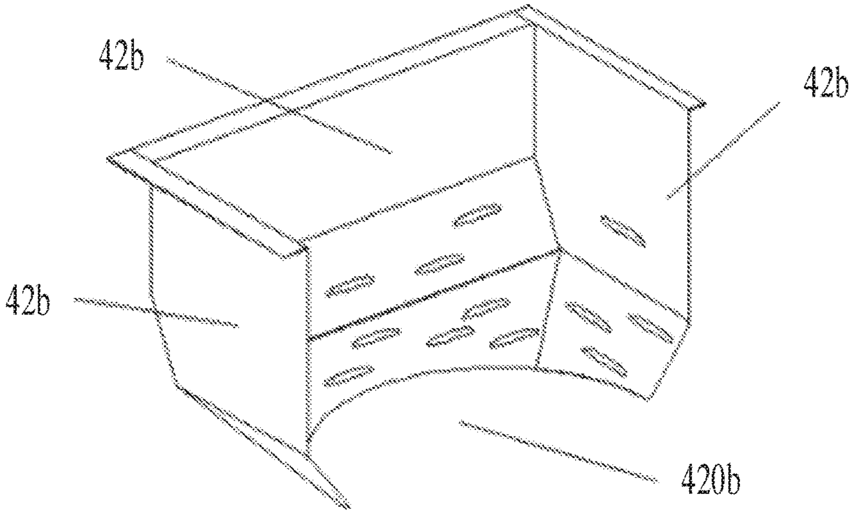

Referring now to FIGS. 7-10, in the embodiment described above, preferably the ingredient feeding device 2 further includes an ingredient-guiding shell of a hollow structure; the top of the ingredient-guiding shell is in an opening shape and is fixedly connected with the bottom of the supporting frame 406*b*, an ingredient-guiding opening 420*b* is formed in the bottom of the ingredient-guiding shell, the bottom of the ingredient-guiding shell is narrowed relative to the top of the ingredient-guiding shell, and therefore food ingredients and water can be conveniently guided into the wok 1 below the ingredient-guiding shell. Exemplarily, the ingredient-guiding shell comprises four ingredient-guiding plates 42*b*, the first ends of the four ingredient-guiding plates 42*b* are connected with the four side bars 4062*b* in a one-to-one correspondence mode, and the second ends opposite to the first ends of the ingredient-guiding plates 42*b* are bent towards the central axis of the rectangular frame (the central axis is perpendicular to the plane defined by the rectangular frame). The side edges of every two adjacent ingredient-guiding plates 42*b* are connected with each other, so that the ingredient-guiding plates 42*b* are connected with each other to form a cavity of an inverted halfpace-shaped structure, and the second ends of the ingredient-guiding plates 42*b* define the ingredient-guiding opening 420*b* for food ingredients/water falling from the ingredient-dropping opening 402*b* to fall into the wok 1. When the compartment doors 403*b* are opened, food ingredients dropped on the compartment doors 403*b* or water falling into the ingredient-containing chamber can fall into the cavity formed by the ingredient-guiding plates 42*b* from the ingredient-dropping openings 402*b*, and due to the fact that the second ends of the ingredient-guiding plates 42*b* are bent towards the central axis of the rectangular frame, namely the cavity is of an inverted halfpace-shaped structure, the food ingredients or water falling into the cavity can fall towards the ingredient-guiding opening 420*b* along the ingredient-guiding plates 42*b*, and therefore the food ingredients or water can fall into the wok 1 under the ingredient-guiding opening 420*b* in a more concentrated mode. When the full-automatic cooking machine is in a feeding process, namely the multi-compartment ingredient container 20*b* is inverted on the supporting frame 406 and the compartment doors 403*b* are opened, food ingredients will fall into the cavity formed by the ingredient-guiding plates 42*b* from the ingredient-dropping openings 402*b* and be guided to the ingredient-guiding opening 420*b* by the ingredient-guiding plates 42*b*, and then fall into the wok 1 from the ingredient-guiding opening 420*b*. With reference to FIG. 16, as food ingredients are in contact with the ingredient-guiding plates 42*b*, food ingredient residues may be adhered to the ingredient-guiding plates 42*b*, and the ingredient-guiding plates 42*b* are also required to be flushed. The process of flushing the ingredient-guiding plates 42*b* is as follows: the water falling from the ingredient-containing chamber 40*b* can be guided to the ingredient-guiding opening 420*b* along the ingredient-guiding plates 42*b*, and then fall into the wok 1 from the ingredient-guiding opening 420*b*, so that the ingredient-guiding plates 42*b* can be flushed.

Preferably, when the ingredient feeding device 2 is required to be flushed by the ingredient feeding device spraying piece 21, firstly, the compartment doors 403*b* are closed by the compartment door driving mechanisms 41*b*, the compartment doors 403*b* and the supporting frame 406*b* of the ingredient feeding device 2 are directly flushed by the ingredient feeding device spraying piece 21, and the flushed water flows out by the ingredient-guiding plates 42*b* of the ingredient-guiding shell; and then the compartment doors 403*b* are opened by the compartment door driving mechanisms 41*b*, and the compartment doors 403*b*, the supporting frame 406*b* and the ingredient-guiding plates 42*b* of the ingredient feeding device 2 are directly washed by the ingredient feeding device spraying piece 21.

Figure 6:
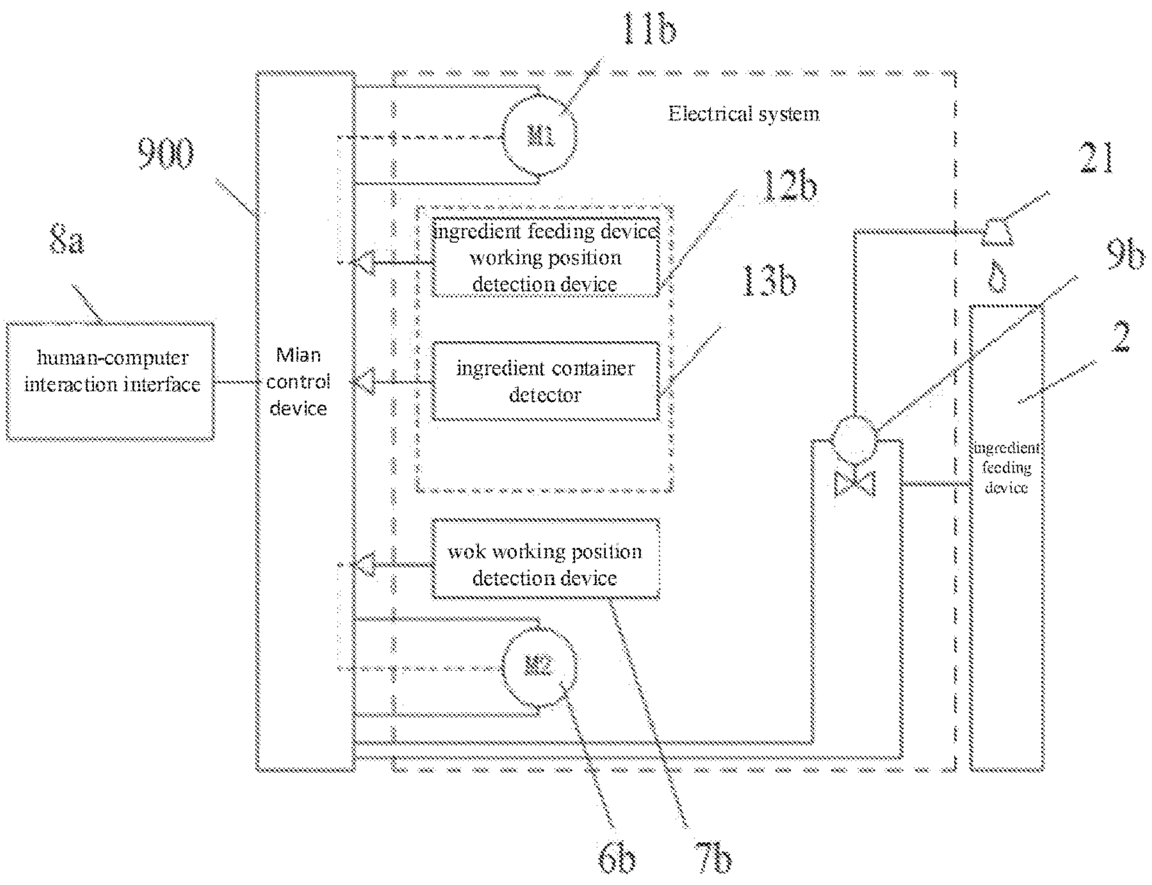
FIG. 6 is an electrical structure block diagram of the cooking machine provided by the first embodiment of the present invention.
Figure 7:
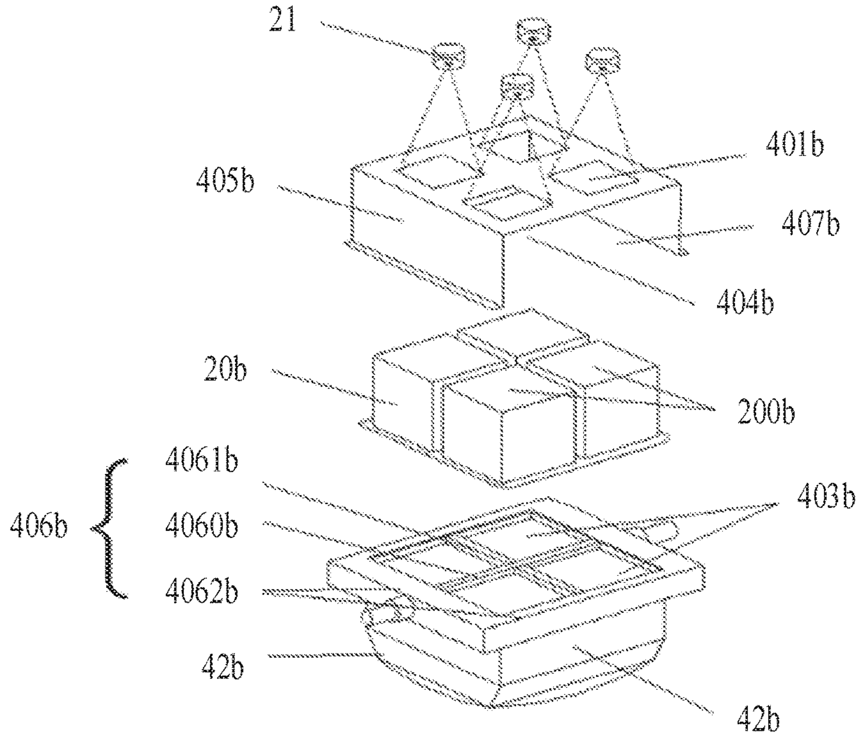
FIG. 7 is a schematic diagram of the structure of the ingredient feeding device shown in FIGS. 4-6.
Figure 8:
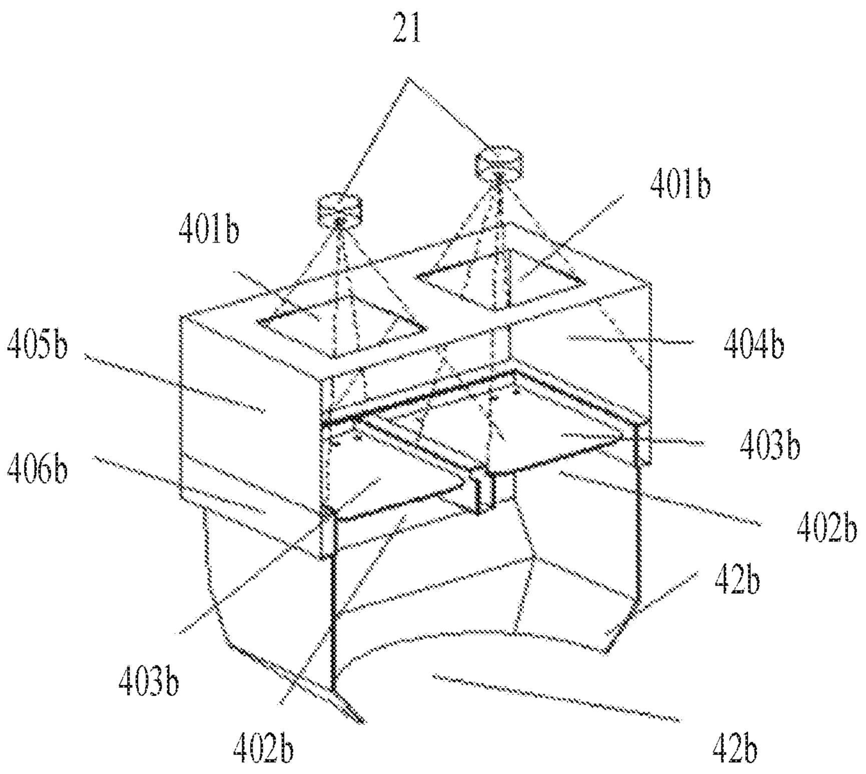
FIGS. 8 and 9 illustrate the opening and closing state of the compartment door of the ingredient feeding device shown in FIG. 7 when the ingredient feeding device is cleaned.

In the embodiment of the present invention, referring to FIGS. 4 and 6, the automatic cooking machine further includes a working position detection device 12*b* electrically connected with the main control device 900, and the working position detection device 12*b* is used for detecting the rotation angle of the ingredient feeding device 2 and sending a detected rotation angle data to the main control device 900. Thus, when the multi-compartment ingredient container 20*b* needs to be received in or taken out of the receiving space 404*b*, the working position detection device 12*b* sends a detected rotation angle data at the moment of the ingredient feeding device 2 to the main control device 900, and the main control device 900 controls the flipping mechanism 11*a* to drive the ingredient feeding device 2 to turn according to the received rotation angle data, so that the ingredient-dropping opening 402*b* is aligned with the wok 1, the water spraying openings 401*b* is aligned with the ingredient feeding device spraying piece 21, and the ingredient-receiving opening 407*b* is aligned with the ingredient container guiding opening 32*a*; at the moment, the multi-compartment ingredient container 20*b* can be put into/taken out of the receiving space 404*b* from ingredient container guiding opening 32*a* and the ingredient-receiving opening 407*b*. When the ingredient feeding device 2 needs to perform a feeding process, the working position detection device 12*b* sends a detected rotation angle data at the moment of the ingredient feeding device 2 to the main control device 900, and the main control device 900 controls the flipping mechanism 11*a* to drive the ingredient feeding device 2 to turn according to the received rotation angle data, so that the multi-compartment ingredient container 20*b* in the ingredient-containing chamber 40*b* is inverted, the food ingredients in the multi-compartment ingredient container 20*b* fall on the compartment doors 403*b*, and the ingredient-dropping openings 402*b* is aligned with the wok 1.

It will be appreciated that when the ingredient feeding device 2 (i.e., the ingredient-containing chamber 40*b*) is stationary, the embodiment does not require the flipping mechanism 11*a*, for example, when the ingredient-containing chamber 40*b* is of a compartment structure, namely the ingredient-containing chamber 40*b* has a plurality of ingredient-containing compartment for stocking food ingredients, the top of each compartment is correspondingly provided with one of the water spraying openings 401*b* which are aligned with the ingredient feeding device spraying piece 21 and allowed external food ingredients to be put into the compartment, the bottom of each compartment is correspondingly provided with an ingredient-dropping opening 402*b* aligned with the wok 1, and each ingredient-dropping opening 402*b* is correspondingly provided with a compartment door 403*b* which is controlled by a corresponding compartment door driving mechanism 41*b* to be open or closed. In this way, a user can directly spray water to each compartment from the inlets/outlets each is aligned with the water spraying openings 401*b* and formed in the inner shell 1*a* and the water spraying openings 401*b*, and in the cleaning process by the ingredient feeding device spraying piece 21, the compartment doors 403*b* can be directly opened without flipping the ingredient feeding device 2.

In the embodiment of the present invention, referring to FIGS. 4 and 6, the automatic cooking machine further includes an ingredient container detector 13*b* electrically connected with the main control device 900, and the ingredient container detector 13*b* is used for detecting whether the multi-compartment ingredient container 20*b* has been taken out of the material ingredient-containing chamber 40*b* and sending detection data to the main control device 900. In a washing process of the full-automatic cooking machine, when the ingredient container detector 13*b* detects that the multi-compartment ingredient container 20*b* has been taken out of the receiving space 404*b*, the main control device 900 sends compartment door opening commands to the compartment door driving mechanisms 41*b*, and the compartment door driving mechanisms 41*b* control the compartment doors 403*b* to be opened according to the commands; and the wok working position conversion motor 6*b* is controlled to drive the wok 1 to turn, so that the opening of the wok 1 is aligned with the ingredient-dropping openings 402*b* (or the ingredient-guiding openings 420*b*), and then the top spraying head switch 9*b* is controlled to supply water to the ingredient feeding device spraying piece 21, so that the ingredient feeding device spraying piece 21 sprays water to clean the ingredient feeding device 2. It should be appreciated that whether the multi-compartment ingredient container 20*b* is taken out of the ingredient-containing chamber 40*b* or not can be confirmed in a manual confirmation mode by a user, and after the user confirms that the multi-compartment ingredient container 20*b* is taken out of the ingredient-containing chamber 40*b*, the user can input a corresponding washing control command through the human-computer interaction interface 8*a* arranged on the automatic cooking machine to wash the ingredient feeding device 2, and the human-computer interaction interface 8*a* is electrically connected with the main control device 900.

Figure 17:
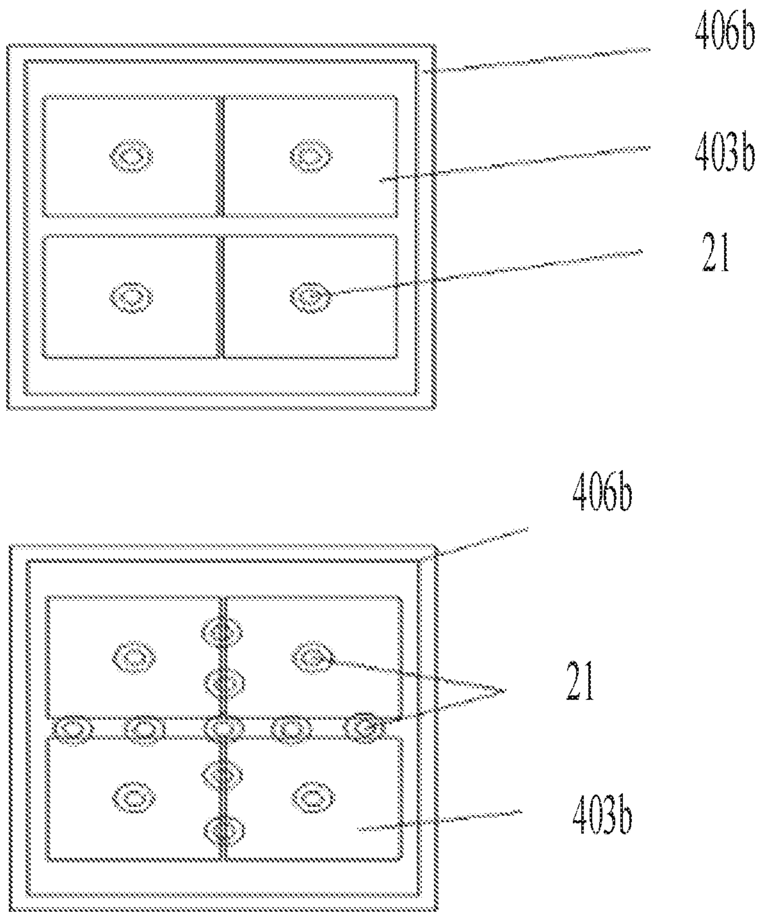
FIGS. 17-20 illustrate different types and arrangements of the ingredient feeding device spraying piece shown in FIG. 4.
Figure 18:
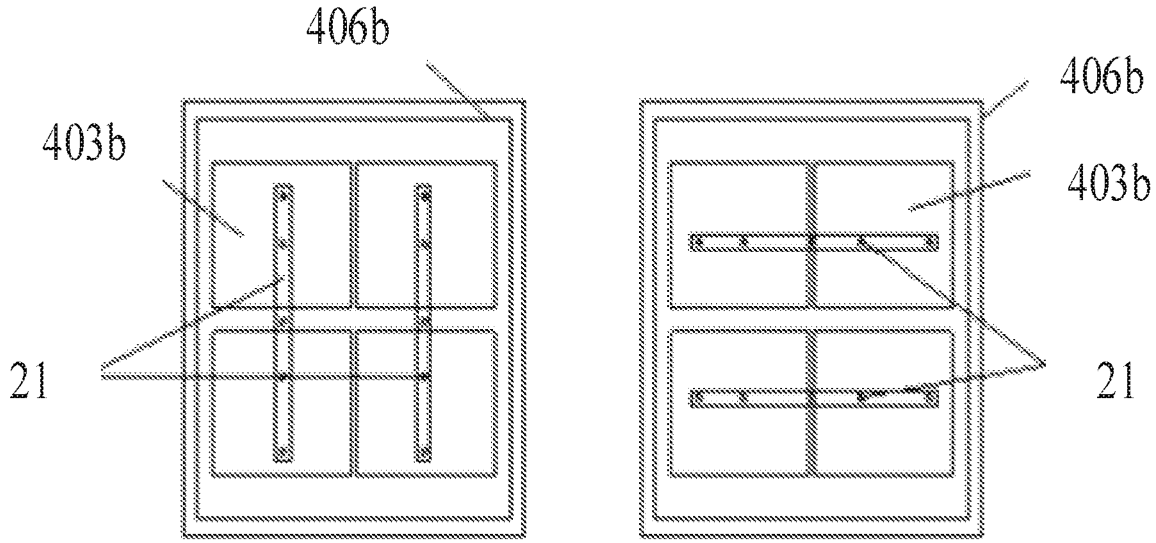
Figure 19:
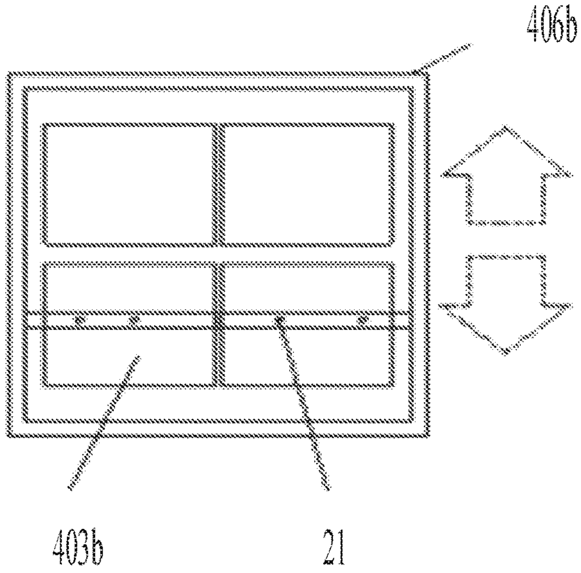
Figure 20:
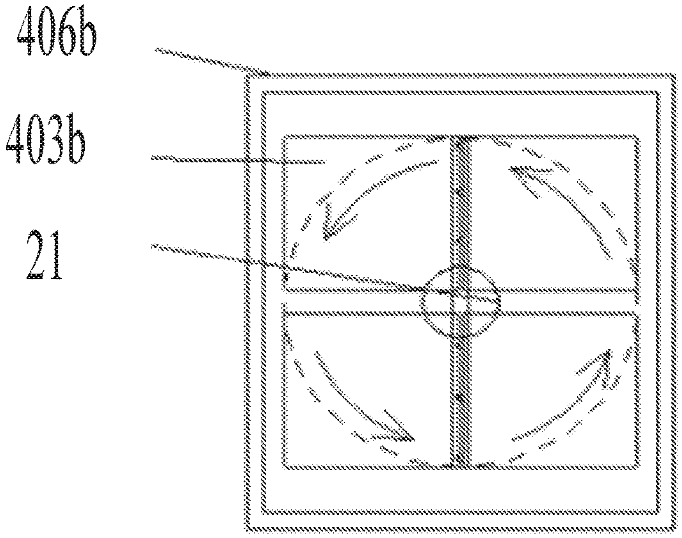
Figure 21:
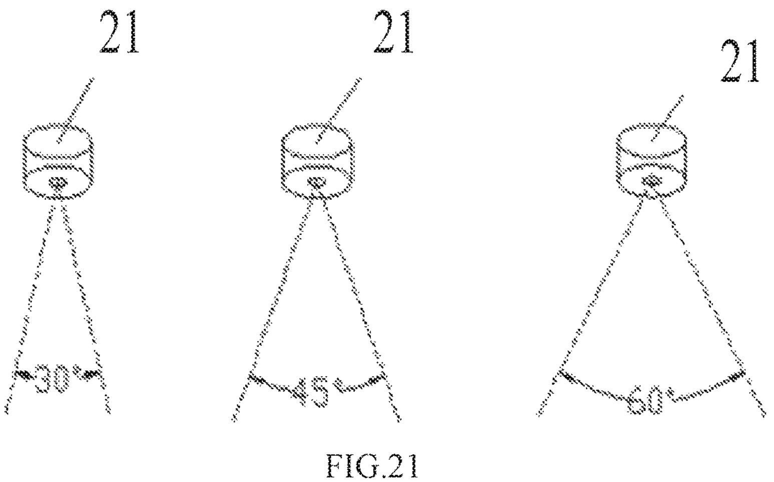
FIG. 21 illustrates the spray angle of the ingredient feeding device spraying pieces shown in FIG. 4.
Figure 22:
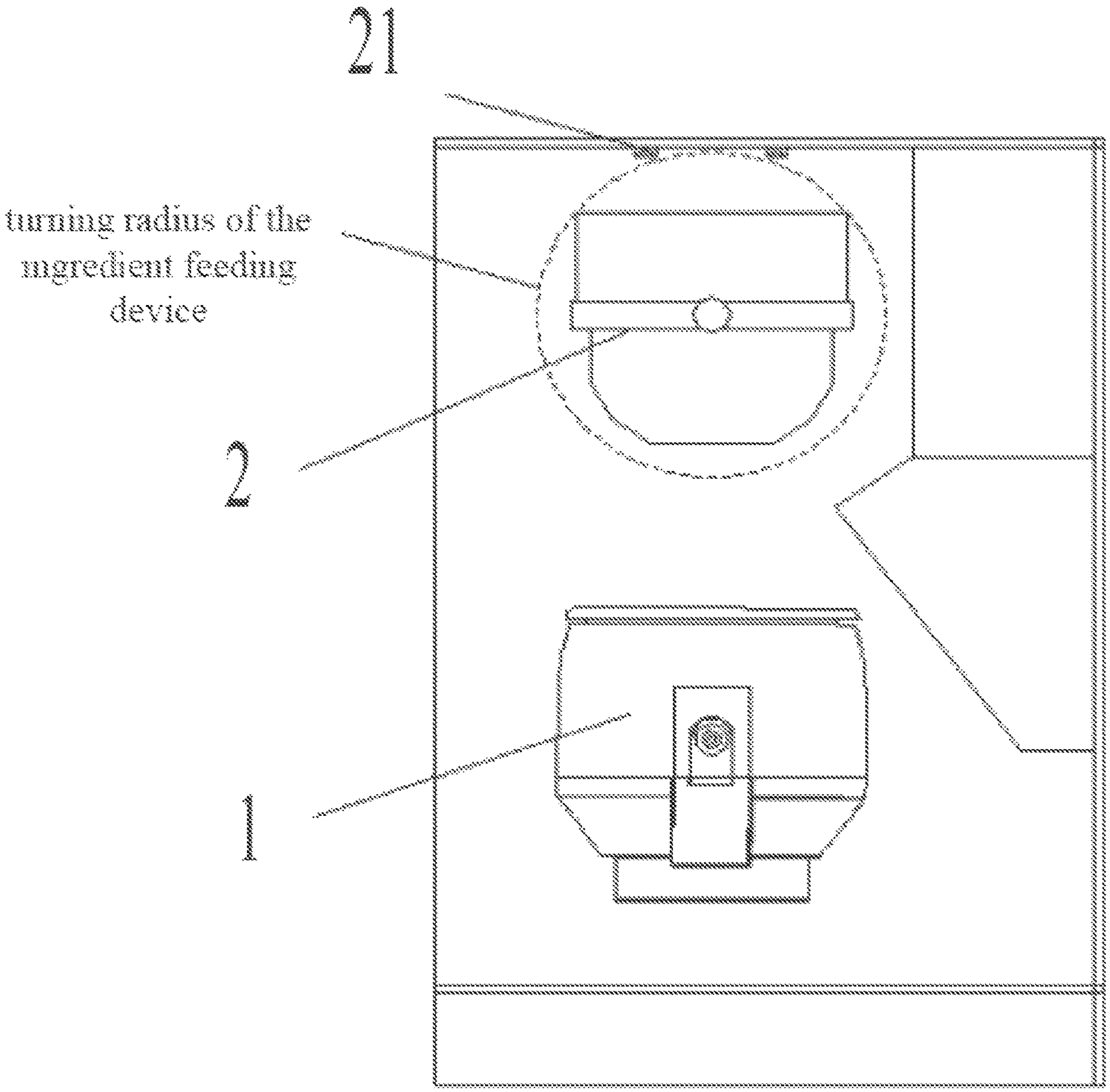
FIGS. 22-23 illustrate the positional relationship of the ingredient feeding device and the ingredient feeding device spraying piece shown in FIG. 4 with respect to each other.

In the embodiment of the present invention, preferably, as shown in FIG. 17, the ingredient feeding device spraying piece 21 can be a fixed independent spraying head or has a plurality of independent spraying heads, and when the plurality of independent spraying heads are adopted, the plurality of independent spraying heads are arranged at the top in the inner shell 1*a* in a matrix manner, and each of the independent spraying heads is corresponding to one or more water spraying openings 401*b*, so that the ingredient feeding device spraying piece 21 can have a better flushing effect on the ingredient feeding device 2. Alternatively, referring to FIG. 18, the ingredient feeding device spraying piece 21 may have pipe type showerheads the number of which can be one or more. When one of the hole pipe type showerheads is adopted, each row or each column of spray-heads on the orifice tube showerhead are aligned with each row or each column of water spraying openings 401*b*. When a plurality of the hole pipe type showerheads are adopted, the hole pipe type showerheads are arranged at the top in the inner shell 1*a* in rows or columns, each row or column of the hole pipe type showerheads are correspondingly aligned with each row or column of water spraying openings 401*b*, and therefore the ingredient feeding device spraying piece 21 can also have a better flushing effect on the ingredient feeding device 2. It should be noted that with reference to FIG. 19, the hole pipe type showerheads may have a reciprocating motion function, and the hole pipe type showerheads enable the spray-heads to spray corresponding to the water spray openings 401*b* in the process of moving back and forth, and at the moment, only one of the hole pipe type showerheads is needed. Alternatively, referring to FIG. 20, the ingredient feeding device spraying piece 21 may have rotary showerheads, the water flow of the rotary showerheads is more concentrated and the water spray pressure is generally higher than the water spray pressure of the independent spraying heads, so that the rotary showerheads have a better flushing effect. When the number of the rotary showerheads is one, the rotary ingredient feeding device spraying piece 21 is arranged at the top in the inner shell 1*a* and is suspended in the geometric center of the multiple water spraying openings 401*b*. In the embodiment, preferably, referring to the FIG. 21, the spraying angle of the ingredient feeding device spraying piece 21 is selected to be 30 degrees or 45 degrees or 60 degrees, and it should be noted that the spraying angle of the ingredient feeding device spraying piece 21 can be other degrees. The spraying angle of the ingredient feeding device spraying piece 21 is determined by the vertical distance between the ingredient feeding device spraying piece 21 and the ingredient feeding device 2. It will be appreciated that, referring to FIG. 22, the setting positions of the ingredient feeding device spraying piece 21 and the ingredient feeding device 2 should take into consideration the turning radius of the ingredient feeding device 2, that is, the ingredient feeding device 2 cannot touch the ingredient feeding device spraying piece 21 during turning.

Figure 23:
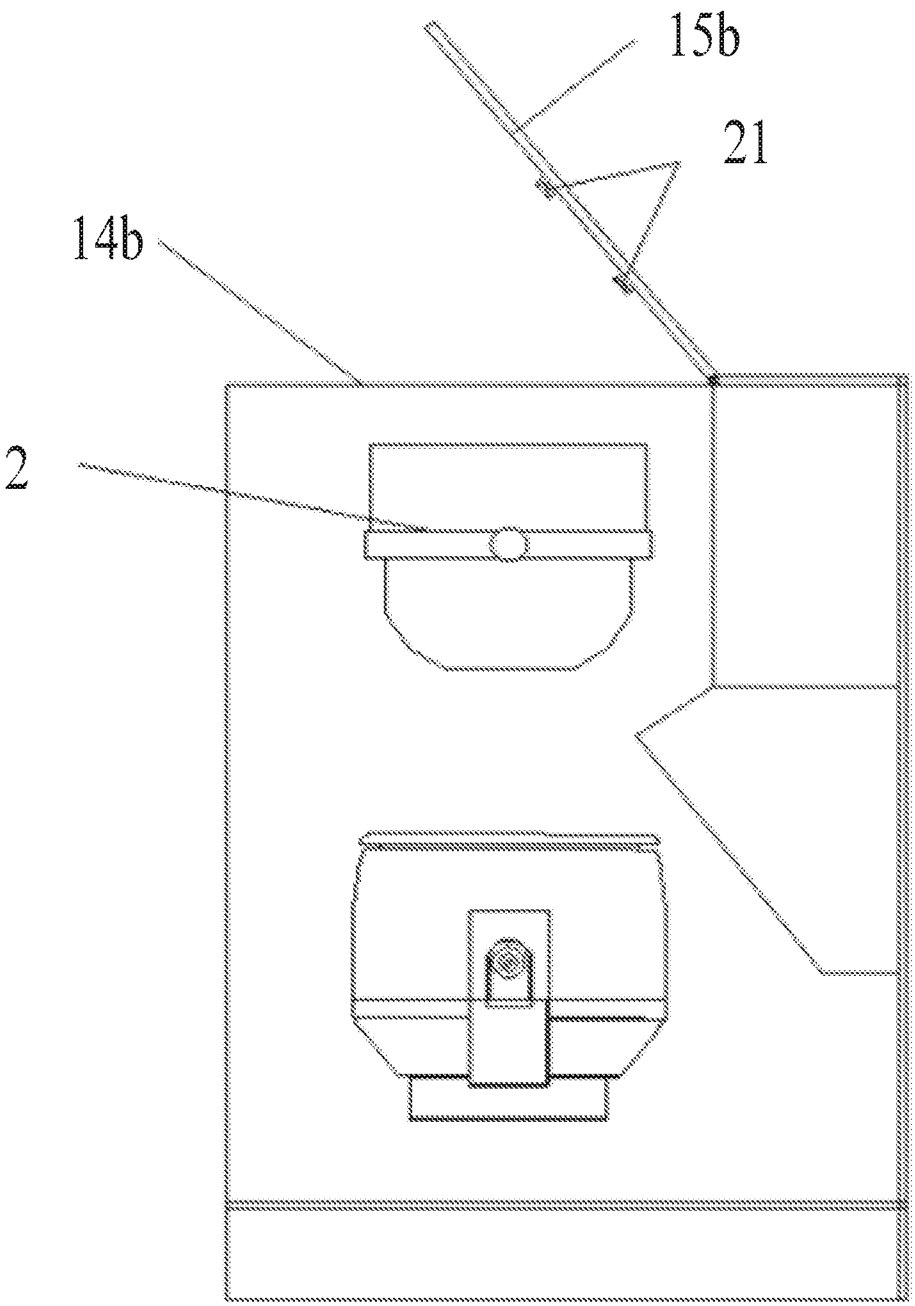

In the embodiment of the present invention, preferably, referring to FIG. 23, a top cover opening 14*b* is formed in the top of the inner shell 1*a*, a top cover door plate 15*b* capable of being opened and closed is arranged at the top cover opening 14*b*, and the top cover door plate 15*b* is provided with the ingredient feeding device spraying piece 21 the inner side wall located in the inner shell 1*a*. The ingredient feeding device spraying piece 21 is communicated with the top spraying head switch 9*b* via a hose arranged outside the inner shell 1*a*, the ingredient feeding device spraying piece 21 can be communicated with the top spraying head switch 9*b* via the hose, and meanwhile the top cover door plate 15*b* can be conveniently opened and closed. Thus, when a user needs to manually wash the ingredient feeding device 2, the user can open the top cover door plate 15*b*, and then wash the ingredient feeding device 2. When the full-automatic cooking machine needs to automatically wash the ingredient feeding device 2, the top cover door plate 15*b* can be closed, and the ingredient feeding device 2 can be washed by the ingredient feeding device spraying piece 21 arranged on the inner side wall of the top cover door plate 15*b*.

In the embodiment of the present invention, preferably, referring to FIGS. 25, 27, 28 and 29, the wok lid driving device 10*a* includes a wok lid rotating mechanism 100*a* and a wok lid push-pull mechanism 101*a* which are both arranged in the cooking fume treatment area 500, and an opening 11*a*' is formed in the inner shell 2*a*. The wok lid rotating mechanism 100*a* comprises a wok lid shaft core 1000*a* and a bearing 1001*a*. The wok lid push-pull mechanism 101*a* comprises a sliding piece 1010*a*, a driving motor 1011*a* electrically connected with the main control device 900 and a base 1012*a* fixed to the inner side of the outer shell 1*a*. An inner ring of the bearing 1001*a* is fixedly connected with an outer ring of the wok lid shaft core 1000*a*, an outer ring of the bearing 1001*a* is fixedly connected with the middle portion of the wok lid 12, and when the wok lid 12 rotates, the outer ring of the bearing 1001*a* rotates in the same direction, the inner ring of the bearing 1001*a* does not move, and the wok lid shaft core 1000*a* does not move either. The sliding piece 1010*a* comprises a fixing part 10102*a* and a rack 10101*a* connected with the fixing part 10102*a*, and the fixing part 10102*a* is fixedly connected with the wok lid shaft core 1000*a*; the base 1012*a* is provided with a sliding groove 100120*a* for the rack 10101*a* to slide, and the rack 10101*a* is arranged in the sliding groove 10120*a*. A rotating shaft of the driving motor 1011*a* is provided with a driving gear 10110*a*, and the driving gear 10110*a* is engaged with the rack 10101*a*, so that the driving motor 1011*a* drives the rack 10101*a* in the sliding groove 10120*a* through the driving gear 10110*a*, and the rack 10101*a* moves back and forth between the cooking cavity 100 and the cooking fume treatment area 500 from the opening 11*a*; and the rack 10101*a* can drive the wok lid 12 to move through the wok lid shaft core 1000*a* and the bearing 1001*a* during moving.

Specifically, the working process that the wok lid 12 covers or leaves the opening of the wok1 is as follows: when the wok lid 12 is required to cover the opening of the work 1, the driving motor 1011*a* drives the driving gear 10110*a* according to a control command of the main control device 900, and the rack 10101*a* will also be driven by the driving gear 10110*a* to move in the sliding groove 10120*a*; the rack 10101*a* drives the wok lid shaft core 1000*a* and the bearing 1001*a* to move through the fixing part 10102*a*, the wok lid 12 fixedly connected with the bearing 1001*a* is made to move towards the opening of the wok 1, and therefore the wok 1 covers the opening of the wok 1, and at the moment, in the stir-frying process, the wok rotating device 14 can drive the wok 1 to rotate according to a control command of the main control device 900, and the center of the wok lid 12 is connected with the wok lid shaft core 1000*a* via the bearing 1001*a*, so that the wok lid 12 covering the opening of the wok 1 can also rotate around the center of the wok lid 12, and normal rotation of the wok 1 can be guaranteed. When the wok lid 12 is required to leave the opening of the wok 1, the driving motor 1011*a* reversely drives the driving gear 10110*a* according to the main control device 900, so that the rack 10101*a* reversely moves in the sliding groove 10120*a*, and meanwhile, the rack 10101*a* drives the wok lid shaft core 1000*a* and the bearing 1001*a* to reversely move through the fixing part 10102*a*; and the wok lid 12 fixedly connected with the bearing 1001*a* moves in the direction far away from the opening of the wok 1, so that the wok lid 12 leaves the opening of the wok 1.

Figure 27:
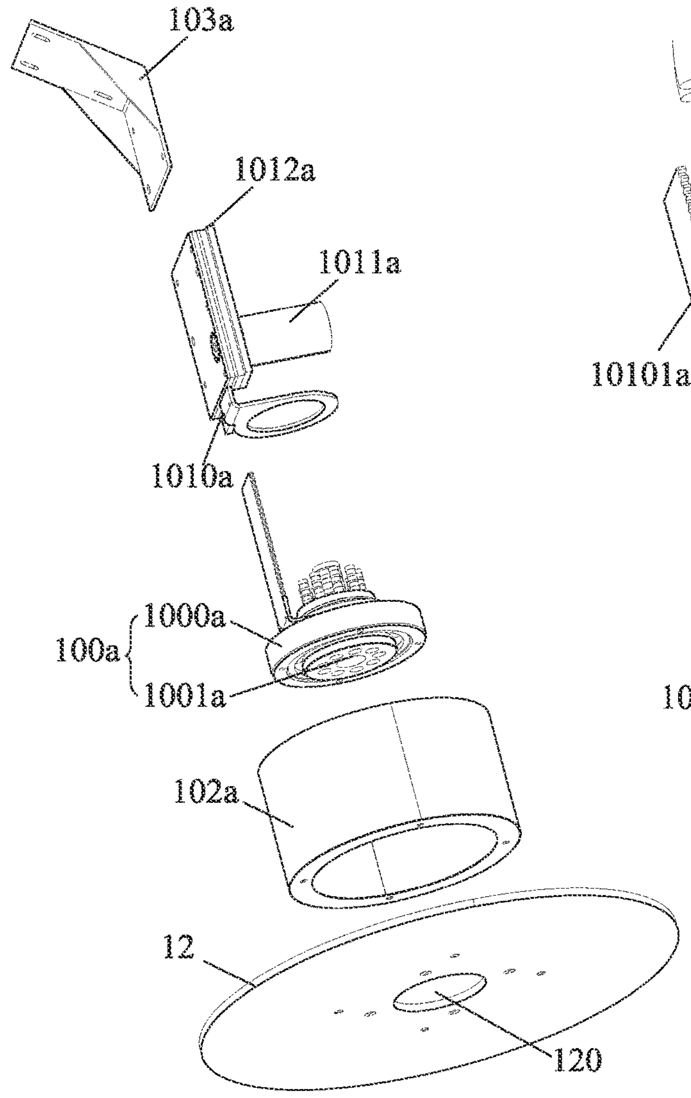
FIG. 27 is a structural schematic view of the wok lid driving device shown in FIG. 3.
Figure 28:
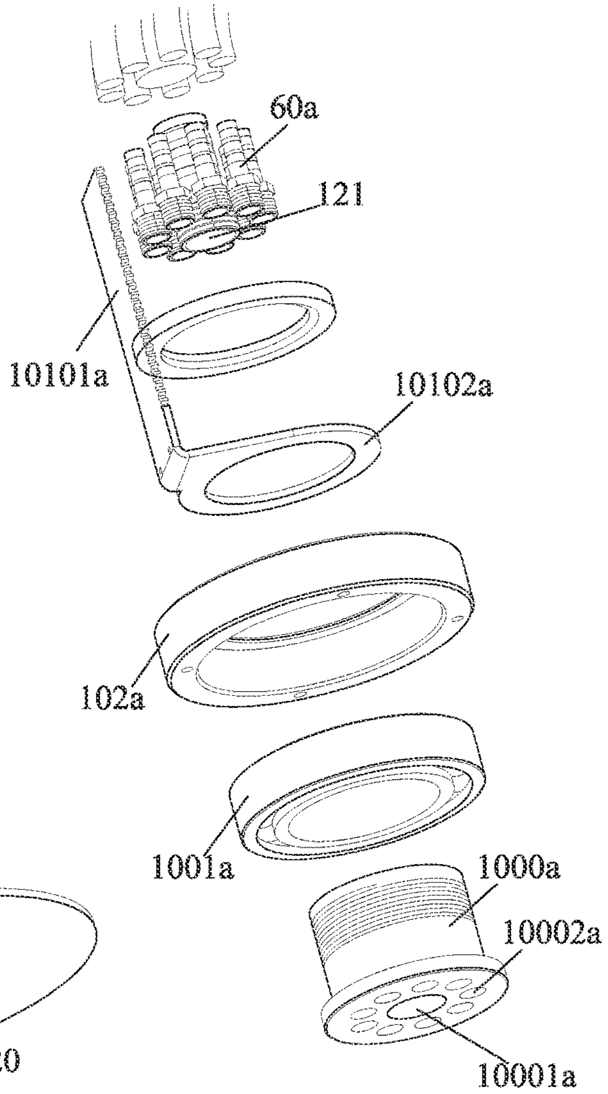
FIG. 28 is a schematic diagram of a connection structure of the wok lid driving device shown in FIG. 27.
Figure 29:
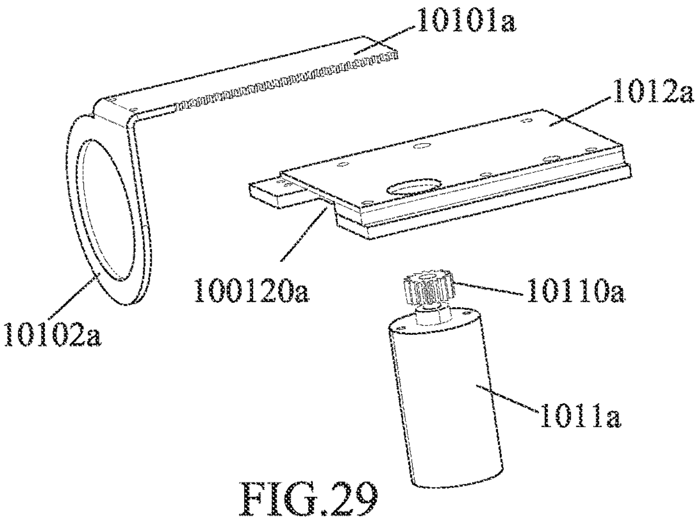
FIG. 29 is a partially exploded structural schematic view of the wok lid driving device shown in FIGS. 27 and 28.

Preferably, referring to FIGS. 27 and 28, an exhaust port 120 is formed in the center of the wok lid 12; the wok lid shaft core 1000*a* is of a hollow structure with an opening in one end, the other end of the wok lid shaft core 1000*a* is provided with a cooking fume opening 10001*a* communicated with the cooking fume inlet end of a cooking fume pipeline 121, the wok lid shaft core 1000*a* is arranged at the exhaust port 120 and does not make contact with the wok lid 12, the inner ring of the bearing 1001*a* is connected with the outer ring of the wok lid shaft core 1000*a*, and the outer ring of the bearing 1001*a* is fixedly connected with the wok lid 12.

More preferably, referring to FIGS. 27 and 28, the other end of the wok lid shaft core 1000*a* is further provided with a plurality of seasoning injection openings 10002*a* communicated with the seasoning injection pipes 60*a*, so that when the automatic seasoning adding device supplies certain seasoning to the corresponding seasoning injection pipes 60*a* according to the control command of the main control device 900, the seasoning injection pipe 60*a* can inject seasoning into the wok 1 covered by the wok lid 12 from the corresponding seasoning injection opening 10002*a*.

Preferably, the cooking fume opening 10001*a* is formed in the center of the other end of the wok lid shaft core 1000*a*, and the seasoning injection openings 10002*a* surround the cooking fume opening 10001*a*.

More preferably, referring to FIGS. 27 and 28, the wok lid driving device 10*a* further comprises the annular fastener 102*a*, the center of the annular fastener 102*a* is aligned with the exhaust port 120, the inner ring of the annular fastener 102*a* is fixedly connected to the outer ring of the bearing 1001, the bottom of the annular fastener 102*a* is connected to the wok lid 12, that is, the bearing 11001*a* is used for fixing the wok lid 12 through the annular fastener 102*a*, and meanwhile, the annular fastener 102*a* can surround the bearing 1001*a* and the wok lid shaft core 1000*a*, so that the bearing 1001*a* and the wok lid shaft core 1000*a* can be protected.

In the embodiment of the present invention described above, further referring to FIG. 27, the wok lid driving device 10*a* further comprises a base install piece 103*a* by means of which the base 1012*a* is installed on the inside of the outer shell 1*a*.

Figure 30:
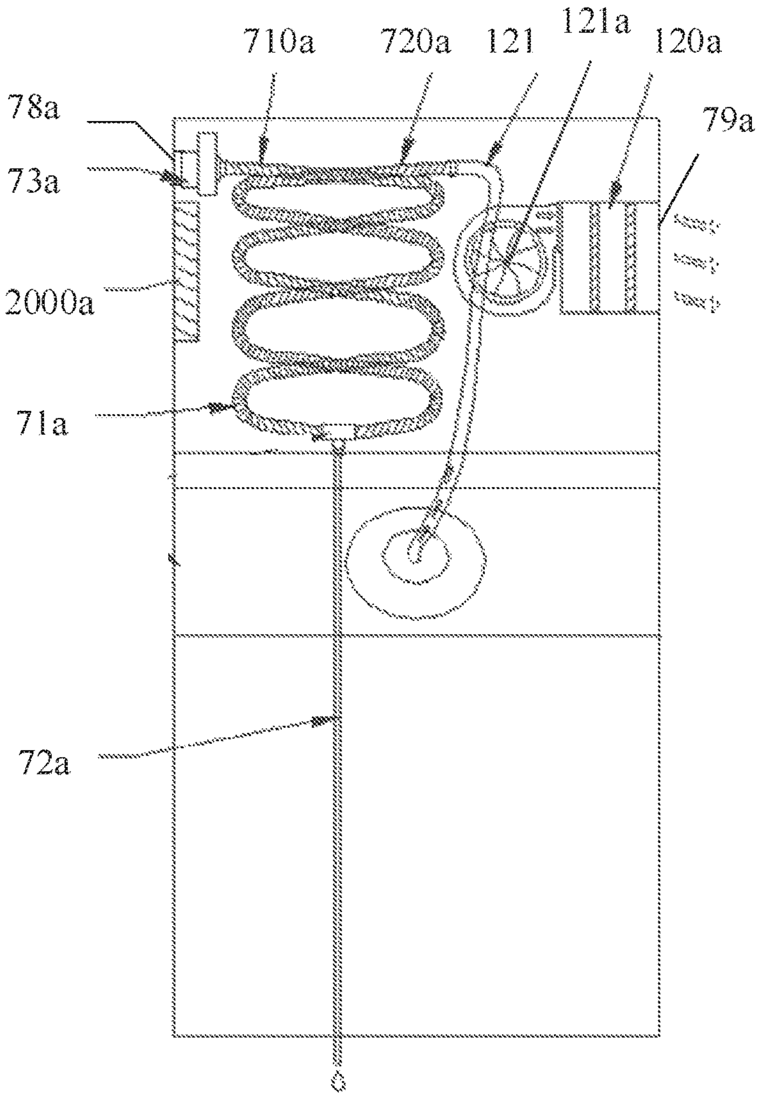
FIG. 30 is a schematic structure diagram of the first cooking fume treatment device and the second cooking fume treatment device provided by the embodiment of the present invention.

As a further improved embodiment, referring to FIG. 30, the first cooking fume treatment device 7*a* comprises a cooking fume pipeline 121, a condensation pipe 71*a*, a condensate collector 72*a* and a pipeline fan 73*a* electrically connected with the main control device 900. A cooking fume inlet end of the cooking fume pipeline 121 is arranged at the exhaust port 120 formed in the wok lid 12, an cooking fume outlet end of the cooking fume pipeline 121 is connected with a cooking fume inlet end of the condensation pipe 71*a*, a cooking fume outlet end of the condensation pipe 71*a* is connected with a cooking fume exhaust end of the pipeline fan 73*a*, and a cooking fume exhaust end of the pipeline fan 73*a* is arranged at a first cooking fume exhaust port 78*a* formed in the outer shell 1*a*. The pipe section of the condensation pipe 71*a* is distributed up and down, the condensate collector 72*a* is communicated with the lowest part of the condensation pipe 71*a*, and the condensate collector 72*a* is arranged below the condensation pipe 71*a*. The pipeline fan 73*a* works according to a control command of the main control device 900, so that negative pressure is formed at the first exhaust port 78*a*, and cooking fume in the wok 1 is discharged from the cooking fume pipeline 121, the condensation pipe 71*a* and the first exhaust port 78*a* in sequence; due to the fact that the temperature of the cooking fume directly coming out of the wok 1 is high, the high-temperature cooking fume can be cooled by the condensation pipe 71*a* and then discharged, the high-temperature cooking fume is prevented from damaging the pipeline fan

73*a*, and the phenomenon that the discharged high-temperature cooking fume possibly hurts people is avoided. Condensate in the condensation pipe 71*a* is collected by the condensate collector 72*a* and discharged out. It should be noted that the cooking fume pipeline 121 is made of a material (such as metal or alloy) with a high temperature resistance characteristic; the condensation pipe 71*a* can be made of metal materials and can cool rapidly with the characteristics of metal, so that the condensation efficiency is high, and the effect is good.

Specifically, the condensate collector 72*a* is connected to a break or an open hole in the middle portion of the condensation pipe 71*a*. Preferably, the condensate collector 72 may comprise a reservoir (not shown) and a drain control valve (not shown).

Further, the first cooking fume treatment device 7*a* further comprises a cooling device for cooling the condensation pipe 71*a*. Preferably, referring to the FIG. 8, the cooling device comprises a cooling fan 2000*a*, the cooling fan 2000*a* is arranged in a fan opening formed in the outer shell, and the fan opening is aligned with the condensation pipe 71*a* and communicated with the cooking fume treatment area 500. It should be noted that the cooling device can also be a cooling water tank (not shown) arranged in the cooking fume treatment area 500, and the condensation pipe 71*a* is arranged in the cooling water tank.

Preferably, referring to FIG. 30, the condensation pipe 71*a* comprises a first condensation pipe 710*a* and a second condensation pipe 720*a* which are arranged in the vertical direction, the cooking fume inlet end of the first condensation pipe 710*a* is connected with the cooking fume outlet end of the cooking fume pipeline 121, and the cooking fume outlet end of the first condensation pipe 710*a* is connected with the cooking fume inlet end of the second condensation pipe 720*a*. The cooking fume outlet end of the second condensation pipe 720*a* is connected with the cooking fume inlet of the pipeline fan 73*a*, and the condensate collector 72*a* is arranged at the juncture of the first condensation pipe 710*a* and the second condensation pipe 720*a*.

Preferably, the first condensation pipe 710*a* and the second condensation pipe 720*a* are serpentine condensation pipes. Preferably, the first condensation pipe 710*a* and the second condensation pipe 720*a* are symmetrically distributed in a mutually crossed manner. The first condensation pipe 710*a* and the second condensation pipe 720*a* joint at a condensate collector 72*a*, and the condensate collector 72*a* is connected with a liquid discharge pipe. The liquid discharging pipe vertically extends downwards and is used for discharging the condensed liquid collected by the condensate collector 72*a* out of the outer shell 1*a* for treatment. In the using process, negative pressure is generated in the first condensation pipe 710*a* and the second condensation pipe 720*a* by the pipeline fan 73*a*, cooking fume enters the first condensation pipe 710*a* from the cooking fume pipeline 121, part of cooking fume is condensed into liquid to flow into the condensate collector 72*a*, and the other part of cooking fume continues to enter the second condensation pipe 720*a* to be condensed under negative pressure. Therefore, the condensation efficiency can be greatly improved by the design of the double condensation pipes 71*a*.

In the embodiment of the present invention, further referring to FIG. 30, the cooking machine further comprises a second cooking fume treatment device 12*a* arranged in the outer shell 1*a*, the second cooking fume treatment device 12*a* comprises a cooking fume filter 120*a* and an exhaust fan 121*a* electrically connected with the main control device 900. An exhaust opening of the exhaust fan 121*a* is communicated with the cooking cavity 100 (a cavity cooking fume outlet 1400*a* is formed in the inner shell 2*a* and correspondingly communicated with the exhaust opening), a cooking fume outlet of the exhaust fan 121*a* is communicated with a cooking fume inlet of the cooking fume filter 120*a*, and a cooking fume outlet of the cooking fume filter 120*a* is formed in a second exhaust port 79*a* formed in the outer shell 1*a*. The exhaust fan 121*a* can be used for pumping cooking fume in the cooking cavity 100 into the cooking fume filter 120*a*, and the cooking fume is discharged after being treated by the cooking fume filter 120*a*. Therefore, the cooking fume leaking from the wok 1 into the cooking area can be treated, and it is further guaranteed that the cooking fume is prevented from polluting the interior of the intelligent cooking machine.

Figure 37:
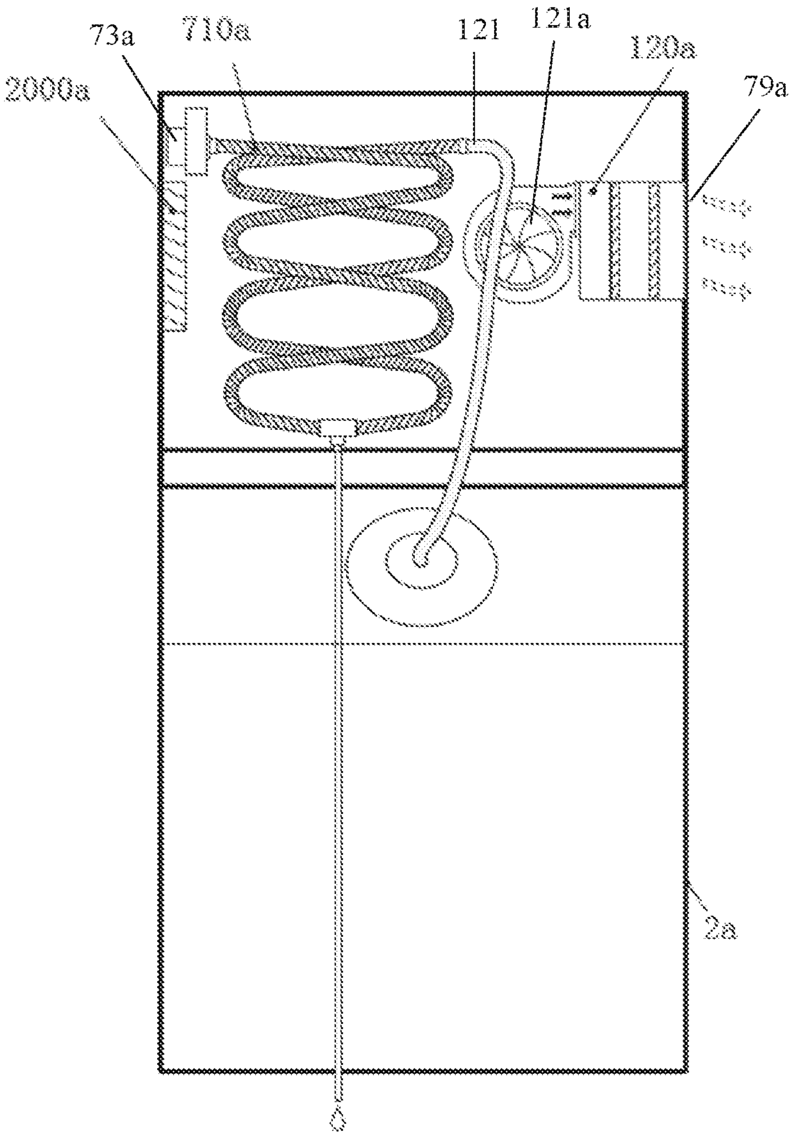
FIGS. 37-38 are schematic diagrams of structures of another cooking fume treatment system provided by the present embodiment.
Figure 38:
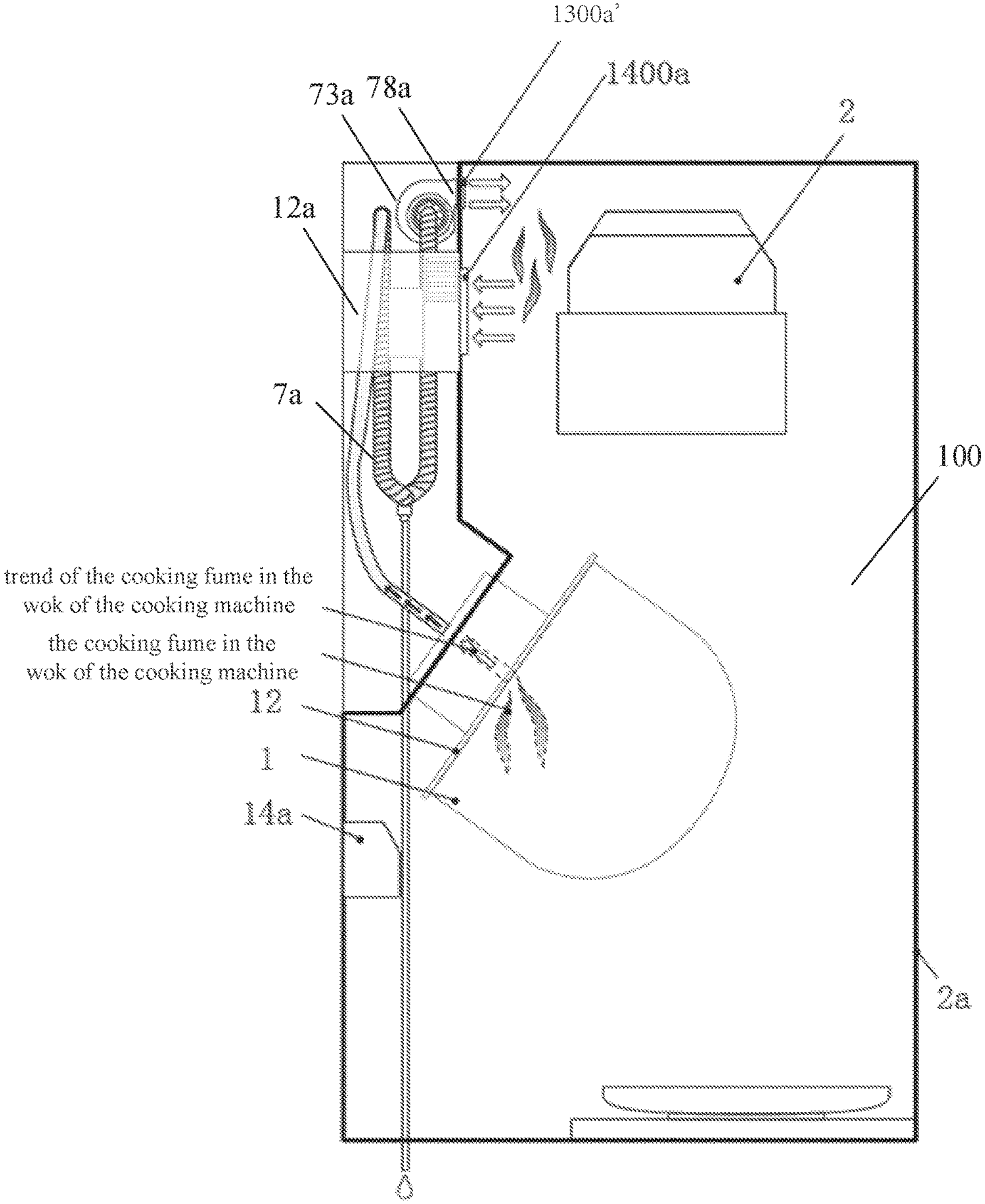

As a further improved embodiment of the cooking fume treatment system, referring to FIGS. 37 and 38, a first exhaust port 78*a* of the first cooking fume treatment device 7*a* is improved to be communicated with a closed cooking cavity 100 in the inner shell 2*a* (an exhaust gas return port 1300*a*' correspondingly communicated with the first exhaust port 78*a* in a sealed manner is formed in the inner shell 2*a*), the cooking fume treated by the first cooking fume treatment device 7*a* is not directly discharged to the outside, but is discharged back into the cooking cavity 100 from the first exhaust port 78*a*; then, the second cooking fume treatment device 12*a* performs secondary purification treatment on cooking fume waste gas (including cooking fume gas escaping from the wok and cooking fume gas treated by the first cooking fume treatment device 7*a* and discharged to the cooking cavity 100) in the cooking cavity 100, and then the cooking fume waste gas is discharged to the outside only from a second exhaust port 79*a* of the second cooking fume treatment device 12*a*.

Therefore, according to the cooking fume treatment system disclosed by the embodiment of the present invention, the closed cooking cavity 100 is formed in the inner cavity of the inner shell 2*a*, the wok device (comprising the wok and the wok lid) is arranged in the closed cooking cavity 100, and the wok is closed by the wok lid during cooking, so that a first-layer closed cooking space is formed in the inner cavity of the wok; cooking fume generated during closed cooking of the wok 1 is discharged to the first cooking fume treatment device 7*a* for treatment from the exhaust port 120 of the wok lid 12; in addition, under a second-layer of closed cooking space of the sealed cooking cavity 100, even if the cooking fume gas escaping from the wok 1 in the cooking process is limited in the cooking cavity and is exhausted after being purified, and the situation that the cooking fume generated in the cooking process is directly exhausted outwards to pollute the surrounding environment is avoided. In addition, compared with the kitchen space, the volume of the cooking area is small, so that the cooking fume purification treatment efficiency can be greatly improved. As a further improvement scheme, a cooking fume outlet of a pipeline fan of the first cooking fume treatment device 7*a* is communicated with the cooking cavity 100, that is, waste gas exhausted from the cooking fume treatment area is exhausted into the cooking cavity 100, and the second cooking fume treatment device can perform secondary purification treatment on cooking fume gas escaping from the cooking equipment and cooking fume gas exhausted from the first cooking fume treatment device 7*a*, therefore, the purification efficiency is high, and the purification effect is better.

Referring to FIG. 3, the automatic cooking machine further comprises the draining device 13*a* and an automatic wok washing device 14*a* used for washing the wok 1. A draining area 15*a* is additionally formed between the bottom of the outer shell 1*a* and the bottom of the inner shell 2*a*; the automatic wok washing device 14*a* is arranged in the cooking cavity 100; the draining device 13*a* is arranged at the draining area 15*a* and located below the wok 1, a wok washing liquid collecting opening 1301*a* communicated with the cooking cavity 100 is formed in the top of the draining device 13*a*, and the bottom of the draining device 13*a* is communicated with a draining opening 200 formed in the outer shell 1*a*; the automatic wok washing device 14*a* is electrically connected with the main control device 900 so as to receive a control command sent by the main control device 900 according to a preset recipe program and perform corresponding operation according to the control command.

Specifically, the working process of washing the wok 1 is as follows: after the intelligent cooking machine finishes a dish discharging process, the wok working position controlling device drives the wok 1 to turn according to a control command of the main control device 900, so that the opening of the wok 1 faces the automatic wok washing device 14*a*, and the automatic wok washing device 14*a* is used for washing the wok 1; the automatic wok washing device 14*a* sprays water to the wok 1 according to a control command of the main control device 900 to wash the wok 1, wok washing liquid in the wok 1 can be poured into the wok washing liquid collecting opening 1301*a* to enter the draining device 13*a*, and then the wok washing liquid in the draining device 13*a* is drained out from the draining opening 200.

Figure 31:
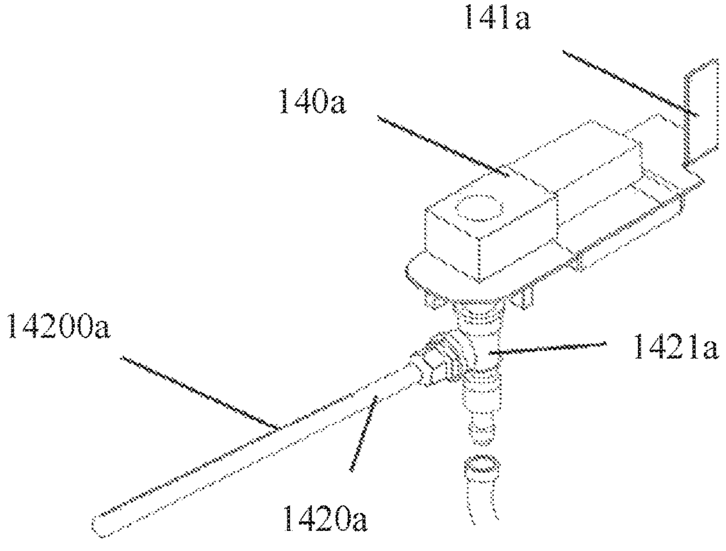
FIG. 31 is a perspective view of the automatic wok washing device shown in FIG. 3.
Figure 32:
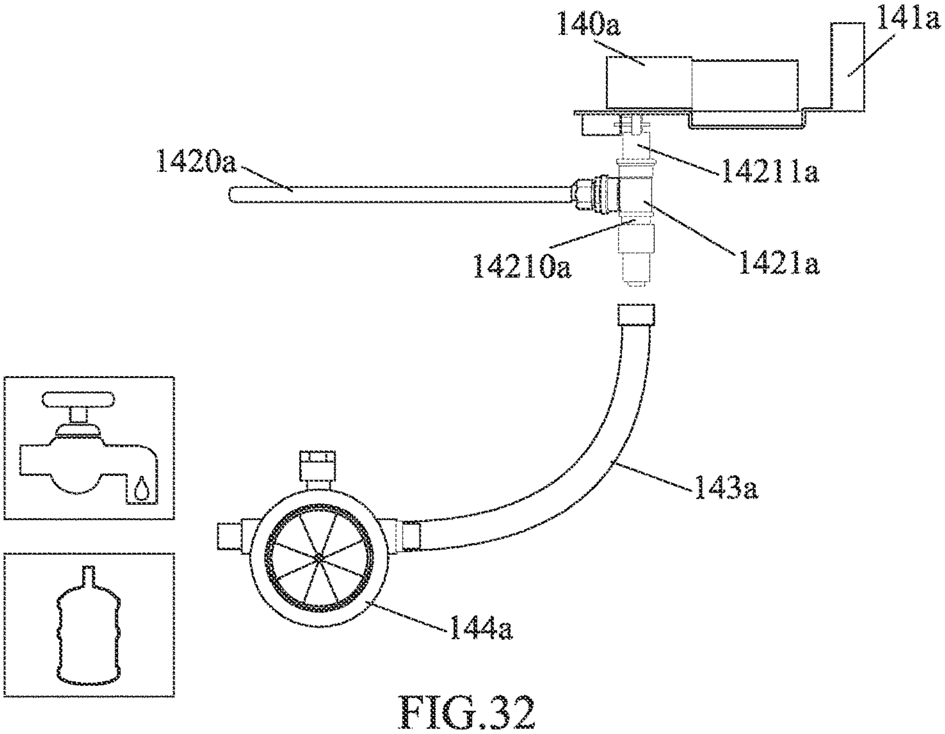
FIG. 32 is a schematic diagram of the structure of the automatic wok washing device shown in FIG. 3.
Figure 33:
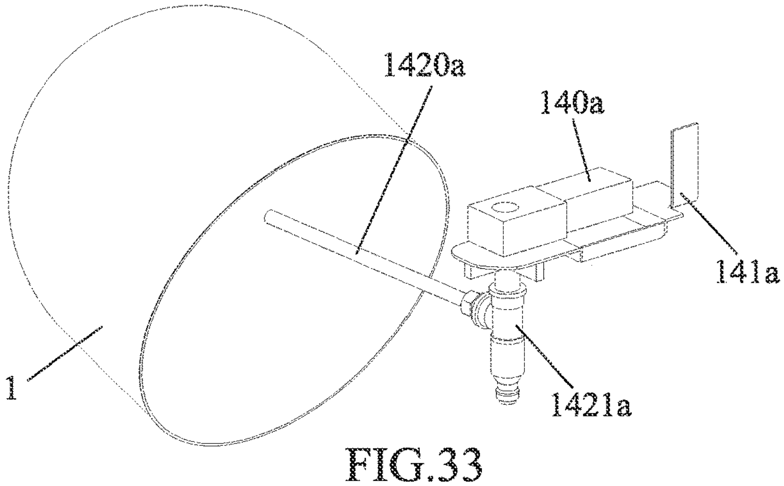
FIG. 33 is a state diagram of the automatic wok washing device shown in FIGS. 31 and 32 for washing the wok.

Preferably, referring to FIGS. 31 and 32, a placement opening 17*a* communicated with the cooking cavity 100 is formed in a position of a side portion of the inner shell 2*a* close to the wok 1, and the automatic wok washing device 14*a* is arranged at the placement opening 17*a*; the automatic wok washing device 14*a* comprises a first driving unit 140*a*, a fixing frame 141*a* and a wok spraying piece 11; the first driving unit 140*a* is electrically connected with the main control device 900 and installed on the fixing frame 141*a*; the fixing frame 141*a* is arranged at the position of the placement opening 17*a*. The wok spraying piece 11 comprises a cleaning pipe 1420*a* and a rotatable pipe joint 1421*a*; the cleaning pipe 1420*a* is connected with the first driving unit 140*a* via the pipe joint 1421*a*, and the first driving unit 140*a* drives the pipe joint 1421*a* to rotate, so as to drive the cleaning pipe 1420*a* to rotate into the wok 1 or rotate out of the wok 1; one end of the cleaning pipe 1420*a* is communicated with the pipe joint 1421*a*, and the other end of the cleaning pipe 1420*a* is closed; and a plurality of water outlet holes 14200*a* for washing the inner wall of the wok 1 are formed in the cleaning pipe 1420*a*.

Figure 11:
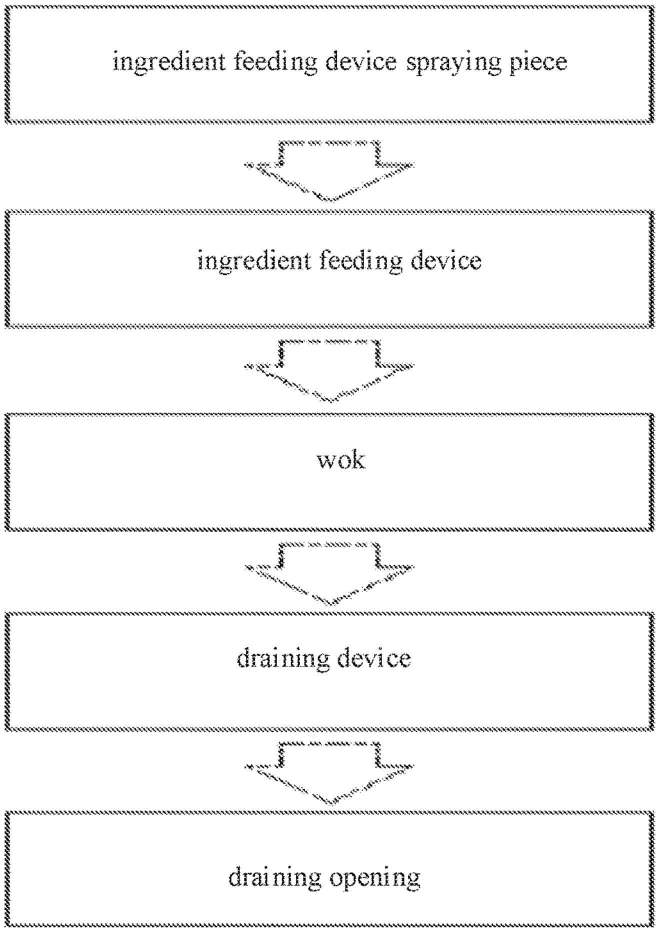
FIG. 11 is a water flow schematic diagram of the cooking machine provided by the embodiment of the present invention when the ingredient feeding device in the cooking machine is cleaned.
Figure 12:
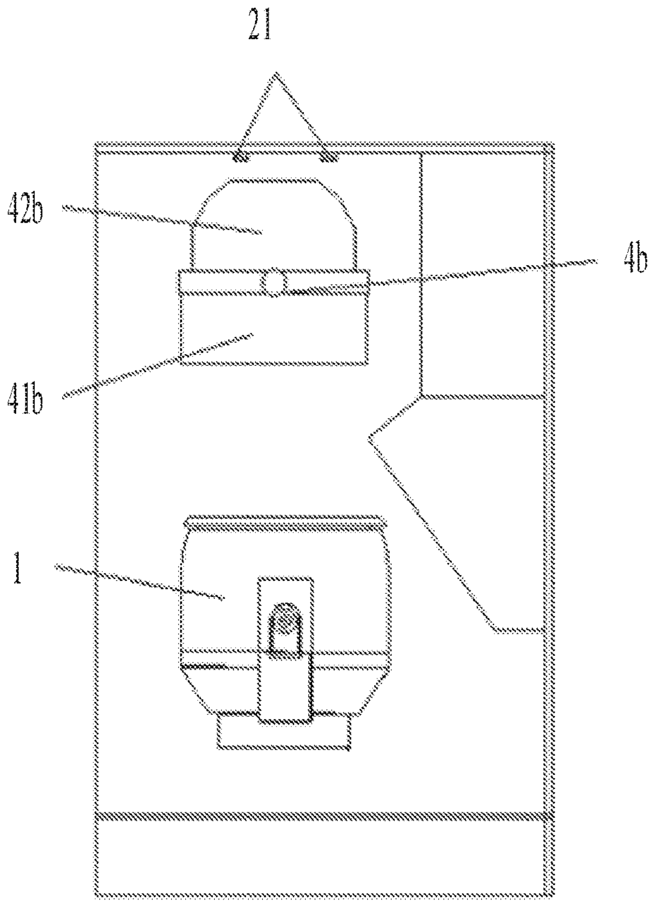
FIG. 12 is a schematic view of the multi-compartment container shown in FIG. 10 being placed into or removed from an ingredient-dropping chamber.
Figure 13:
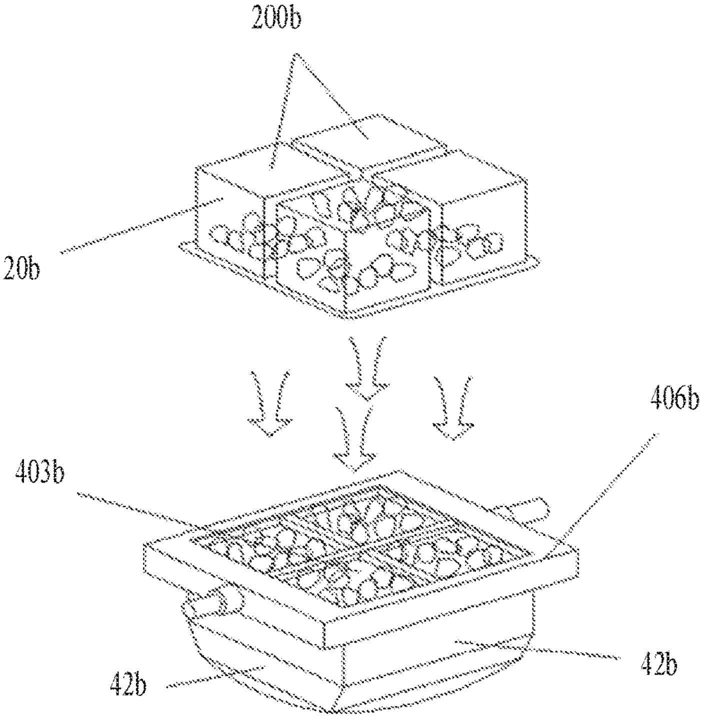
FIG. 13 is a schematic view of the multi-compartment container shown in FIG. 10 when inverted.

Based on the technical scheme, the washing work process of the automatic wok washing device 14*a* on the wok 1 is specifically as follows: when the wok 1 needs to be washed, the wok working position controlling device drives the wok 1 to urn according to the control command of the main control device 900, so that the opening of the wok 1 faces the automatic wok washing device 14*a*, and the wok 1 is automatically washed. At the moment, the main control device 900 controls the first driving unit 140*a* to rotate the cleaning pipe 1420*a* of the wok spraying piece 11 into the wok 1 (as shown in FIG. 11, the preferable scheme is that the cleaning pipe 1420*a* rotates to be close to the inner side wall of the wok of the wok 1 and the water outlet holes 14200*a* are aligned with the inner side wall of the wok 1). At the moment, external cleaning liquid such as water enters the cleaning pipe 1420*a* from the water inlet and then is sprayed to the inner wall of the wok from the water outlet holes 14200*a* of the cleaning pipe 1420*a* to complete washing of the inner wall of the wok. After the washing process of the wok 1 is completed, the main control device 900 controls the first driving unit 140*a* to rotate the cleaning pipe 1420*a* to be away from the wok 1, namely the cleaning pipe 1420*a* is withdrawn, and therefore the whole washing process is completed. Therefore, the automatic wok washing device 14*a* for the cooking machine not only can be matched with the automatic cooking machine to achieve the automatic washing function on the wok 1, but also is simple in structure, very convenient to use and high in automation degree, and is an important auxiliary device capable of continuously working of the cooking machine.

Further, referring to FIG. 32, in a preferred embodiment, the automatic wok washing device 14*a* further includes a pipeline 143*a* and a second driving unit 144*a* (e.g., a water pump or a water valve) electrically connected to the main control device 900, a water inlet of the pipe joint 1421*a* is connected to the external water supply end via the pipe 143*a*, and the second driving unit 144*a* is installed on the pipeline 143*a*.

Further, in this embodiment, referring to FIGS. 31 and 32, the pipe joint 1421*a* comprises an adapter 14210*a* and a linkage joint 14211*a* rotatably connected with the adapter 14210*a*, the water outlet and the water inlet are both formed in the adapter 14210*a*, the first driving unit 140*a* is connected with the linkage joint 14211*a*, and the opening and closing state between the first driving unit 140*a* and the pipe joint 1421*a* is further optimized; when the main control device 900 sends control command of putting down the cleaning pipe 1420*a* and judges that the cleaning pipe 1420*a* reaches the corresponding putting-down state, the main control device 900 controls the second driving unit 144*a* arranged on the pipeline 143*a* to be opened and makes the cleaning pipe 1420*a* start to work by spraying water to carry out the cleaning work. Therefore, the first driving unit 140*a* can more flexibly control the opening or closing of the pipe joint 1421*a* through the connecting joint and the adapter 14210*a*; the water inlet of the pipe joint 1421*a* is provided with a rotatable sealing connector which is connected with the pipeline 143*a* and realizes opening or closing of the pipeline 143*a* through rotation, so that water in the pipeline 143*a* is mainly prevented from leaking at the water inlet and the like; the sealing connector is preferably a rotatable sealing connector, so that the pipeline 143*a* is more conveniently connected with the water inlet.

Figure 34:
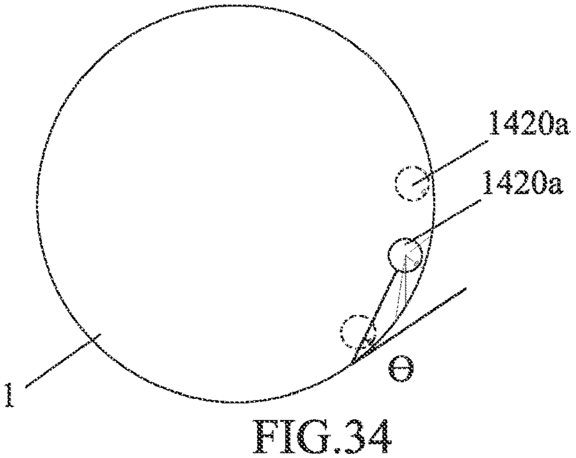
FIG. 34 shows the specific positional relationship of the cleaning tube in FIGS. 31 and 32 with the inner side wall of the wok.

Further, in this embodiment, as shown in FIG. 31, a plurality of the water outlet holes 14200*a* are uniformly arranged in at least one column in the direction in which one end of the cleaning pipe 1420*a* extends toward the other end thereof, mainly for uniform spraying of water at the water outlet holes 14200*a* during cleaning; meanwhile, a water curtain spray head is further arranged at each of the water outlet holes 14200*a* of the cleaning pipe 1420*a*, so that the water in the pipeline 143*a* is buffered, the water is not prone to splashing, and more importantly, the water can form a divergent water curtain similar to a watering sprinkler after passing through the water curtain spray head, so that the cleaning effect is better; further, the water outlet holes 14200*a* are evenly distributed in a side, close to the inner wall of the wok, of the cleaning pipe 1420*a* when the cleaning pipe 1420*a* is in the working state; when the cleaning pipe 1420*a* is put down, the water valve is controlled to be opened by the main control device 900, the cleaning pipe 1420*a* is started to work, water is sprayed, and washing work is performed, so that a more obvious cleaning effect is achieved. Referring to FIG. 34, further, the water spraying holes are evenly distributed towards the front lower portion of one side of the inner wall of the wok, an included angle formed between the water outlet direction of each of the water outlet holes 14200*a* or the straight line where the axis direction of each of the water outlet holes 14200*a* is located and the tangent line of the inner wall of the wok is 0 (0°<0<90°), and a certain tangent angle is maintained with the wok inner wall. Thus, the residues in the wok can be combined together along water flow sprayed from the cleaning pipe 1420*a* to be washed consistently, and the optimal flushing effect is achieved. One end, close to the water outlet, of the cleaning pipe 1420*a* is not provided with the water outlet holes 14200*a*, so that the cleaning pipe 1420*a* is mainly prevented from spraying water out of the wok during cleaning, meanwhile, in the embodiment, the adapter 14210*a* can only change the angle of the cleaning pipe 1420*a* in the horizontal direction, and if the position of the cleaning pipe 1420*a* is changed to be adjusted up and down, left and right according to the wok, an additional position adjusting device is required to adjust the whole support to change the position.

As shown in FIG. 32, further, in the present embodiment, the second driving unit 144*a* is preferably a high-pressure pump, and since it is laborious to clean food residue, the high-pressure pump is used to pressurize the water in the pipeline 143*a* during cleaning, and the water is ejected from high-pressure water ejection holes of the cleaning pipe 1420*a* to form a high-pressure water curtain. Residues adhered to the inner wall of the wok are washed at high pressure by utilizing the high-pressure water curtain forming a tangent angle with the inner wall of the wok, so that the automatic cooking machine can be quickly cleaned; further, the first driving unit 140*a* is preferably a motor; the pipe joint 1421*a* is preferably a T-shaped pipe joint 1421*a*, so that the pipe joint 1421*a* can perform both a water passing function and a rotating function; the wok spraying piece 11 can further comprise a liquid inlet pipe and a liquid inlet pipe switch, the liquid inlet pipe switch is electrically connected with the main control device 900 and controls the liquid inlet pipe to be opened according to a control command of the main control device 900 so as to inject washing liquid into the wok, and the wok spraying piece 11 is mainly used for washing residues which are difficult to clean and can only be cleaned by the washing liquid.

In the embodiments of the present embodiment described above, preferably, referring to FIGS. 35 and 36, the draining device 13*a* includes a diversion trench 130*a*, a water storage trench 131*a*, a filtering device 132*a* and a draining pipe 133*a*; the diversion trench 130*a* is arranged above the water storage trench 131*a*, the top of the diversion trench 130*a* is provided with the wok washing liquid collecting opening 1301*a*, and the bottom of the diversion trench 130*a* is provided with a diversion outlet 1300*a* leading to the water storage trench 131*b*; the filtering device 132*a* is arranged between the top portion and the bottom portion in the water storage trench 131*a* and is positioned below the diversion outlet 1300*a*; one end of the draining pipe 133*a* is communicated with the bottom in the water storage trench 131*a*, and the other end of the draining pipe 133*a* is communicated with the draining opening 200. On the basis of the structure, waste water discharged during wok washing and water discharging of the cooking machine can enter the water storage trench 131*a* from the wok washing liquid collecting opening 1301*a* by guiding of the flow diversion trench 130*a* and then is filtered in the water storage trench 131*a* by the filtering device 132*a*, and filtered water is discharged from the draining pipe 133*a*; therefore, the filtering device 132*a* can avoid arbitrary discharge of waste water, and then can avoid the pollution to the environment. Moreover, by arranging the water storage trench 131*a* and arranging the filtering device 132*a* in the water storage trench 131*a*, the filtering capacity can be increased, and the filtering efficiency can be improved.

Figure 35:
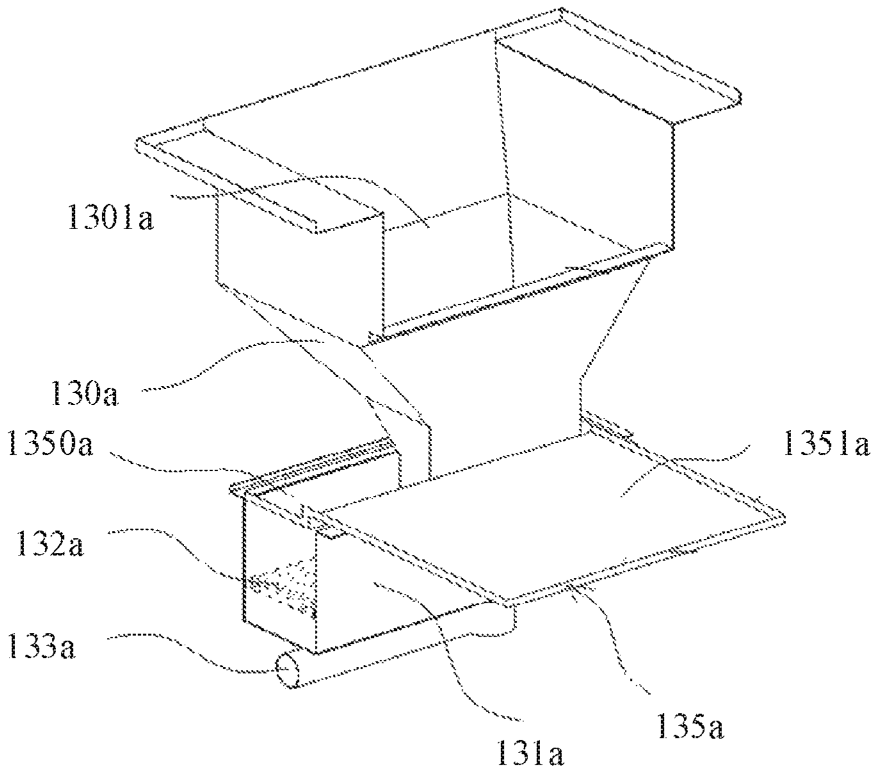
FIG. 35 is a schematic diagram of the structure of the draining device shown in FIG. 3.
Figure 36:
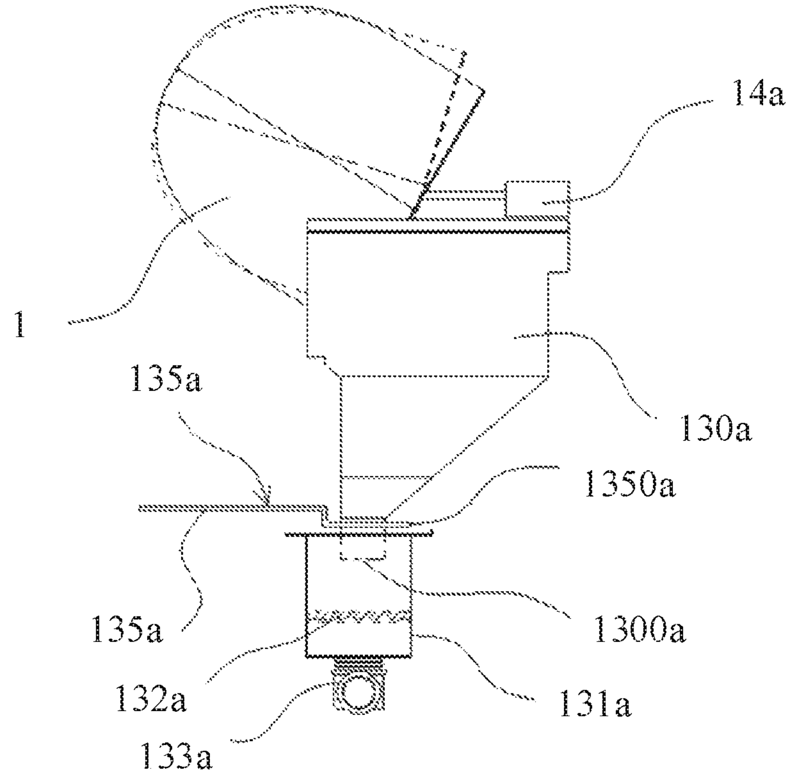
FIG. 36 is a state diagram of the wok shown in FIG. 3 in a pouring working position.

With reference to FIGS. 35 and 36, the diversion trench 130*a* of the present embodiment is provided with an installing recess 134*a* at the wok wash liquid collecting opening 1301*a*, and the installing recess 134*a* can be used to install the wok 1, as can be seen in the drawings in particular. In the embodiment, the filtering device 132*a* divides the water storage trench 131*a* into an upper-layer space and a bottom-layer space, the bottom of the diversion trench 130*a* extends into the opening of the water storage trench 131*a*, the diversion outlet 1300*a* is arranged in the upper-layer space, and the draining pipe 133*a* is communicated with the bottom-layer space, so that water from the diversion outlet 1300*a* of the diversion trench 130*a* firstly enters the upper-layer space of the water storage trench 131*a*; and then the water is filtered by the filtering device 132*a* to enter the bottom-layer space of the water storage trench 131*a*, and then the water is discharged by the draining pipe 133*a*, so that the filtering capacity is favorably increased by using the water storage trench 131*a*. Specifically, the filtering device 132*a* of the embodiment is a mesh filtering device 132*a*, while the diversion trench 130*a* is a funnel-shaped diversion trench 130*a*; it is to be noted that in the present invention, the construction and materials of the filtering device 132*a* and the shape of the diversion trench 130*a* may not be limited by the present embodiment, and in other embodiments, may be reasonably selected according to actual needs.

Further, referring to FIGS. 35 and 36, the filtering device 132*a* of the present embodiment further includes a splash guard 135*a* disposed on a bottom side of the diversion trench 130*a*, and a bottom portion of the diversion trench 130*a* penetrates through the splash guard 135*a*. Specifically, the splash guard 135*a* comprises a connecting plate part 1350*a* and an extending plate part 1351*a*, the extending plate part 1351*a* extends out of the side, provided with the installing recess 134*a*, of the diversion trench 130*a*, the connecting plate part 1350*a* is arranged over an opening of the water storage trench 131*a*, and the bottom portion of the diversion trench 130*a* penetrates through the connecting plate part 1350*a*; moreover, the extending plate part 1351*a* is higher than the connecting plate part 1350*a*, so that a step is formed between the connecting plate part 1350*a* and the extending plate part 1351*a*, the step is positioned above the opening of the water storage trench 131*a*, and the splash guard 135*a* is provided with a through opening at the step, and the through opening is positioned at or close to the diversion outlet 1300*a*; the edge of the splash guard 135*a* of the embodiment is also provided with a baffle plate. Therefore, the water splashed out by the wok of the automatic cooking machine in the process of turning from the wok washing working position to the water discharging working position can be received by the splash guard 135*a*, and is guided to the through opening to enter the water storage trench 131*a* to be filtered, so that waste water can be prevented from being sprayed outside to pollute the kitchen and bath environment. The extending plate part 1351*a* extends out from the side, provided with the installing recess 134*a*, of the diversion trench 130*a*, is arranged according to the main direction of water splashing, and can receive splashed water in a larger range; and the baffle plate is arranged to prevent water received by the splash guard 135*a* from flowing out the splash guard 135*a*, and the water received by the splash guard 135*a* is favorably guided to the through opening to enter the water storage trench 131*a*.

According to the filtering device 132*a* of the embodiment, the wok 1 may be install at the installing recess 134*a* of the diversion trench 130*a*; the cooking machine of the embodiment can be configured with a wok washing working position (specifically, the position of the wok 1 indicated by dotted lines in the drawings) and a water discharging working position (specifically, the position of the wok 1 indicated by solid lines in the drawings) for the wok 1, the wok 1 can be washed by high pressure at the wok washing working position, and water in the wok 1 can be completely poured out at the water discharging working position. In the embodiment of the present invention, when the cooking machine performs a wok washing procedure, the wok is turned to the wok washing working position firstly, then the water curtain brush is put down by the wok washing device of the cooking machine to wash the wok 1, and the washed water is guided into the water storage trench 131*a* by the diversion trench 130*a* to be filtered and then discharged; after the cooking machine performs the wok washing procedure, the wok is turned to the water discharging working position to pour out all the water in the wok, and the water poured out of the wok is also guided into the water storage trench 131*a* by the diversion trench 130*a* to be filtered and then discharged. Thus, the filtering device 132*a* of the present embodiment can avoid arbitrary discharge of wastewater and the pollution to the environment, and the filtering capacity can be increased, so that the filtering efficiency can be improved.

Figure 24:
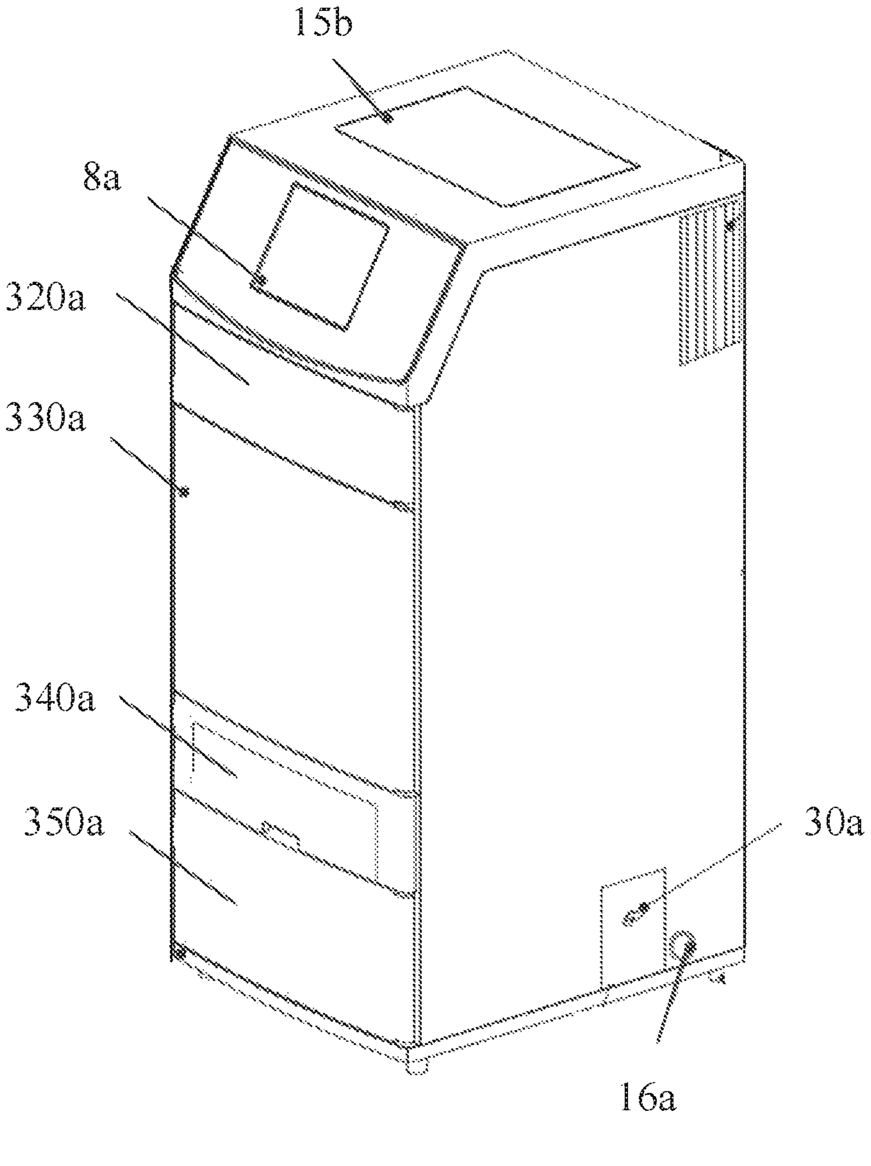
FIG. 24 is a perspective view of an intelligent cooking machine according to an embodiment of the present invention.
Figure 25:
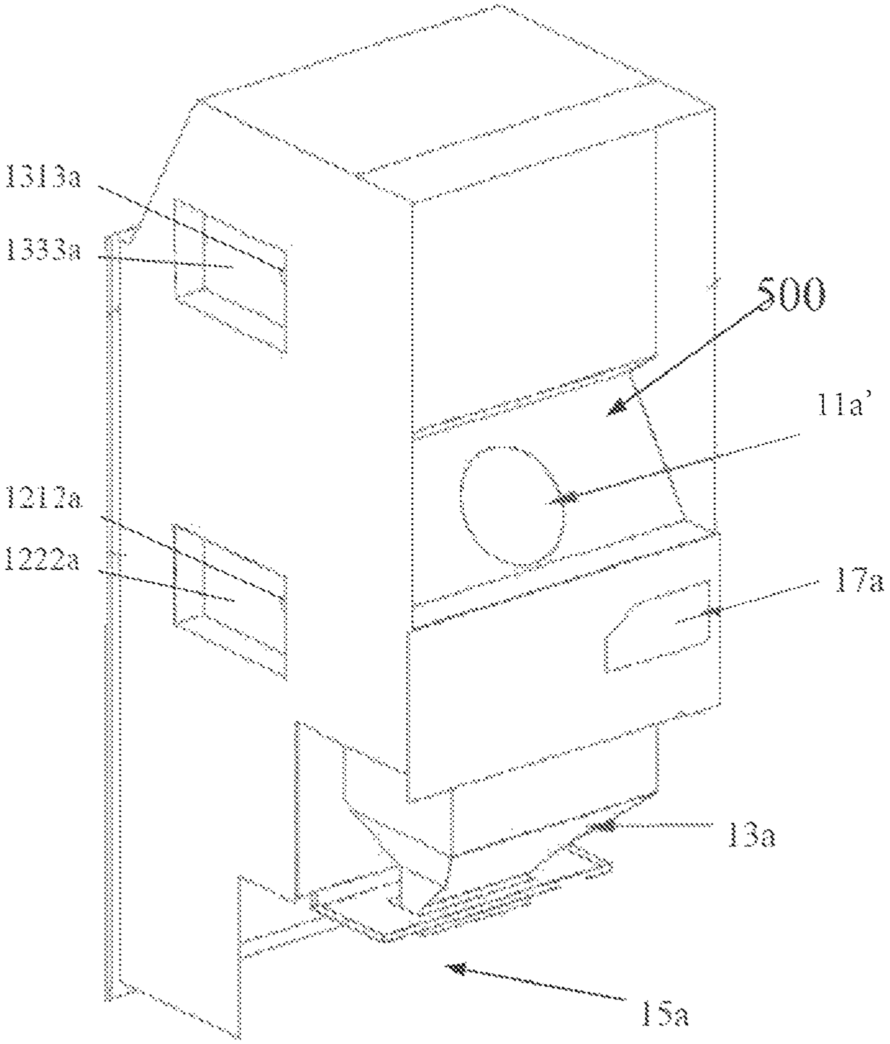
FIG. 25 is a rear view of the inner shell shown in FIG. 3.

In the embodiment of the present invention described above, further referring to FIG. 24, a cleaning opening is formed in the outer shell 1*a* close to the draining area 15*a*, and an openable-and-closable cleaning door 30*a* is arranged at the cleaning opening. Thus, when each component in the draining device 13*a* is required to be cleaned, the cleaning door 30*a* can be opened to clean the corresponding component, and at the same time, the cleaning door 30*a* can also be opened to repair and replace the corresponding component in the draining device 13*a*.

In the embodiment of the present invention described above, further referring to FIGS. 24 and 26, a top cover opening is formed in the same position of the top portion of the inner shell 2*a* and the top portion of the outer shell 1*a*, a top cover door plate 15*b* capable of being opened and closed is arranged at the top cover opening, and when the interior of the automatic cooking machine needs to be repaired, the top cover door plate 15*b* can be opened for such repairing; one side of the inner shell 2*a* is sequentially provided with an ingredient container guiding opening 32*a*, an observation opening 33*a*, a dish discharging outlet 34*a* and a seasoning inlet 35*a* from top to bottom, and the same side of the outer shell 1*a* is in opening shape and is sequentially provided with an openable-and-closable ingredient feeding door 320*a*, an openable-and-closable observation door 330*a*, an openable-and-closable dish discharging door 340*a* and an openable-and-closable seasoning door 350*a*. The ingredient feeding door 320*a* is used for closing and sealing the ingredient container guiding opening 32*a*, the observation door 330*a* is used for closing and sealing the observation opening 33*a*, the dish discharging door 340*a* is used for closing and sealing the dish discharging outlet 34*a*, and the seasoning door 350*a* is used for closing and sealing the seasoning inlet 35*a*. It needs to be noted that the openable-and-closable ingredient feeding door 320*a*, the openable-and-closable observation door 330*a*, the openable-and-closable dish discharging door 340*a* and the openable-and-closable seasoning door 350*a* can be integrally formed into a main door plate 1111*a* as shown in FIG. 26.

It can be understood that the internal working space of an intelligent cooking machine is a high-temperature, high-humidity and high-acidity-alkalinity environment, the working structure and electrical components which are matched with the internal working space of an intelligent cooking machine are difficult to work effectively for a long time under such environment, in addition, food safety, sanitation and environmental protection are involved in the internal working space of an intelligent cooking machine, but according to the embodiment of the present invention, a closed cooking machine working space (cooking cavity) is constructed in the inner shell 2*a*, main cooking equipment in contact with food materials is placed in the closed space of the cooking cavity to achieve the main cooking function such as feeding, cooking, heating and dish discharging, and the spraying piece is arranged in the cooking cavity to wash the cooking devices; and meanwhile, accessory cooking equipment (including an electric appliance, a circuit, a power supply, a transmission line, a pipeline components that cooperated with the main cooking equipment to work) for assisting the main cooking equipment in realizing a cooking function is arranged outside the cooking cavity.

FIGS. 26-27 show specific structures of the cooking cavity 100 of the present embodiment. A feeding area for containing the ingredient feeding device, a cooking area for containing the wok device and a dish discharging area for containing the dish discharging device are sequentially arranged in the cooking cavity 100 from top to bottom. The interior of the cooking cavity 100 can be divided into the multiple areas by partition plates, and the interior of the cooking cavity 100 is divided into the different functional areas by the partition plates, so that devices with different functions applied to the cooking process can be distributed in order and do not interfere with one another, and maintenance of all the devices is facilitated. According to the embodiment, the feeding area, the cooking area and the dish discharging area are preferably arranged to communicate with one another, that is, no partition plate exists among the feeding area, the cooking area and the dish discharging area, so that the feeding device, the wok device and the dish discharging device can perform in a matched mode, the cooking processes of feeding, cooking and dish discharging are automatic and orderly, and thus the cooking efficiency and effect are effectively improved, the internal structure of the cooking cavity can be simplified, the space size of the cooking cavity is effectively reduced, and therefore miniaturization of the cooking machine is achieved. The feeding area is arranged at the upper part in the cooking cavity 100, the cooking area is arranged at the middle part in the cooking cavity 100, and the dish discharging area is arranged at the lower part in the cooking cavity 100. The cooking cavity 100 is applied in the interior of the cooking machine so as to accommodate the feeding device, the wok device, the dish discharging device and the washing devices thereof, so that the working processes of feeding, cooking, dish discharging, washing and the like can be achieved in the closed cooking cavity, and the food safety and sanitation are ensured. In the processes described above, cooking fume generated by the cooking machine can be limited in the cooking cavity and purified by the cooking fume treatment device outside the cavity, and pollution caused by the fact that the cooking fume is leaked to the environment outside the structure is reduced. The side portion of the inner shell 2*a* provided with the ingredient container guiding opening 32*a*, the observation opening 33*a*, the dish discharging 34*a* and the seasoning inlet 35*a* is provided with a main door plate 1111*a* capable of being opened and closed, and the juncture of the main door plate 1111*a* and the inner shell 2*a* is provided with a self-suction type sealing strip so as to avoid leakage of cooking fume and water vapor. When feeding of dish discharging is required, a user can open the main door plate 1111*a*, a feeding or dish discharging operation is performed from the ingredient container guiding opening 32*a* or the observation opening 33*a*, the dish discharging outlet 34*a*, and after the feeding or dish discharging operation is completed, the main door plate 1111*a* is closed to enable the cooking cavity to be in a closed state. The ingredient feeding device 2 comprises an ingredient-containing chamber with a flipping mechanism, and the flipping mechanism comprises ingredient-containing chamber supporting frames located on the two side parts of the ingredient-containing chamber. The inner shell 2*a* is provided with installing holes 1313*a* and installing positions 1333*a* in the feeding area, the installing holes 1313*a* are used for installing a flipping mechanism for controlling the turning of the ingredient feeding device, the installing positions 1333*a* are used for respectively accommodating a working position detection device 12*b* for detecting the working position of the ingredient feeding device and a driving motor 11*b* of the flipping mechanism 11*a*, and the installing hole utilizes sealing ring to enhance the sealing effect. The two sides, located in the cooking area, of the inner shell 2*a* are each provided with an installation hole 1212*a* and an installation position 1222*a* in the cooking area, the installation holes 1212*a* are used for installing a wok working position controlling device for controlling the wok to be turned, the installation positions 1222*a* are used for containing a wok working position conversion motor 6*b* and a wok working position detection device 7*b* respectively, and the sealing effect of the installation holes is enhanced with sealing rings. According to the structure provided by the embodiment, a closed cooking area is formed by utilizing the inner shell, the sealing effect is enhanced with the sealing ring, and the interior of the cooking cavity is sequentially provided with a plurality of functional areas, so that the whole cooking process is orderly and the space is fully utilized, and the volume of the cooking area is greatly reduced. Due to the reasonable distribution of the functional areas, when the structure is applied to the automatic cooking equipment, the automation performance can be fully realized, the whole cooking process is highly automatic, and the labor investment is saved.

Embodiment 2

Figure 39:
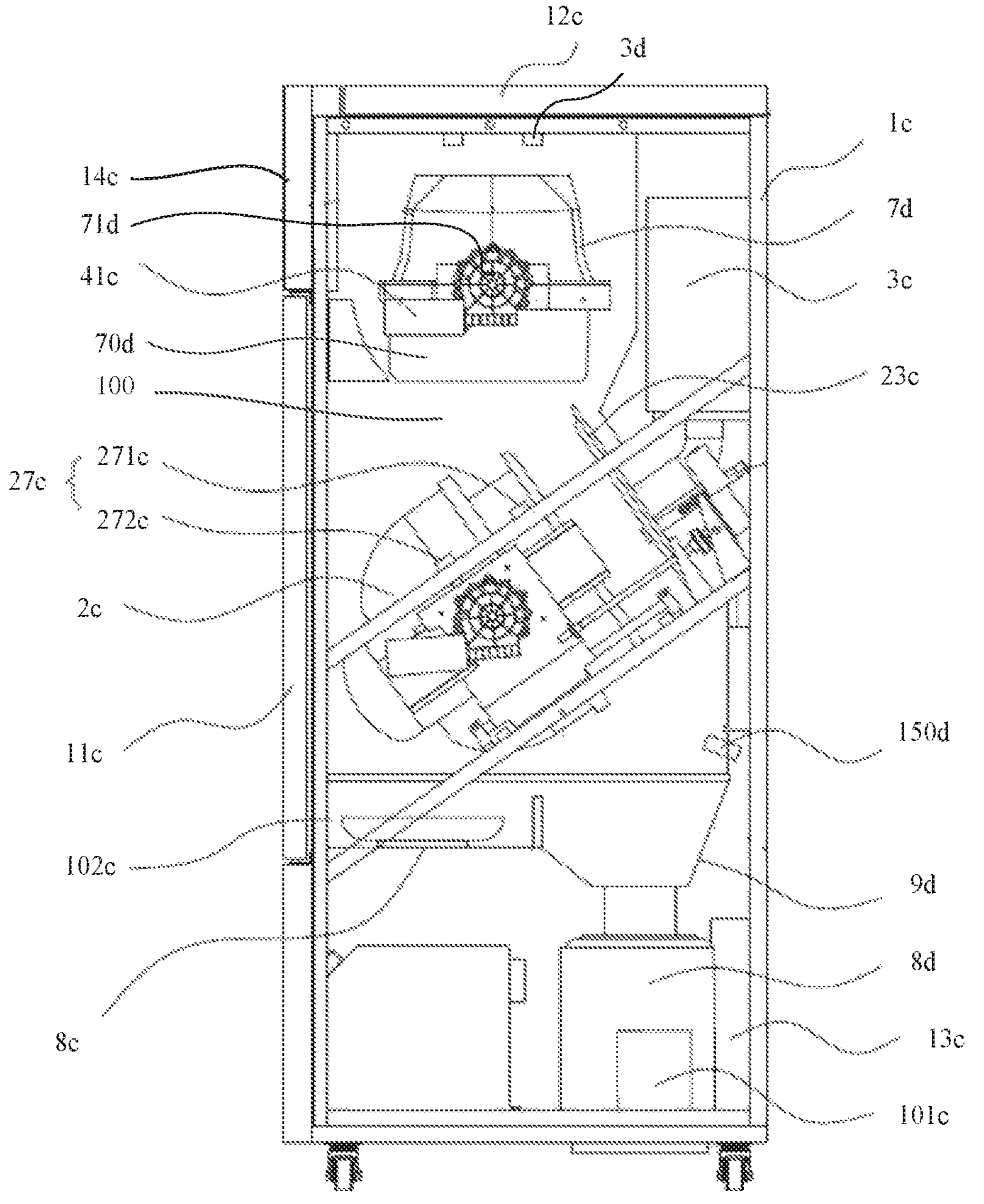
FIG. 39 is a schematic diagram of the overall structure of a cooking machine capable of achieving full-closed cooking provided by the second embodiment of the present invention.
Figure 40:
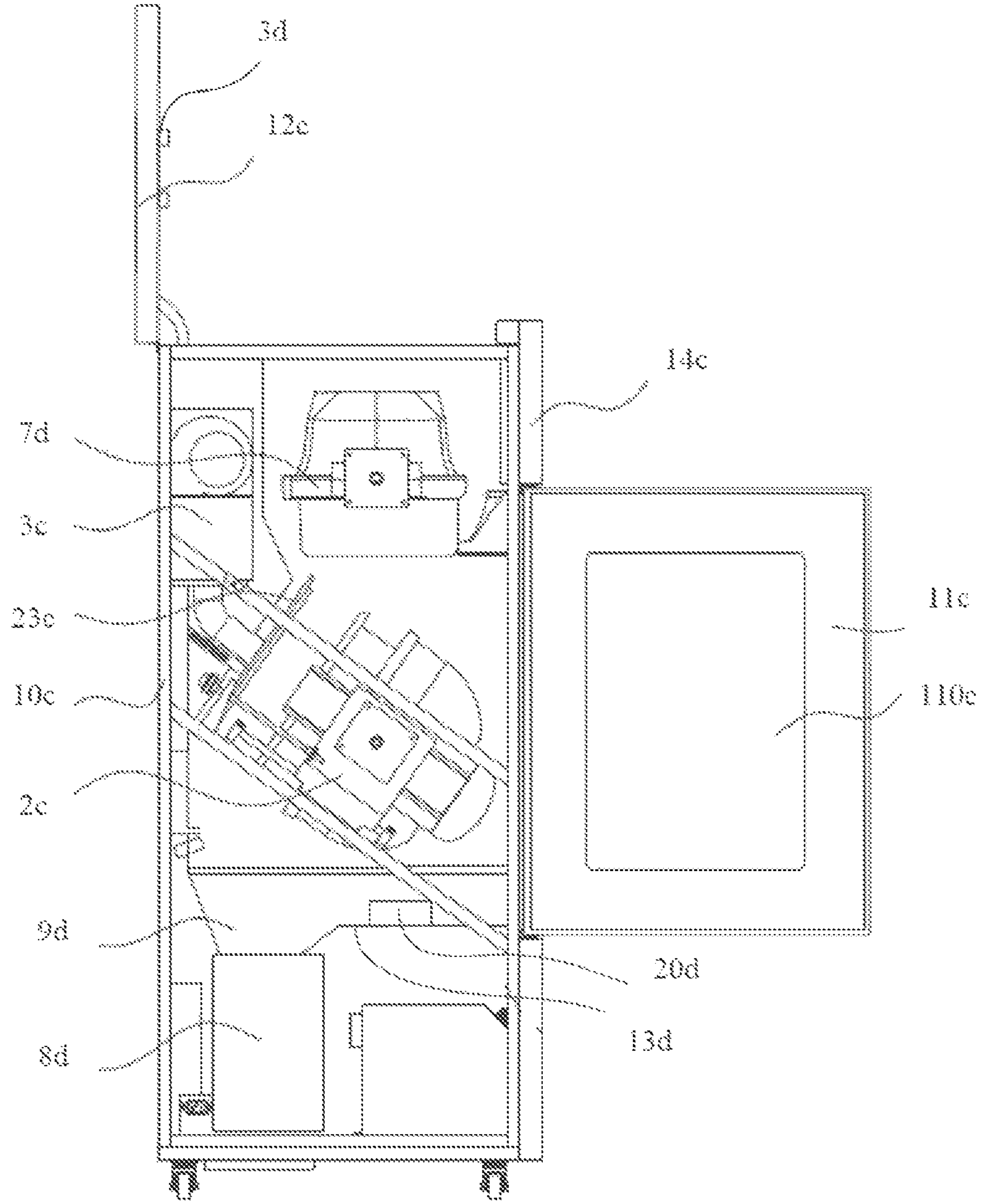
FIG. 40 is a state schematic view of the door plate and the top cover plate of the cooking machine shown in FIG. 39 in an open state.
Figure 41:
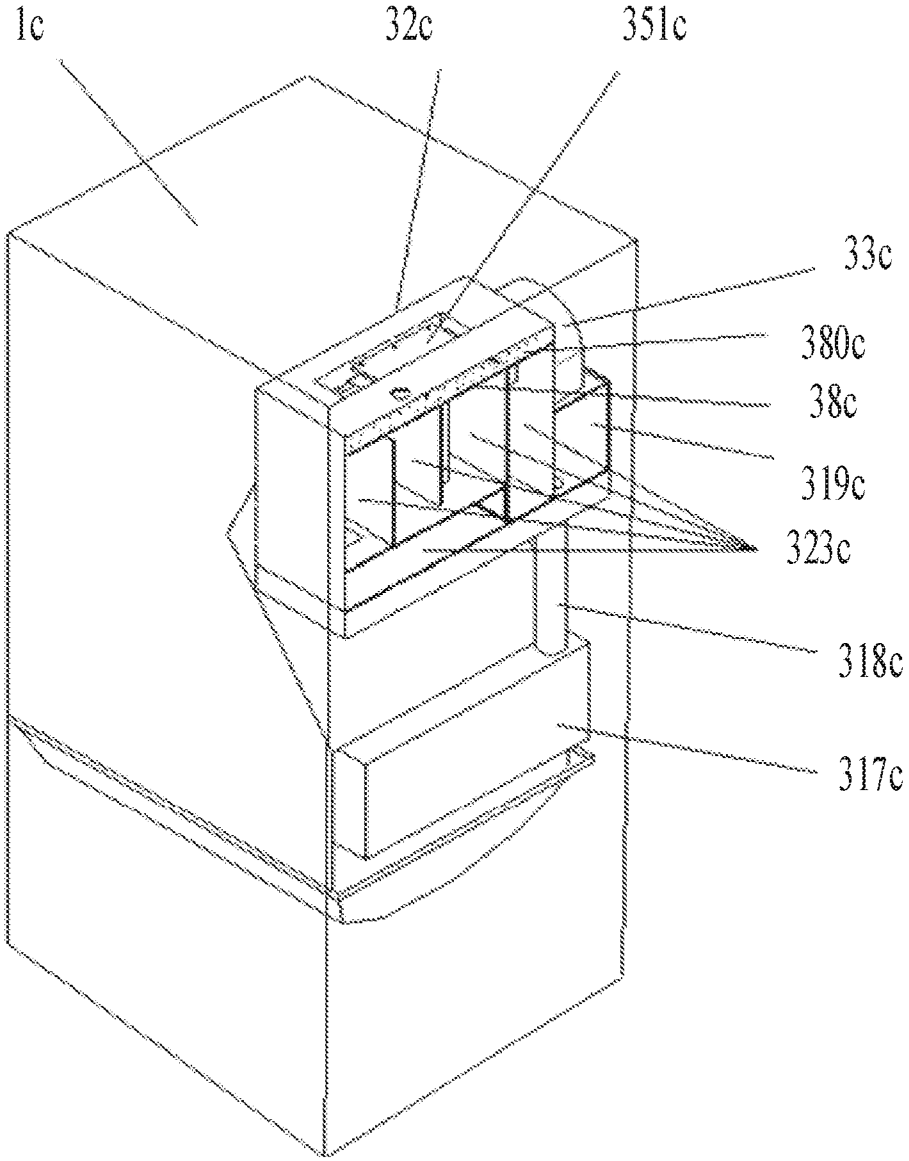
FIG. 41 is a partial structure schematic diagram of the cooking machine capable of achieving full-closed cooking provided by the second embodiment of the present invention.

Referring to FIGS. 39 and 40, the embodiment of the present invention provides an automatic cooking machine capable of realizing full-closed cooking, which comprises a shell (comprising an outer shell 1*c* and an inner shell 1*d* arranged inside the outer shell), a cooking fume treatment device 3*c*, a wok mechanism, a control device 13*c* and a human-machine operation interface 14*c*. The wok mechanism comprises a wok 20*c*, a furnace body device 24*c*, a wok rotating device 25*c* and a wok working position controlling device 21*c* which are arranged in the inner shell 1*d*, and a wok moving control device 22*c* which is arranged between the inner shell 1*d* and the outer shell 1*c*; the furnace body device 24*c* is used for supporting and heating the wok 20*c*; the wok rotating device 25*c* is used for controlling the wok 20*c* to rotate around a central axis of the wok 1 so as to cook; the wok working position controlling device 21*c* is used for controlling the wok 20*c* to turn so as to enable the wok 20*c* to reach a corresponding working position for corresponding operation; and the wok moving control device 22*c* is used for controlling the wok (specifically by the furnace body device) to move directionally in the inner shell 1*d* so as to drive the wok 20*c* to move directionally in the inner shell 1*d*. A cooking fume inlet 321*c* of the cooking fume treatment device 3*c* is communicated with the interior of the inner shell 1*d*, and a cooking fume outlet 322*c* of the cooking fume treatment device 3*c* can be communicated with the exterior of the outer shell 1*c* and can also be communicated with the interior of the inner shell 1*d*. The human-machine operation interface 14*c* is provided on an outer side of the outer shell 1*c* (e.g. may be provided on a top portion or a side portion outside the outer shell 1*c*). The human-machine operation interface 14*c*, the furnace body device 24*c*, the wok rotating device 25*c*, the wok working position controlling device 21*c* and the wok moving control device 22*c* are electrically connected with the control device 13*c* so as to receive control commands sent by the control device 13*c* according to a preset recipe program and perform corresponding operations according to the control commands.

In the embodiment of the present invention, in order to improve the air tightness of the shell and prevent the cooking fume in the shell from being directly discharged out of the shell, a cooking cavity 100 which is arranged in a sealed manner is formed in the inner shell 1*d*, and the whole wok mechanism (except the wok moving control device 22*c*) is arranged in the cooking cavity 100, so that cooking fume generated by the wok 20*c* can be gathered in the cooking cavity 100.

Figure 42:
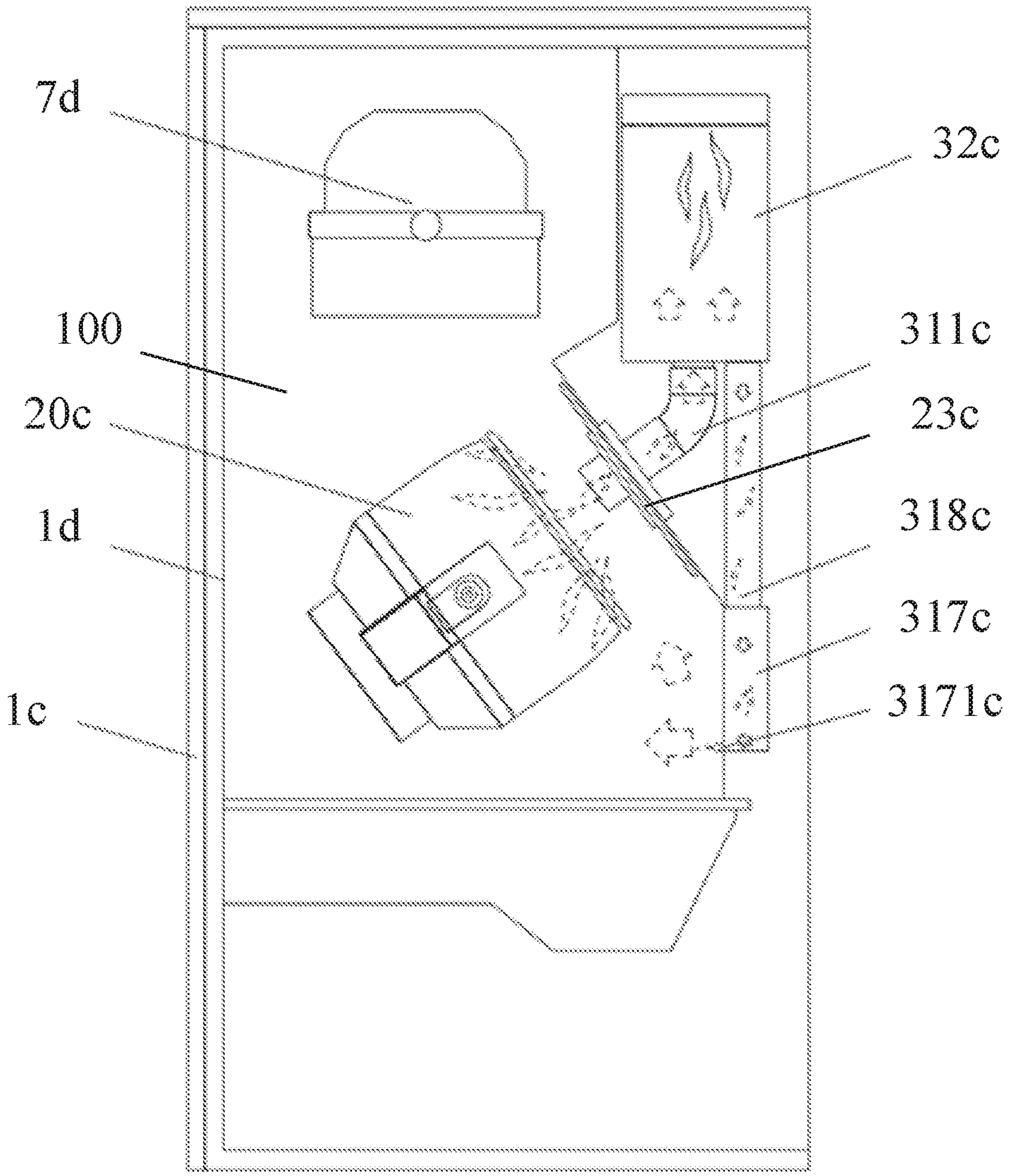
FIG. 42 is a right-side view of a partial structure of the cooking machine capable of achieving full-closed cooking according to the second embodiment of the present invention.

Referring to FIGS. 39 and 42, the cooking machine further comprises a cooking fume inlet pipe 311*c* and a wok lid 23*c* which is fixed in the inner shell 1*d* and used for being matched with an opening of the wok 20*c*; one end of the cooking fume inlet pipe 311*c* is connected with an opening (exhaust port) penetrating through the wok lid 23*c*, and the other end of the cooking fume inlet pipe 311*c* penetrates through the cooking fume inlet 321*c* in a sealed manner and is communicated with the interior of the cooking fume treatment device 3*c*; the cooking fume outlet 322*c* of the cooking fume treatment device 3*c* is communicated with the interior of the inner shell 1*d* (and the interior of the closed cooking cavity).

Specifically, the exhaust port (not shown) penetrates through the center of the wok lid 23*c*, and the wok lid 23*c* is rotatably connected with one end of the cooking fume inlet pipe 311*c*, so that the wok lid 23*c* can rotate around the cooking fume inlet pipe 311*c*. The moving direction of the wok 20*c* is parallel to the central axis of the wok lid 23*c*; when the wok 20*c* is turned to a cooking position, the opening of the wok 20*c* faces the wok lid 23*c*, and the central axis of the wok 20*c* coincides with the central axis of the wok lid 23*c*. Therefore, when cooking is needed, the wok 20*c* is turned to a cooking working position by the wok working position controlling device 21*c*, the opening of the wok 20*c* faces the wok lid 23*c*, then the wok 20*c* is moved by the wok moving control device 22*c* to enable the wok lid 23*c* to cover the opening of the wok 20*c*, and then the wok 20*c* is controlled to rotate by the wok rotating device 25*c* to perform cooking operation, so that in the cooking process, cooking fume generated in the wok 20*c* can enter the cooking fume treatment device 3*c* from the cooking fume inlet pipe 311*c* in a centralized mode. After the cooking operation is completed, the wok 20*c* needs to be opened, and the wok 20*c* is moved by the wok moving control device 22*c*, so that the wok lid 23*c* is separated from the wok 20*c*.

The wok lid 23c comprises a wok lid plate and a wok lid sealing container (not shown); the wok lid sealing container comprises a fixing part installed on the wok lid plate and a sealing strip which can be arranged on the periphery of the fixing part in a relatively rotating and sleeving mode. An area enclosed by the sealing strip is matched with the opening of the wok in size and shape. Therefore, when the wok lid 23c seals the opening of the wok 20c with the sealing strip and the wok rotates, the sealing strip rotates along with the wok, so that the resistance of the wok as it rotates is reduced.

The exhaust port communicated with the cooking fume treatment device 3c is formed in the wok lid plate; the fixed part is provided with a first communication opening communicated with the cooking fume channel opening; the wok lid plate is provided with an seasoning adding opening communicated with an automatic seasoning adding device of the cooking machine; the fixing part is provided with a second communication opening communicated with the seasoning adding opening.

As a deformation embodiment, the wok lid plate is provided with a common channel opening; the common channel opening is communicated with the cooking fume treatment device 3c and the automatic seasoning adding device of the cooking machine; the fixing part is provided with a common communication opening communicated with the common channel opening. That is, the cooking fume channel opening and the seasoning adding opening are achieved through the common channel opening at the same time, and seasoning adding or cooking fume extracting can be performed through the common channel opening. Preferably, the fixing part is detachably installed on the wok lid plate.

Therefore, according to the cooking fume treatment system provided by the embodiment of the present invention, the closed cooking cavity 100 is formed in the inner cavity of the inner shell 1d, the wok mechanism (comprising the wok and the wok lid) is arranged in the closed cooking cavity 100, and the wok is closed by the wok lid during cooking, so that a first-layer of closed cooking space is formed in the inner cavity of the wok, and cooking fume generated by the wok 20c during closed cooking is discharged to a cooking fume treatment device 3c from the exhaust port of the wok lid 23c for treatment; in addition, under a second-layer of sealed cooking space of the sealed cooking cavity 100, even if the cooking fume escaping from the wok 20c in the cooking process is limited in the cooking cavity, the cooking fume is purified by the cooking fume treatment device (for example, after the wok 20c is separated from the wok lid 23c, the cooking fume is discharged from an exhaust port of the wok lid 23c) and then is discharged, so that the situation that cooking fume generated in the cooking process is directly exhausted outwards to pollute the surrounding environment is avoided.

For ease of understanding, the structure of the cooking fume treatment device 3c is described in detail below with reference to FIGS. 41-48:

Preferably, referring to FIGS. 41-48, the cooking fume treatment device 3c is arranged between the outer shell 1c and the inner shell 1d, and the cooking fume treatment device 3c comprises a box body 32c, a fan 33c, a cooking fume filtering assembly 34c, a micro refrigerator 35c, a water circulation pipeline 36c and a water pump 37c. Specifically, the box body 32c is provided with a water adding opening 320c, a cooking fume inlet 321c and a cooking fume outlet 322c, an cooking fume channel 323c communicating the cooking fume inlet 321c with the cooking fume outlet 322c is formed in the box body 32c, and the cooking fume inlet 321c and the cooking fume outlet 322c communicate with the cooking cavity 100. The fan 33c is used for drawing cooking fume into the box body 32c from the cooking fume inlet 321c and exhausting the cooking fume from the cooking fume outlet 322c. The cooking fume filtering assembly 34c is arranged in the cooking fume channel 323c. The micro refrigerator 35c is preferably a semiconductor refrigerator, and at least one refrigeration sheet 350c of the micro refrigerator 35c is arranged in the cooking fume channel 323c; at least one first water outlet 360c of the water circulation pipeline 36c is positioned at the upper part in the box body 32c and is positioned right above the cooking fume channel 323c, and at least one first water inlet 361c of the water circulation pipeline 36c is positioned at the lower part in the box body 32c; the water pump 37c is arranged in the water circulation pipeline 36c. The fan 33c, the micro refrigerator 35c and the water pump 37c are electrically connected with the control device 13c so as to receive control commands sent by the control device 13c according to a preset recipe program and perform corresponding operations according to the control commands.

The working principle of the cooking fume treatment device 3c provide by the embodiment of the invention is as follows: in the cooking process of the cooking machine, cooking fume can be continuously generated in an inner cavity of the wok in the cooking cavity 100. Under the pressurization blowing effect of the fan 33c, the cooking fume in the inner cavity of the wok can enter the cooking fume channel 323c from the cooking fume inlet 321c and then can be filtered by the cooking fume filtering assembly 34c. In this process, the temperature of the cooking fume channel 323c can be reduced when the refrigeration sheet 350c of the micro refrigerator 35c works, so that cooking fume entering the cooking fume channel 323c is condensed, and the cooking fume filtering assembly 34c can better filter the cooking fume. Under the action of the water pump 37c, the water circulation pipeline 36c continuously sprays water to the cooking fume filtering assembly 34c located in the cooking fume channel 323c from the first water outlet 360c, so that the temperature in the cooking fume channel 323c is further reduced, the cooking fume can be effectively condensed, and the cooking fume filtering assembly 34c can be used for better filtering the cooking fume. The water falling to the bottom in the box body 32c can enter the water circulation pipeline 36c again under the action of the water pump 37c. In addition, due to the fact that the cooking fume inlet 321c and the cooking fume outlet 322c are both communicated with the cooking cavity 100 arranged in the sealed manner, after the cooking fume in the wok enters the box body 32c from the cooking fume inlet 321c for cooking fume treatment, residual cooking fume enters the cooking cavity 100 from the cooking fume outlet 322c again. In the cooking process, the cooking fume gas escaping out of the wok and the cooking fume gas entering the cooking cavity 100 from the cooking fume outlet 322c of the cooking fume treatment device 3c continue to enter the box body 32c from the cooking fume inlet 321c to be subjected to cooking fume treatment, and the process is continuously repeated; therefor, the cooking fume in the cooking cavity 100 can be effectively treated without being discharged to the outside, and zero emission of the cooking fume is achieved.

It will be appreciated that micro refrigerator 35 can be other existing micro refrigerating devices, and the details are not described herein.

Figure 44:
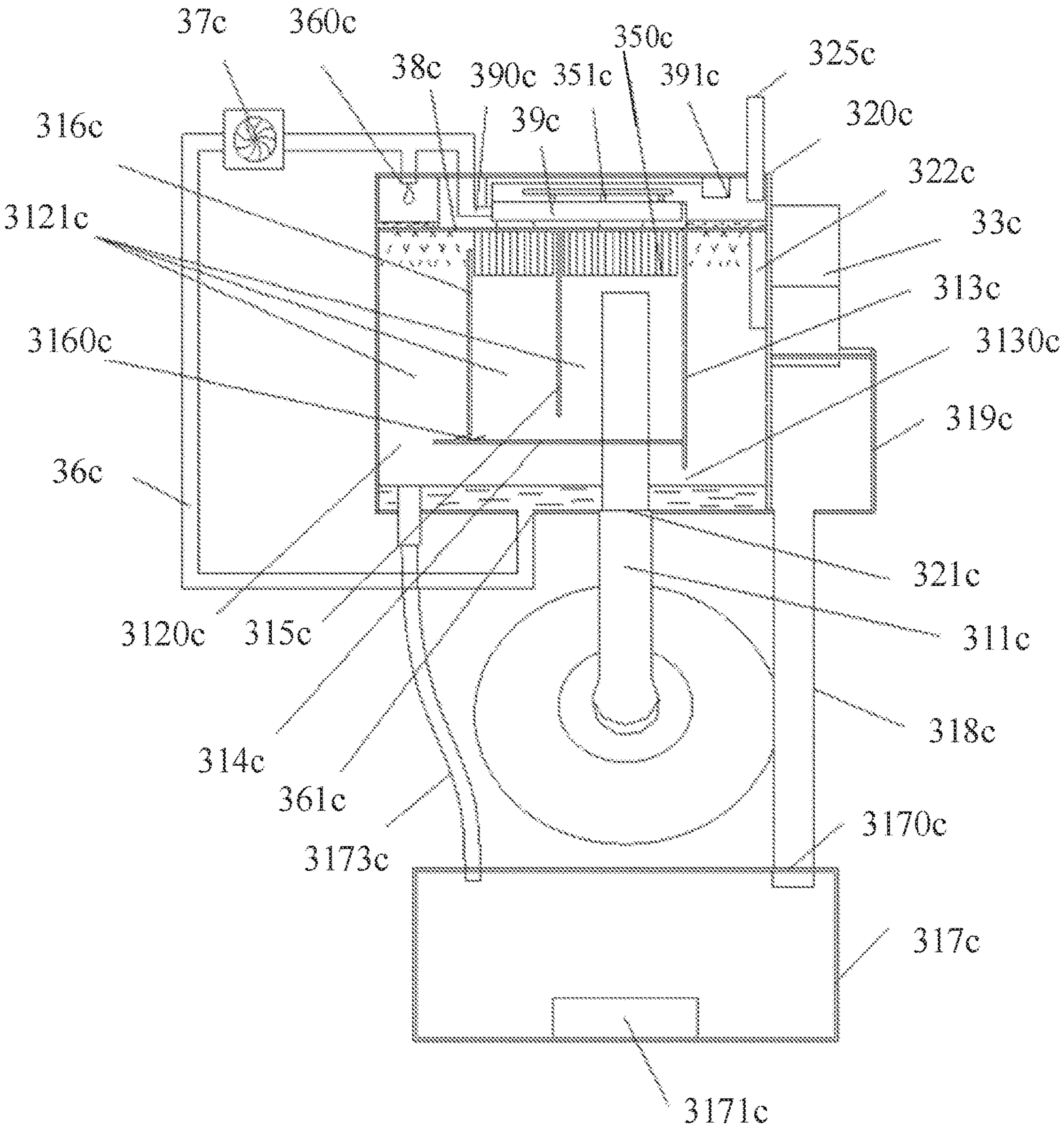
FIG. 44 is a structural schematic view of the cooking fume treatment device shown in FIG. 39.

It should be noted that referring to FIG. 44, when the water in the box body 32c and the water circulation pipeline

36*c* is insufficient, water can be added to the box body 32*c* from the water adding opening 320*c*. Preferably, referring to FIG. 44, the water adding opening 320*c* is formed in the top of the box body 32*c*, a water adding pipe 325*c* penetrates through the water adding opening 320*c* in a sealed manner, one end of the water adding pipe 325*c* penetrates into the box body 32*c*, and therefore water can be added into the box body 32*c* from the water adding pipe 325*c*. Exemplarily, the water adding pipe 325*c* can be communicated with an external water source, a water pipe valve (not shown) can be arranged in the water adding pipe 325*c*, and when water needs to be added into the box body 32*c*, the water pipe valve can be controlled to be opened. It can be understood that cooking fume cleaning liquid can be added into the box body 32*c* from the water adding opening 320*c*, so that the cooking fume cleaning liquid added into the box body 32*c* can be mixed with water in the box body 32*c*, and then the mixture is conveyed to the first water outlet 360*c* from the water circulation pipeline 36*c* and continuously sprayed to the cooking fume filtering assembly 34*c* below the first water outlet 360*c* so as to clean the cooking fume filtering assembly 34*c*, thus the cooking fume filtering assembly 34*c* does not need to be replaced frequently.

Figure 47:
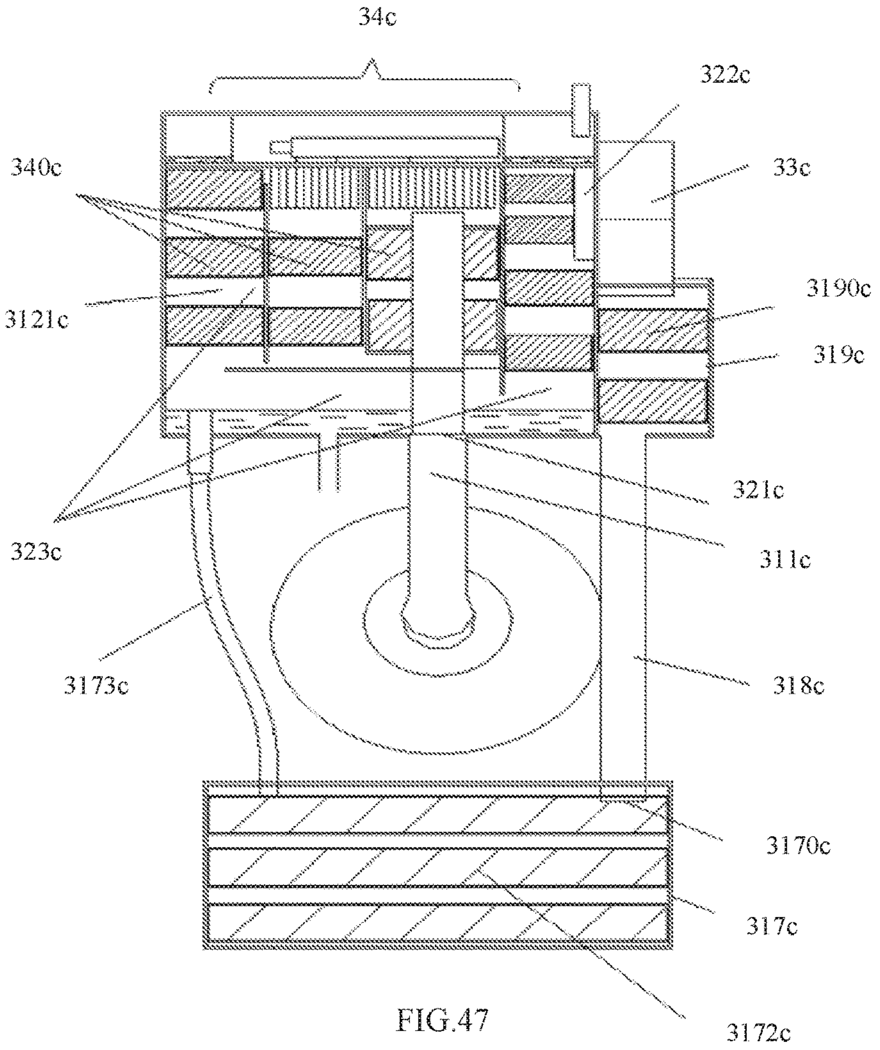
FIG. 47 is a schematic view of the cooking fume treatment device shown in FIG. 39 in a state in which a cooking fume filter layer is installed.
Figure 48:
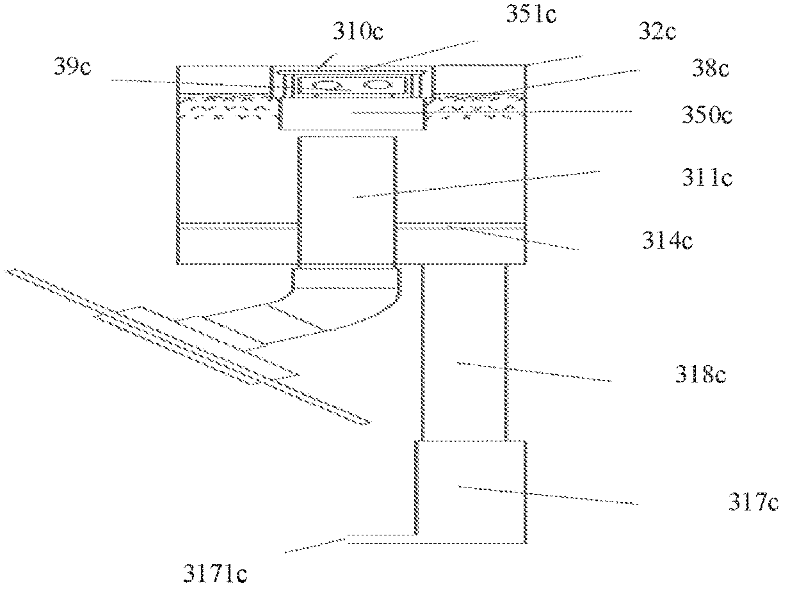
FIG. 48 is a side view of a partial structure of the cooking fume treatment device shown in FIG. 39.
Figure 49:
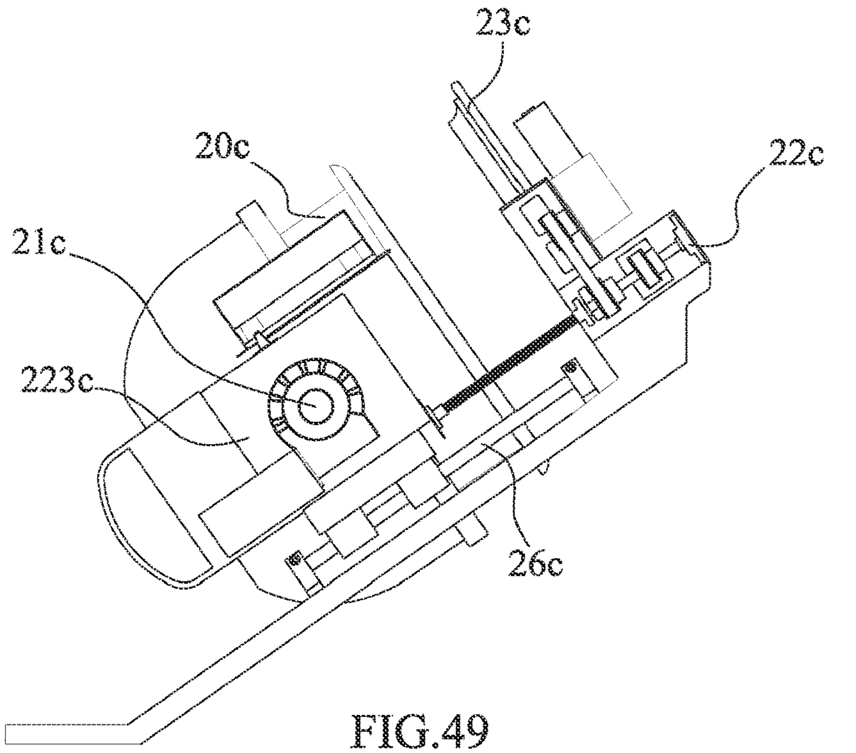
FIG. 49 is a schematic view of the overall structure of the wok device shown in FIG. 39.
Figure 50:
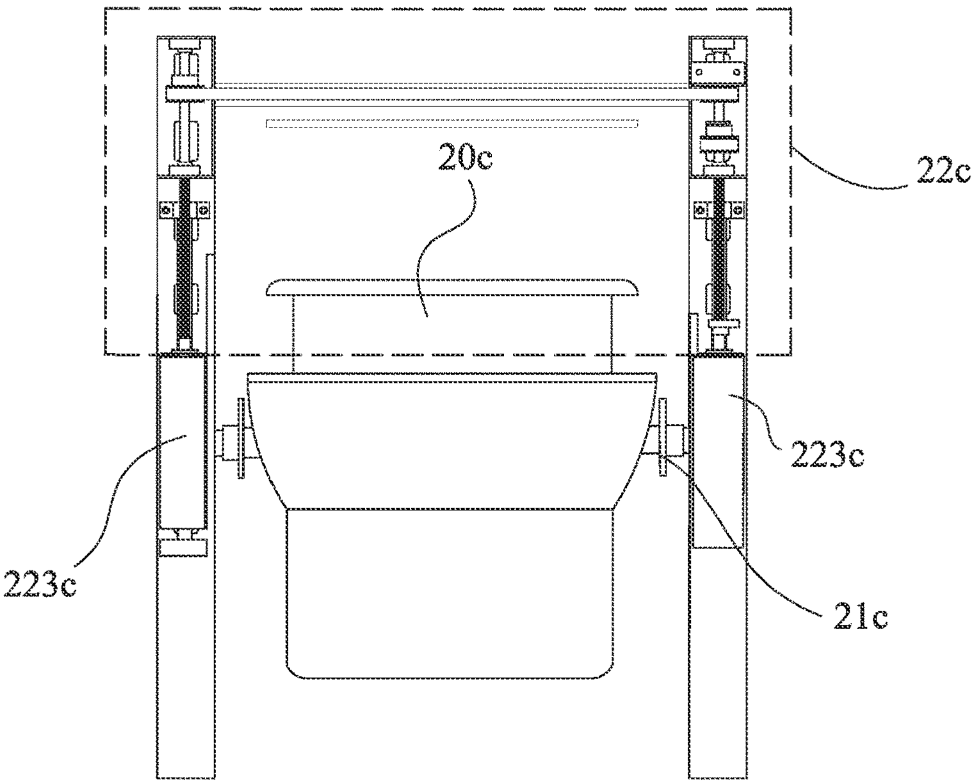
FIG. 50 is a side view of the wok moving control device shown in FIG. 49.

Illustratively, in an embodiment of the present invention, referring to FIG. 47, the cooking fume filter assembly 34*c* may preferably has a plurality of cooking fume filtering layers 340*c* disposed within the cooking fume channel 323*c*.

Figure 45:
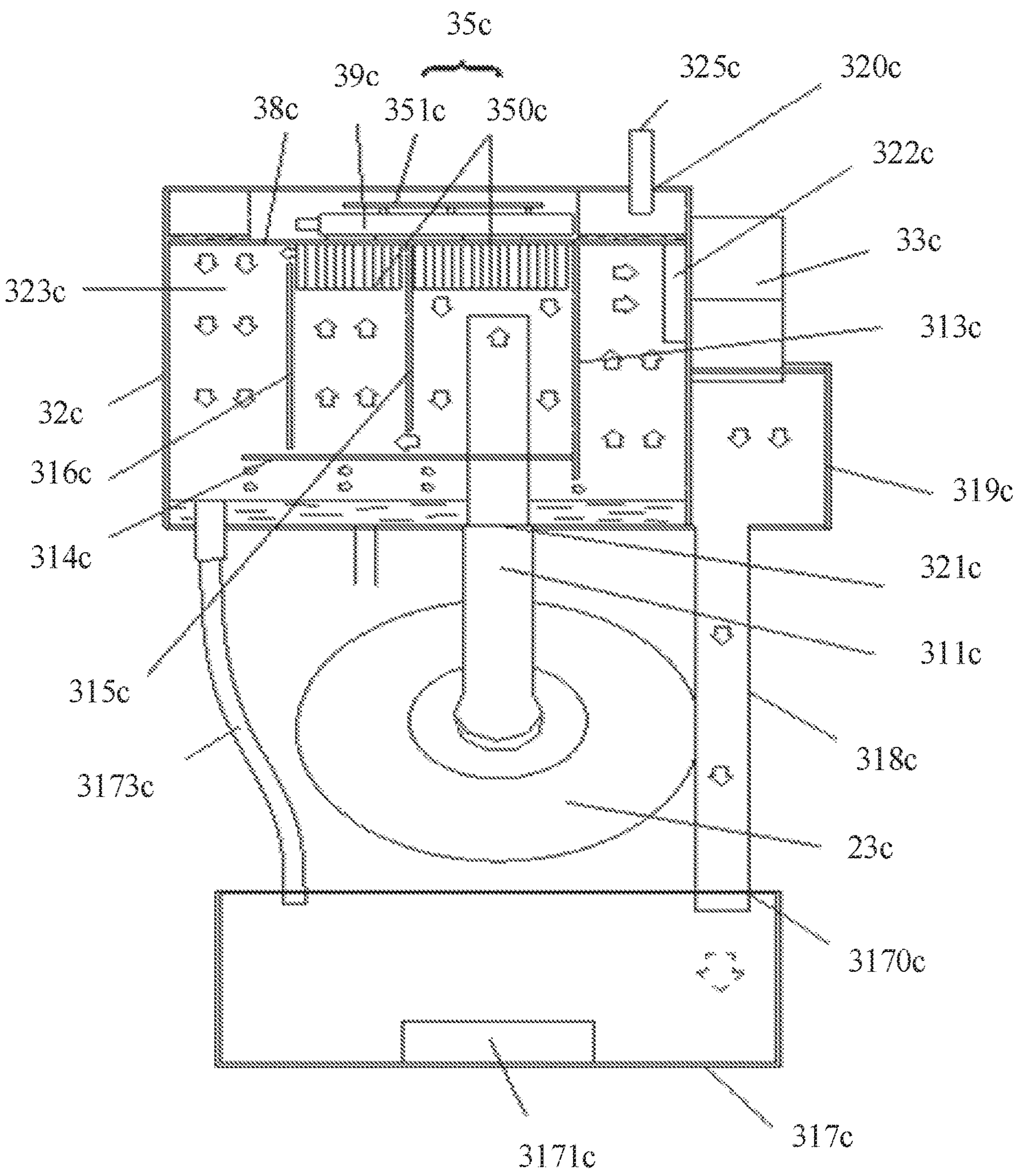
FIG. 45 is a schematic view of the cooking fume flow direction of the cooking fume treatment device shown in FIG. 39.
Figure 46:
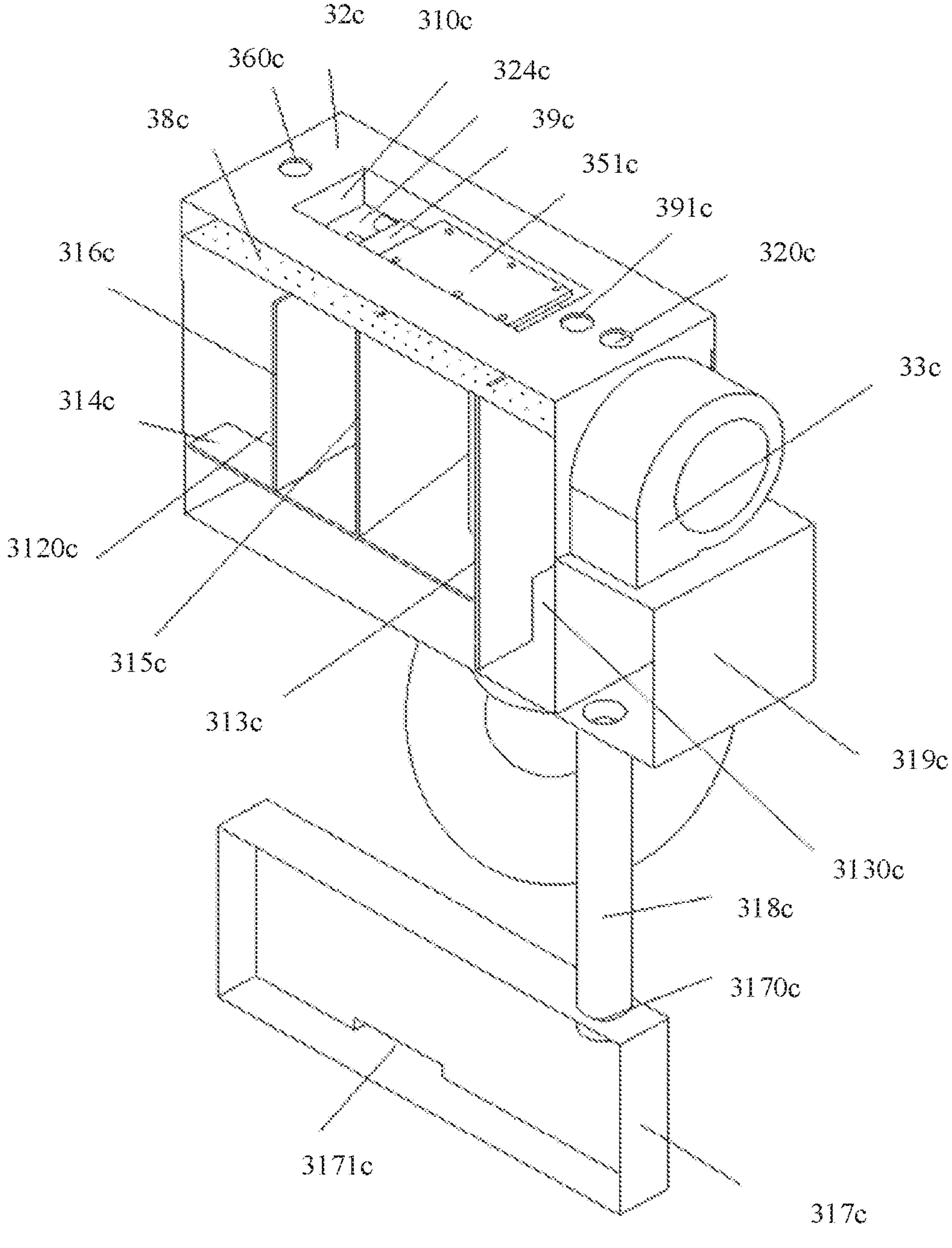
FIG. 46 is a partial cross-sectional view of the cooking fume treatment device shown in FIG. 39.

In an embodiment of the present invention, preferably, referring to FIGS. 44-46, the cooking fume treatment device 3*c* further comprises a spraying plate 38*c* provided with a plurality of spraying holes 380*c*, and the spraying plate 38*c* is arranged between the cooking fume channel 323*c* and the top in the box body 32*c* at intervals so as to separate the cooking fume channel 323*c* from the top in the box body 32*c*; the at least one first water outlet 360*c* is positioned above the spraying plate 38*c*, so that water sprayed from the first water outlet 360*c* can fall onto the spraying plate 38*c* and then dispersedly fall into the cooking fume channel 323*c* from the plurality of spraying holes 380*c* of the spraying plate 38*c*, thereby achieving the effect of uniform spraying. Therefore, by arranging the spraying plate 38*c*, water sprayed from the first water outlet 360*c* can be uniformly sprayed into the cooking fume channel 323*c*, so that the cooking fume channel 323*c* can be cooled more effectively.

Illustratively, referring to FIGS. 44-46, the cooking fume treatment device 3*c* further comprises a cooling body 39*c* of a hollow structure, a second water inlet 390*c* of the cooling body 39*c* is communicated with a water outlet pipe section of the water circulation pipeline 36*c*, a second water outlet 391*c* of the cooling body 39*c* is located above the spraying plate 38*c*, and a second water outlet 391*c* of the cooling body 39*c* is located below the spraying plate 38*c*, so that water in the water outlet pipe section of the water circulation pipeline 36*c* can flow into the cooling body 39*c* from the second water inlet 390*c* and then be sprayed onto the spraying plate 38*c* from the second water outlet 391*c*. In order to enable the cooling body 39*c* to cool the heat conduction part 351*c* of the micro refrigerator 35*c*, the cooling body 39*c* is in contact with the heat conduction part 351*c* of the micro refrigerator 35*c*, so that cold water continuously flowing into the cooling body 39*c* can continuously take away heat of the heat conduction part 351*c* to enable the heat conduction part 351*c* to be cooled, thereby enabling the micro refrigerator 35*c* to better perform refrigeration work. It should be noted that the cooling body 39*c* may be of a box structure or a bent pipeline structure or the like, which is not specifically limited herein.

In the embodiment of the present invention, further referring to FIG. 46, when the micro refrigerator 35*c* is located in the box body 32*c*, in order to enable the micro refrigerator 35*c* to effectively dissipate heat, a heat dissipation opening 324*c* is formed in the top of the box body 32*c*, a containing cavity 310*c* communicated with the heat dissipation opening 324*c* is formed above the spraying plate 38*c*, the heat conduction part 351*c* of the micro refrigerator 35*c* and the cooling body 39*c* are both arranged in the containing cavity 310*c*, and therefore heat generated by the heat conduction part 351*c* of the micro refrigerator 35*c* can be discharged out from the heat dissipation opening 324*c*. The containing cavity 310*c* is only communicated with the heat dissipation opening 324*c*, so that heat generated by the heat conduction part 351*c* can only be discharged from the heat dissipation opening 324 and cannot enter the cooking fume channel 323*c*. It should be noted that the containing cavity 310*c* may be a hollow cubic structure or a hollow cylindrical structure or the like, which is not specifically limited herein.

Figure 43:
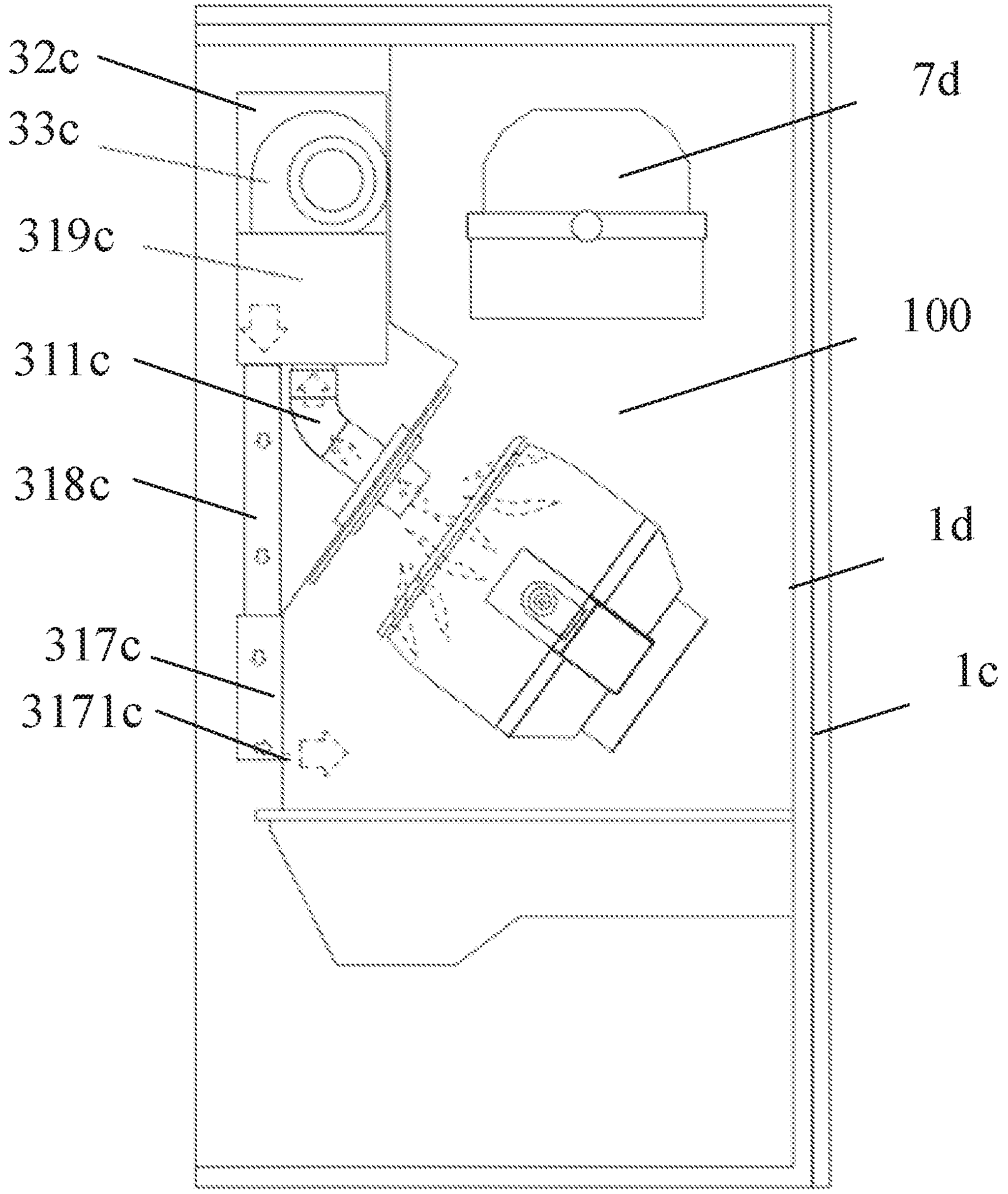
FIG. 43 is a left side view of a partial structure of the cooking machine capable of achieving full-closed cooking according to the second embodiment of the present invention.

In the embodiment of the present invention, preferably, referring to FIGS. 42-44, the cooking fume treatment device 3*c* further comprises a cooking fume inlet pipe 311*c* (which can be matched with the wok lid 23*c* mentioned below) and a spraying cavity 312*c* with an opening in the top, and the top of the spraying cavity 312*c* is fixed to the bottom of the part, provided with the spraying holes 380*c*, of the spraying plate 38*c*; the bottom of the spraying cavity 312*c* is positioned above the bottom in the box body 32*c* and is provided with a through opening 3120*c*; one end of the cooking fume inlet pipe 311*c* penetrates through the cooking fume inlet 321*c* in a sealed manner in the direction towards the interior of the box body 32*c* and penetrates into the spraying cavity 312*c* in a sealed manner, the other end of the cooking fume inlet pipe 311*c* penetrates into the cooking cavity 100, and therefore under the action of the fan 33*c*, the cooking fume in the cooking cavity 100 enters the spraying cavity 312*c* from the cooking fume inlet pipe 311*c*, and then the cooking fume enters an area between the box body 32*c* and the spraying cavity 312*c* from the through opening 3120*c*, and is finally discharged from the cooking fume outlet 322*c*. In the spraying cavity 312*c*, a cooking fume spraying channel 3121*c* which is arranged in an extending mode is formed between one end of the cooking fume inlet pipe 311*c* and the through opening 3120*c*, so that the path of cooking fume entering the spraying cavity 312*c* can become longer, and the condensation and filtration of the cooking fume are better facilitated. At least one cooking fume filtering layer 340*c* is arranged in the cooking fume spraying channel 3121*c*, and the at least one refrigerating sheet 350*c* is arranged in the spraying cavity 312*c* and is distributed right above the cooking fume spraying channel 3121*c*. In addition, the bottom of each section of the cooking fume spraying channel 3121*c* is communicated with the through opening 3120*c*, so that water sprayed into the cooking fume spraying channel 3121*c* from the spraying holes 380 of the spraying plate 38*c* can be discharged to the bottom in the box body 32*c* from the through opening 3120*c*.

Illustratively, the cooking fume treatment device 3*c* further comprises a transverse partition plate 314*c*, a first longitudinal partition plate 313*c*, a second longitudinal partition plate 315*c* and a third longitudinal partition plate 316*c*, all of which are shown in FIGS. 44-46; the first longitudinal partition plate 313*c* is longitudinally arranged between the spraying plate 38*c* and the bottom in the box body 32*c*, so that an area between the spraying plate 38*c* and the bottom in the box body 32*c* is divided into two parts, and a cooking fume channel opening 3130*c* is formed between the bottom of the first longitudinal partition plate 313 and the bottom in the box body 32*c*. The transverse partition plate 314 is located between the spraying plate 38*c* and the bottom in the box body 32*c* and transversely arranged between the first longitudinal partition plate 313*c* and a side plate, opposite to the first longitudinal partition plate 313*c*, of the box body 32*c*. Thus, the transverse partition plate 314*c*, the first longitudinal partition plate 313*c*, the spraying plate 38*c* and the corresponding inner side wall of the box body 32*c* can define the spraying cavity 312*c*.

In order to extend the cooking fume spraying channel 3121*c* formed between the end of the cooking fume inlet pipe 311*c* and the through opening 3120*c*, for example, as shown in FIGS. 44-46, the second longitudinal partition plate 315*c* is disposed longitudinally between the first longitudinal partition plate 313*c* and the side plate of the box body 32*c*, the top of the second longitudinal partition plate 315*c* is connected to the bottom of the spraying plate 38*c* in a sealed manner, and the bottom of the second longitudinal partition plate 315*c* is spaced from the top of the transverse partition plate 314*c*; the third longitudinal partition plate 316*c* is longitudinally arranged between the second longitudinal partition plate 315*c* and the side plate of the box body 32*c*, the top of the third longitudinal partition plate 316 and the bottom of the spraying plate 38*c* are arranged in a spaced mode, and the bottom of the third longitudinal partition plate 316*c* is fixed to the top of the transverse partition plate 314. Thus, at the other end of the smoke pipe between the first longitudinal partition plate 313*c* and the second longitudinal partition plate 315*c*, cooking fume exhausted by the cooking fume exhaust pipe can firstly pass through the area between the first longitudinal partition plate 313*c* and the second longitudinal partition plate 315, then pass through the area between the second longitudinal partition plate 315*c* and the third longitudinal partition plate 316*c*, and finally passes through an area between the third longitudinal partition plate 316*c* and the inner side wall of the corresponding box body 32*c*. Besides, the cooking fume outlet 322*c* is formed in the other side plate, opposite to the side plate, of the box body 32*c* and located below the spraying plate 38*c*, the through opening 3120*c* is formed in the transverse partition plate 314*c*, and the through opening 3120*c* is located between the third longitudinal partition plate 316 and the side plate (adjacent to and opposite to the third partition plate) of the box body 32*c*. Cooking fume entering the spraying cavity 312*c* can be discharged to the position between the transverse partition plate 314*c* and the bottom in the box body 32*c* from the through opening 3120*c*, and then is discharged out from the cooking fume channel opening 3130 and the cooking fume outlet 322*c* in sequence. Therefore, by arranging the partition plates in the box body 32*c*, the passing path of the cooking fume entering the box body 32*c* can be lengthened, which is more beneficial to the condensation and filtration of the cooking fume. In order to enable water sprayed between the second longitudinal partition plate and the third longitudinal partition plate to smoothly flow to the through opening 3120*c*, a gap 3160*c* is formed between the bottom of the third longitudinal partition plate and the transverse partition plate 314*c*.

It should be noted that the spraying cavity 312*c* may also be a hollow cylindrical structure or other structure or the like, which is not specifically limited herein. In addition, the extending mode of the cooking fume spraying channel 3121*c* in the spraying cavity 312*c* can also be other arrangement modes, for example, the cooking fume spraying channel 3121*c* can be of a spiral structure from top to bottom or a spiral structure from inside to outside on the horizontal plane, which is not limited herein.

As a further improvement on the cooking fume treatment device 3*c*, a secondary cooking fume treatment device is additionally arranged on the basis of the cooking fume treatment device 3*c*, and cooking fume treated by the cooking fume treatment device 3*c* needs to be treated by the secondary cooking fume treatment device and then flows back into the cooking cavity 100, that is, the cooking fume outlet 322*c* of the cooking fume treatment device 3*c* is communicated with the interior of the cooking cavity 100 via the secondary cooking fume treatment device instead of being directly connected with the interior of the cooking cavity 100. Specifically, referring to FIGS. 44-47, the secondary cooking fume treatment device comprises a first filter box 317*c*, the first filter box 317*c* is provided with a fume inlet 3170*c* and a fume outlet 3171*c*, the fume inlet 3170*c* is communicated with the cooking fume outlet 322*c* of the cooking fume treatment device 3*c*, and the fume outlet 3171*c* is communicated with the interior of the cooking cavity 100, thus, cooking fume entering the box body 32*c* from the cooking fume inlet 321*c* enters the first filter box 317*c* from the cooking fume outlet 322*c* and then enters the cooking cavity 100 again from the fume outlet 3171*c*. In addition, at least one cooking fume filter layer 3172*c* is arranged between the fume inlet 3170*c* and the fume outlet 3171*c*, so that the cooking fume treated in the box body 32*c* can be filtered by the cooking fume filter layer 3172*c* in the first filter box 317*c* after entering the first filter box 317*c*, and the cooking fume can be treated more effectively.

Preferably, referring to FIGS. 44-47, the cooking fume treatment device 3*c* further comprises a draining pipe 3173*c*. The fume inlet 3170*c* is formed in the top of the first filter box 317*c*, and the fume outlet 3171*c* is formed in the bottom of the first filter box 317*c*, so that cooking fume entering the first filter box 317*c* can sequentially pass through the cooking fume filter layer 3172*c* arranged between the fume inlet 3170*c* and the fume outlet 3171*c* from top to bottom. In addition, the first filter box 317*c* is located below the box body 32*c*, one end of the draining pipe 3173*c* is connected with the top of the first filter box 317*c*, and the other end of the draining pipe 3173*c* penetrates into the box body 32*c* in a sealed manner and protrudes relative to the bottom in the box body 32*c*, thus, when water is added into the box body 32*c* to enable the water level in the box body 32*c* to be higher than the set height of the other end of the draining pipe 3173*c*, the water in the box body 32*c* can flow into the first filter box 317*c* from the draining pipe 3173*c* and pass through the cooking fume filter layer arranged between the fume inlet 3170*c* and the fume outlet 3171*c* from top to bottom, so that the first filter box 317*c* can be effectively cooled, and cooking fume entering the first filter box 317*c* can be effectively condensed.

Water falling into the first filter box 317*c* can be discharged to the bottom of the cooking cavity 100 from the fume outlet 3171*c* and then discharged out from a water outlet 101*c* (the water outlet 101*c* is communicated with a bottom opening of the cooking cavity 100) formed in the bottom of the outer shell 1*c*. It should be noted that when the water adding opening 320*c* is formed in the top of the box body 32*c*, water is added into the box body 32*c* from the water adding opening 320*c*, so that the water passes through the spraying plate 38*c* and then can uniformly spray the cooking fume filtering assembly 34*c*, the cooking fume filtering assembly 34*c* can be cooled, and the cooking fume filtering assembly 34*c* can be cleaned to a certain extent; when the water level of the accumulated water falling into the bottom in the box body 32*c* is higher, the accumulated water falls into the first filter box 317*c* from the draining pipe 3173*c*, so that the cooking fume filter layer 3172*c* in the first filter box 317*c* is cleaned, then is discharged into the cooking cavity 100 from the fume outlet 3171*c* and finally discharged from the water outlet 101*c*. In order to enhance the cooking fume cleaning effect on the cooking fume filtering assembly 34*c*, cooking fume cleaning liquid can be added into the box body 32*c* from the water adding opening 320*c*.

As a further improvement of the above embodiment, referring to FIGS. 44-47, the secondary cooking fume treatment device further comprises a cooking fume outlet pipe 318*c* and a second filter box 319*c*, the second filter box 319*c* is communicated with the cooking fume outlet 322*c* via the fan 33*c* and communicated with the fume inlet 3170*c* of the first filter box 317*c* via the cooking fume outlet pipe 318*c*, and at least one cooking fume filter layer 3190*c* is arranged in the second filter box 319*c*. The cooking fume discharged from the cooking fume outlet 322*c* of the box body 32*c* enters the second filter box 319*c*, and enters the first filter box 317*c* to be filtered again after being filtered by the cooking fume filter layer 3190*c* in the second filter box 319, so that the cooking fume filtering effect can be further improved.

It should be noted that the cooking fume filtering layer of the above embodiments of the present invention may be made of a material which has good adsorption capacity on cooking fume and a good thermal conductivity, for example, the cooking fume filtering layer may be made of steel wire balls or stacked metal wire meshes arranged and the like, and is not limited in particular herein.

According to the analysis, in the embodiment of the present invention, the cooking fume generated in the cooking process can be effectively treated by arranging the cooking fume treatment device 3*c*, so that pollution of the cooking fume to the environment can be effectively avoided. Moreover, the cooking fume primarily treated by the cooking fume treatment device 3*c* sequentially enters the second filter box 319*c* and the first filter box 317*c* of the secondary cooking fume treatment device to be filtered twice and then returns to the cooking cavity to be circularly treated, so that zero cooking fume emission in a real sense is realized.

Figure 54:
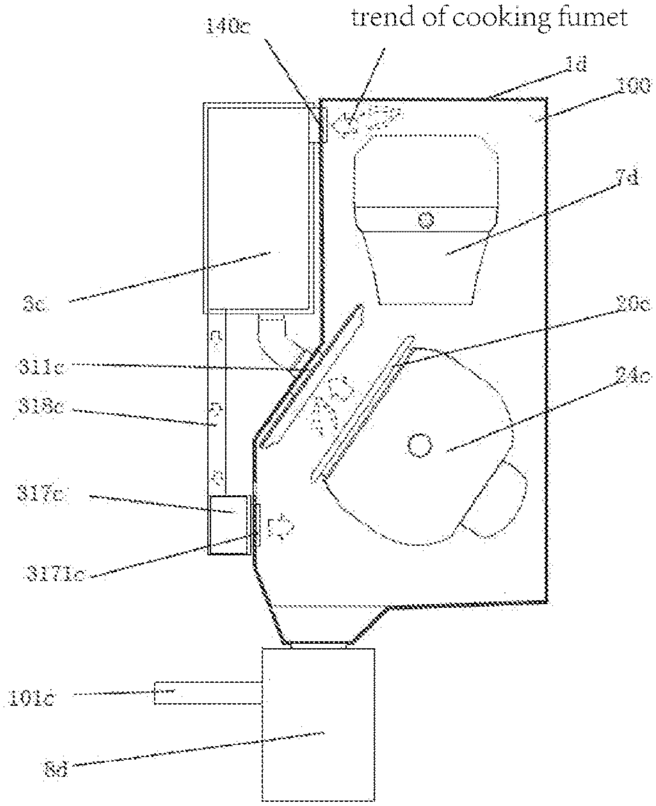
FIG. 54 is a schematic diagram of a cooking fume treatment system structure of another embodiment provided by the present invention.

Moreover, as a further optimized design of the cooking fume treatment system of the embodiment, referring to FIG. 54, on the basis of the cooking fume treatment system, a second exhaust port 140*c* is directly formed in the inner shell 1*d*, the interior of the cooking cavity 100 communicates with the cooking fume inlet 321*c* of the cooking fume treatment device 3*c* via the second exhaust port 140*c*, so that the cooking fume in the cooking cavity 100 can be directly discharged to the cooking fume treatment device 3*c* from the second exhaust port 140*c* for cooking fume treatment. Thus, the cooking fume escaping out from the wok to the cooking cavity 100 in the cooking process and the cooking fume flowing back into the cooking cavity 100 after being treated by the cooking fume treatment device 3*c*/the secondary cooking fume treatment device can be exhausted to the cooking fume treatment device 3*c* from the second exhaust port 140*c* for cooking fume treatment. Therefore, as an improved design, the cooking fume generated in the closed cooking process of the wok 20*c* is discharged to the cooking fume treatment device 3*c* from the exhaust port of the wok lid for cooking fume treatment; the cooking fume escaping out from the wok to the cooking cavity 100 is discharged to the cooking fume treatment device 3*c* from the second exhaust port 140*c* for cooking fume treatment when the wok 20*c* is opened, so that the cooking fume treatment efficiency and effect are further improved.

The structure of the wok moving control device 22*c* is described in detail below with referring with FIGS. 49-53:

In an alternative embodiment as shown in FIGS. 49-53, the wok moving control device 22*c* includes a main driving screw rod 220*c*, an auxiliary driving screw rod 221*c*, a driving motor 222*c*, a synchronous rotating assembly 224*c* and two moving connecting pieces 223*c*; the two moving connecting pieces 223*c* are used for being connected with both sides of the wok 20*c*; the first end of the main driving screw rod 220*c* is connected with one of the moving connecting pieces 223*c*, and the first end of the auxiliary driving screw rod 221*c* is connected with the other moving connecting piece 223*c*; the second end of the main driving screw rod 220*c* is connected with the second end of the auxiliary driving screw rod 221*c* via the synchronous rotating assembly 224*c*; the driving motor 222*c* is used for driving the main driving screw rod 220*c* to rotate. The main driving screw rod 220*c* and the auxiliary driving screw rod 221*c* are arranged in parallel.

The working principle of the wok moving control device 22*c* in the embodiment of the present invention is as follows: the driving motor 222*c* drives the main driving screw rod 220*c* to rotate, and simultaneously drives the auxiliary driving screw rod 221*c* to rotate through the synchronous rotating assembly 224*c*, that is, the driving motor 222*c* rotates to simultaneously drive the main driving screw rod 220*c* and the auxiliary driving screw rod 221*c* to rotate; the main driving screw rod 220*c* and the auxiliary driving screw rod 221*c* convert rotation into linear motion to drive the left side and the right side of the wok 20*c* to move front and back synchronously. The embodiment of the present invention adopts double-side synchronous driving, avoids the distortion of the wok device caused by single-side driving, and only needs one driving motor 222*c*, thereby having simple structure and reducing cost.

In an alternative embodiment, referring to FIGS. 49-53, the synchronous rotating assembly 224*c* includes a first synchronous wheel 2240*c*, a second synchronous wheel 2241*c* and a first synchronous belt 2242*c*; the first synchronous wheel 2240*c* is arranged on the main driving screw rod 220*c*; the second synchronous wheel 2241*c* is arranged on the auxiliary driving screw rod 221*c*; the first synchronous belt 2242 is connected with the first synchronous wheel 2240*c* and the second synchronous wheel 2241, so that the first synchronous wheel 2240*c* drives the second synchronous wheel 2241*c* to rotate when rotating. The rotation of the first synchronous wheel 2240 is transmitted to the second synchronous wheel 2241*c* via the first synchronous belt 2242*c*, so that the main driving screw rod 220*c* drives the auxiliary driving screw rod 221*c* to rotate.

In an alternative embodiment, please refer to FIGS. 49-53, the synchronous rotating assembly 224*c* further includes a third synchronous wheel 2243*c*, a fourth synchronous wheel 2244*c* and a second synchronous belt 2245*c*; a driving terminal of the driving motor 222*c* is connected with the third synchronous wheel 2243*c*; the fourth synchronous wheel 2244*c* is arranged on the main driving screw rod 220*c*; the second synchronous belt 2245*c* is connected with the third synchronous wheel 2243*c* and the fourth synchronous wheel 2244*c*, so that the third synchronous wheel 2243*c* drives the fourth synchronous wheel 2244*c* to rotate when rotating. According to the embodiment of the present invention, the main driving screw rod 220*c* is indirectly driven via the third synchronous wheel 2243*c*, the fourth synchronous wheel 2244*c* and the second synchronous belt 2245*c* instead of directly driving the main driving screw rod 220c by adopting the driving motor 222c, so that the driving motor 222c can be well protected, and the service life of the driving motor 222c is prolonged.

In an alternative embodiment, please refer to FIGS. 49-53, the wok moving control device 22c further comprises two linear sliding rails 26c fixed inside the cooking machine and parallel to each other; the two moving connecting pieces 223c are movably arranged on the two linear sliding rails 26c in a one-to-one correspondence mode. Specifically, the two movable connecting pieces 223c are each provided with a sliding block (not shown), and the sliding blocks are provided with sliding grooves (not shown) matched with the corresponding linear sliding rails 26c.

In an alternative embodiment, please refer to FIGS. 49-53, the wok moving control device 22c further comprises a limit switch box 27c disposed above one of the moving connecting pieces 223, and the limit switch box 27c comprises a first limit switch 271c arranged at the upper limit position of the wok and a second limit switch 272c arranged at the lower limit position of the wok.

By using the first limit switch 271c and the second limit switch 272c, whether the wok 20c reaches two limit positions in the linear motion direction or not can be detected, and when the wok 20c reaches the two limit positions, the driving motor 222c is stopped, so that the moving mechanism is prevented from being damaged.

More preferably, the wok moving control device 22c further comprises an upper sensor (not shown) and a lower sensor (not shown) which are arranged on one of the moving connecting pieces 223c and used for sensing whether the up-and-down driving position of the furnace body reaches the position required by the system or not. The upper sensor is used for controlling the driving motor 222c to stop rotating by the system after sensing that the wok 20c reaches a wok lid position when moving upwards, so that the wok 20c is positioned at the position to perform a cooking operation, and the lower sensor is used for controlling the driving motor 222c to stop rotating by the system after sensing that the wok 20c moves downwards to reach a wok lid opening position, so that the wok 20c is positioned at the position to perform a working position changing operation.

According to the embodiment of the present invention, the wok moving control device 22c is used for controlling the wok 20c to move, so that the wok 20c can be moved to a preset position as required in the cooking process, the wok 20c can be matched well with other devices of the full-automatic cooking machine, and the automation of the cooking machine is improved.

Figure 51:
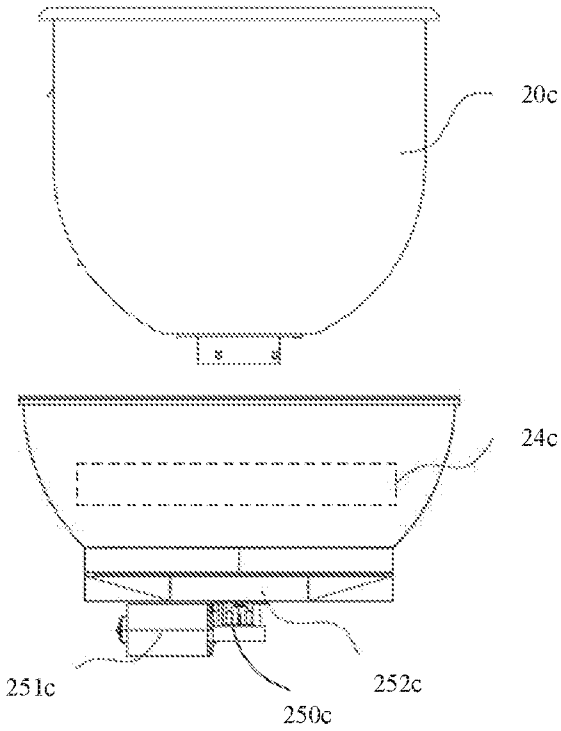
FIG. 51 is a schematic view of a partial structure of the wok device shown in FIG. 39.
Figure 52:
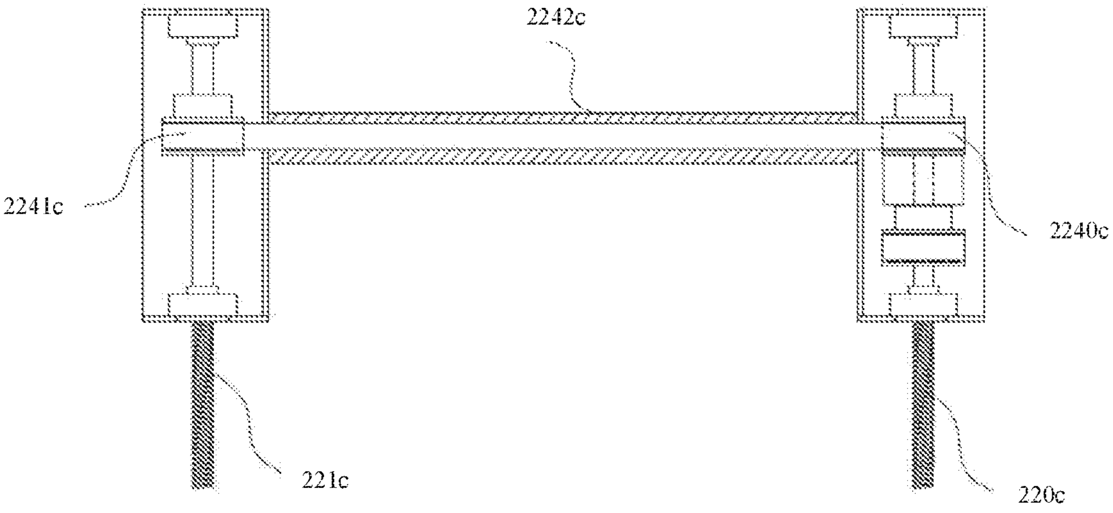
FIG. 52 is a schematic partial configuration of the wok moving control device shown in FIG. 49.
Figure 53:
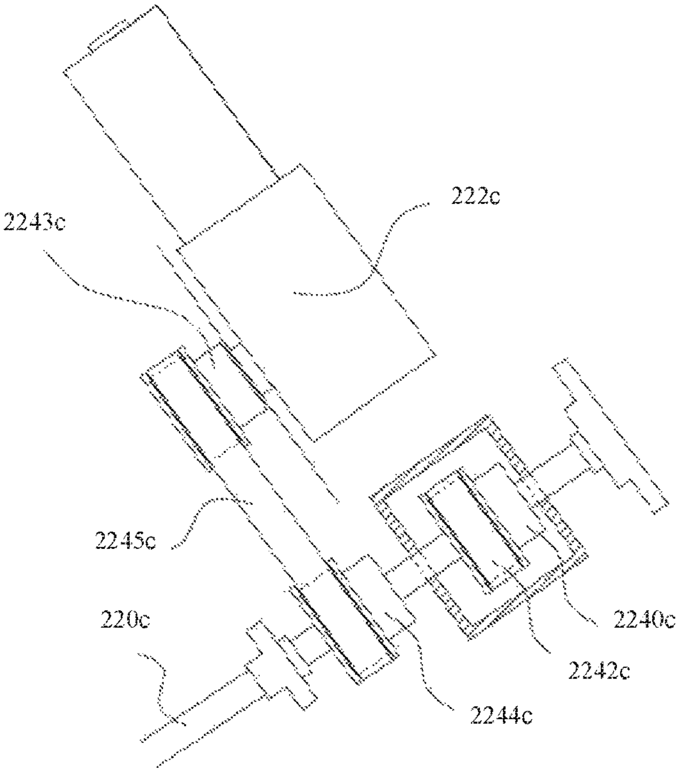
FIG. 53 is a schematic partial configuration of the wok moving control device shown in FIG. 49.

Referring to FIG. 51, the furnace body device 24c is electrically connected with the control device 13c and is used for heating the wok 20d; the wok rotating device 25d is electrically connected with the control device 13c and is used for controlling the wok 20c to rotate around the central axis of the wok 20c so as to realize cooking. Exemplarily, referring to FIG. 51, the wok rotating device 25c comprises a rotating shaft 250c, a stir-frying motor 251c and a wok fixing frame 252c; the wok working position controlling device is used for turning the wok fixing frame 252c; the furnace body device 24c and the wok 20c are both arranged in the wok fixing frame 252c, the stir-frying motor 251c is fixed at the bottom of the wok fixing frame 252c, the stir-frying motor 251c is in driving connection with the wok 20c via the rotating shaft 250c, and the stir-frying motor 251c is electrically connected with the control device 13c, so that when a stir-frying control command sent out by the control device 13c is received, the stir-frying motor 251c drives the rotating shaft 250c to rotate to drive the wok 20c to rotate. Specifically, the furnace body device 24c comprises a heating coil (not shown) which is wound on the inner side wall of the wok fixing frame 252c and surrounds the wok 20c. It should be noted that the specific structures of the furnace body device 24c and the wok rotating device 25c may also be referred to the prior art and will not be described in detail herein.

In addition, according to the embodiment of the present invention, the cooking cavity arranged in a sealed manner is used as a closed cooking working space, the cooking equipment is arranged in the closed cooking space in the cooking cavity to realize the cooking function, and the spraying piece capable of washing the cooking equipment is arranged in the cooking cavity, and an opening used for being connected with a water outlet is formed in the bottom of the cooking cavity so as to discharge water generated after the spraying piece washes the cooking equipment.

Please refer to FIGS. 55-59, the automatic cooking machine provided by the embodiment of the present invention further comprises a water supply switch 2d, at least one water spraying piece 3d, a wok turning angle detector 6d, an ingredient feeding mechanism 7d, a food waste processor 8d and a flow guiding device 9d. The at least one water spraying piece 3d is arranged in the cooking cavity 100 and is communicated with a water source via the water supply switch 2d, for example, the at least one water spraying piece 3d is arranged at the top in the cooking cavity 100 to directly spray and flush the ingredient feeding mechanism 7d arranged at the upper part in the cooking cavity. The wok turning angle detector 6d is arranged in the inner shell 1d (or is arranged between the inner shell 1d and the outer shell 1c) and is used for detecting the turning angle of the wok 20c. The ingredient feeding mechanism 7d comprises an ingredient-dropping chamber 70d and compartment door driving mechanisms 71d, the ingredient-dropping chamber 70d is used for containing food ingredients, the ingredient-dropping chamber 70d is arranged under the at least one water spraying piece 3d and located over the wok 4, and at least one water spraying inlet facing the corresponding water spraying piece 3d is formed in the top wall of the ingredient-dropping chamber 70d; the bottom wall of the ingredient-dropping chamber 70d is provided with at least one ingredient-dropping opening aligned with the opening of the wok 20c in the feeding/flushing process, and each ingredient-dropping opening is provided with a compartment door. Each compartment door driving mechanism 71d is used for correspondingly driving the compartment door to be opened and closed. The flow guiding device 9d is arranged below the wok 20c and is positioned at the bottom of the cooking cavity 100, and the flow guiding device 9d is connected with the water outlet 101c via the food waste processor 8d and is used for guiding water poured from the wok 20c to an inlet 81d of the food waste processor 8d. An outlet 80d of the food waste processor 8d is communicated with the water outlet 101c. The wok turning angle detector 6d, the food waste processor 8d, the compartment door driving mechanisms 71d and the water supply switch 2d are electrically connected with the control device 13c so as to receive control commands sent by the control device 13c according to a preset recipe program and perform corresponding operations according to the control commands.

Figure 59:
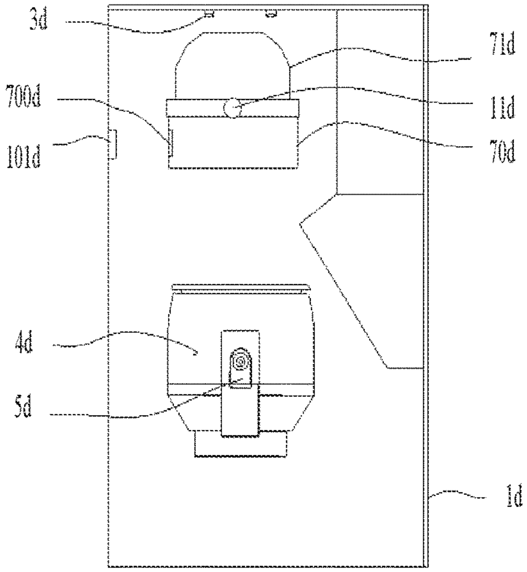
FIG. 59 is a schematic view of the state of the ingredient feeding device shown in FIG. 55 after the ingredient feeding device is flipped down.
Figure 60:
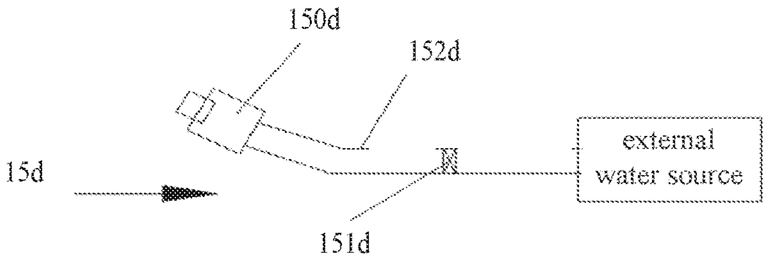
FIG. 60 is a schematic diagram of a structure of the wok washing device of the present embodiment.

The working process of the embodiment of the present invention has the following two situations:

1. When the intelligent cooking machine needs to be used for cooking, food ingredients can be put into the ingredient-dropping chamber 70d in advance, so that when the intelligent cooking machine is in a feeding procedure, the wok turning angle detector 6*d* sends detected turning angle data of the wok 20*c* to the control device 13*c*; the control device 13*c* controls the wok working position controlling device 21*c* to drive the wok 20*c* to turn according to the turning angle data received at the moment, as shown in FIG. 59, so that the opening of the wok 20*c* is aligned with the ingredient-dropping opening 73*d* of the ingredient feeding mechanism 7*d*; the control device 13*c* sends a corresponding operation command to the compartment door driving mechanism 71*d*, so that the compartment door driving mechanism 71*d* opens the corresponding compartment door according to the operation command, and the food ingredients in the ingredient-dropping chamber 70*d* can fall into the wok 20*c* from the corresponding ingredient-dropping opening 73*d*.

Figure 55:
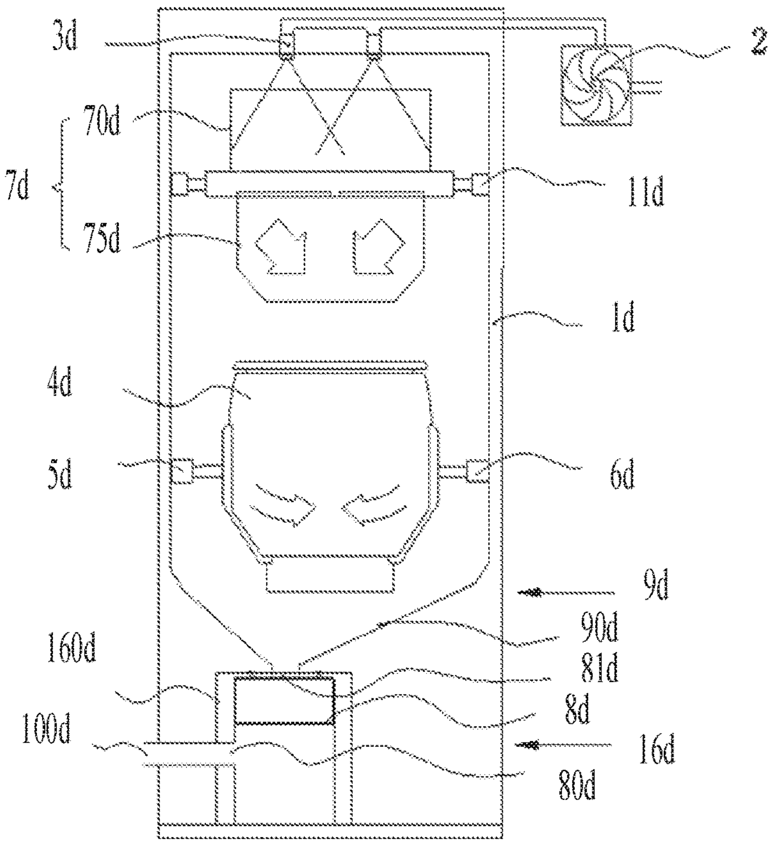
FIG. 55 is a front view of a cooking machine showing a spraying flushing system of an ingredient feeding device in accordance with an embodiment of the present invention.
Figure 56:
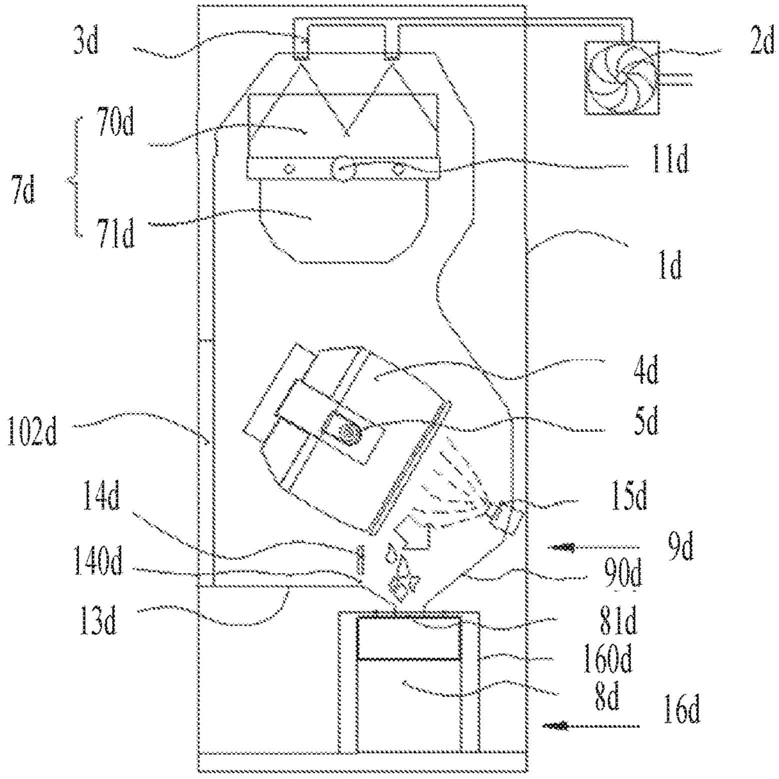
FIG. 56 is a front view of a cooking machine showing a spraying flushing system of an ingredient feeding device according to an embodiment of the present invention.
Figure 57:
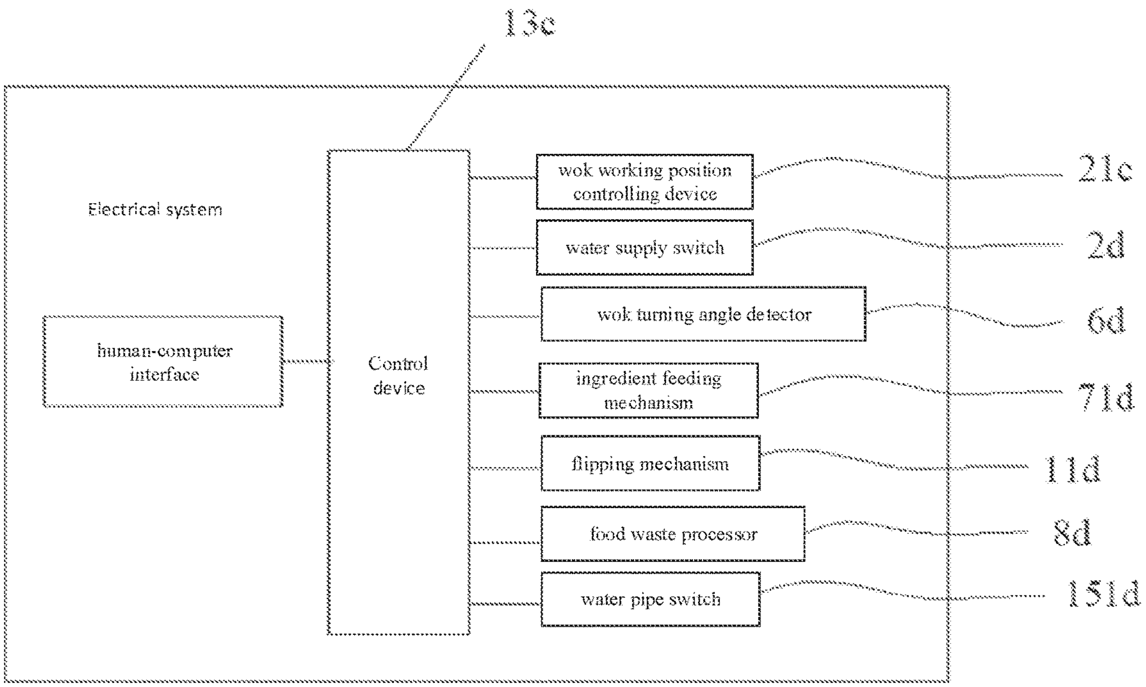
FIG. 57 is a schematic diagram of an electrical system of a cooking machine according to an embodiment of the present invention.
Figure 58:
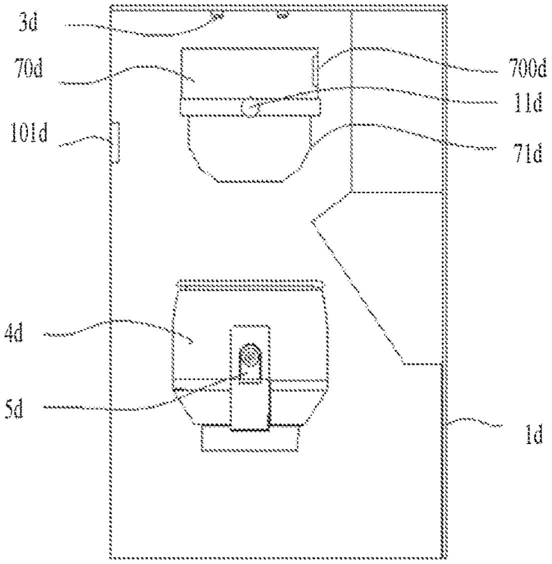
FIG. 58 is a schematic view of the state of the ingredient feeding device shown in FIG. 55 after ingredient feeding device is flipped up.

2. After the intelligent cooking machine finishes a dish discharging process, the wok turning angle detector 6*d* sends detected turning angle data of the wok 20*c* to the control device 13*c*; the control device 13*c* controls the wok working position controlling device 21*c* to drive the wok 20*c* to turn according to the turning angle data received at the moment, as shown in FIG. 59, so that the opening of the wok 20*c* is aligned with the ingredient-dropping opening 73*d* of the ingredient feeding mechanism 7*d*; the control device 13*c* also sends a corresponding operation command to the compartment door driving mechanism 71*d*, so that the compartment door driving mechanism 71 opens the corresponding compartment door according to the operation command, as shown in FIG. 55, and at the moment, the control device 13*c* controls the water supply switch 2*d* to be switched on to supply high-pressure water to the water spraying pieces 3*d*, so that the water spraying pieces 3*d* spray water to the ingredient feeding mechanism 7*d* below the water spraying piece 3*d*; the water sprayed by the water spraying pieces 3*d* falls into the ingredient-dropping chamber 70*d* from the corresponding water spraying inlets 72*d*, ingredient residues in the ingredient-dropping chamber 70*d* are washed down from the ingredient-dropping openings 73*d*, and the ingredient residues attached to the compartment door can be washed down by the water washed down from the ingredient-dropping openings 73; flushed ingredient residues and water fall into the wok 20*c* located under the ingredient-dropping chamber 70*d* to flush the wok. After the water spraying pieces 3*d* stop spraying water, the control device 13*c* controls the wok working position controlling device 21*d* to drive the wok 20*c* to turn according to the received turning angle data of the wok 20*c* at the moment, as shown in FIG. 56, so that the opening of the wok 20*c* faces the opening in the top of the flow guiding device 9*d* to perform water pouring work, so that water and ingredient residues in the wok 20*c* fall into the flow guiding device 9*d*, the flow guiding device 9*d* guides the water and ingredient residues poured down from the wok 20*c* to the food waste processor 8*d*, and the food waste processor 8*d* treats the ingredient residues mixed in the water and then discharges the water from the water outlet 101*c*, and finally, the cleaning of the ingredient feeding mechanism 7*d* and the wok 20*c* is completed.

It will be appreciated that the intelligent cooking machine may also clean the ingredient feeding mechanism 7*d* before food ingredients are placed into the ingredient-dropping chamber 70*d*, and the cleaning process can be referred to the foregoing and is not described herein again.

It should be noted that the water supply switch 2*d* can be an electric valve body arranged in the inner shell 1*d* or outside the inner shell 1*d*, and can also be an electric water pump arranged in the inner shell 1*d* or outside the inner shell 1*d*, which is not particularly limited herein.

In the embodiment, reference may be made to the description related to the first embodiment for the working process and the working principle of the ingredient feeding device and the wok that are washed by the spraying pieces 3*d*, the specific arrangement and the structure of the spraying pieces 3*d*, and the specific structure of the ingredient feeding mechanism 7*d*, which are not described herein again.

In the embodiment of the present invention, please refer to FIGS. 56, 61, 62, 64 and 65, the automatic cooking machine further comprises a dish discharging tray 13*d*, a flushing piece 18*d* and a water inlet switch 17*d* electrically connected with the control device 13*c*. One side face of the inner shell 1*d* is provided with a dish discharging outlet 102*d* adjacent to the dish discharging tray 13*d*. The dish discharging tray 13*d* is arranged under the wok 20*c* and obliquely above the flow guiding shell 90*d*, and the dish discharging tray 13*d* is located between the dish discharging outlet 102*d* and the top of the flow guiding shell 90*d*; a dish containing plate (not shown) can be placed on the dish discharging tray 13*d* from the dish discharging outlet 102*d*, so that dishes poured down from the wok 20*c* can be contained in the dish containing plate, and the dish containing plate can be taken out from the dish discharging tray 13*d* from the dish discharging outlet 102*d*. In addition, the top face of the dish discharging tray 13*d* gradually inclines downwards from one end to the other end thereof, and the flushing piece 18*d* is arranged at the one end of the top face of the dish discharging tray 13*d* and communicated with a water source via the water inlet switch 17*d*. When the top face of the dish discharging tray 13*d* needs to be cleaned, the control device 13*c* controls the water inlet switch 17*d* to be turned on, so that the flushing piece 18*d* sprays water to the top face of the dish discharging tray 13*d*, and the water sprayed from the flushing piece 18*d* flows from the one end to the other end of the top face of the dish discharging tray 13*d*, so that the top face of the dish discharging tray 13*d* can be washed, and the water used for washing the top face of the dish discharging tray 13*d* can flow into the flow guiding device 9*d* and then is guided to the water outlet 101*c* by the flow guiding device 9*d* to be drained out.

Figure 63:
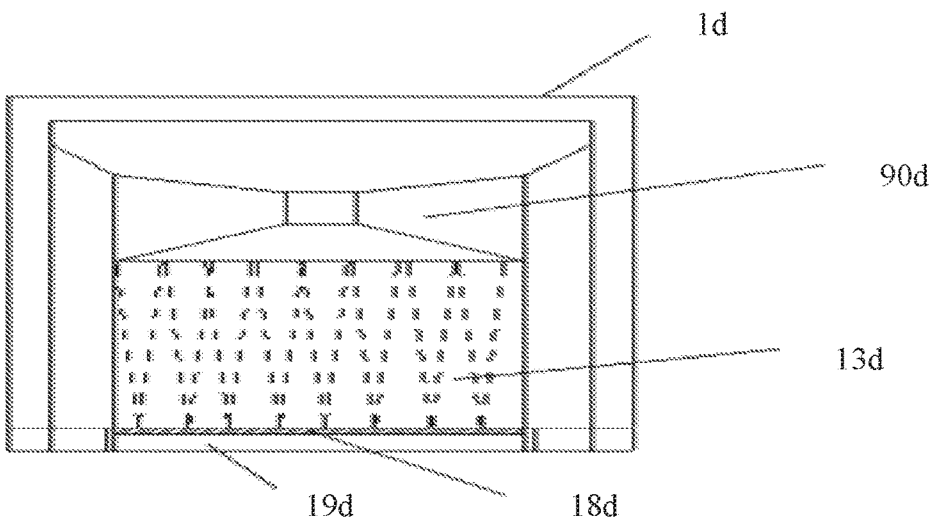
FIG. 63 is a top view of the intelligent cooking machine shown in FIG. 61.

In the embodiment of the present invention, preferably, referring to FIGS. 55 and 56, the flow guiding device 9*d* comprises a flow guiding shell 90*d* which is open at the upper end and the lower end and is of a hollow structure. The flow guiding shell 90*d* is arranged at the bottom of the cooking cavity and located below the wok 20*c* and over the food waste processor 8*d*, and an opening in the bottom of the flow guiding shell 90*d* communicates with an inlet 81*d* of the food waste processor 8*d*. The flow guiding shell 90*d* is gradually narrowed from the top to the bottom thereof, so that when the wok 20*c* is used for pouring water, the water poured from the wok 20*c* can intensively flow down into the food waste processor 8*d*. Specifically, referring to FIGS. 56, 63 and 64, the other end of the top surface of the dish discharging tray 13*d* extends to the opening at the top of the flow guiding shell 90*d*, so that water falling from the top surface of the dish discharging tray 13*d* can flow into the flow guiding shell 90*d* from the opening at the top thereof.

In order to prevent water poured down from the wok 20*c* from splashing onto the dish discharging tray 13*d*, referring further to FIG. 56, the cooking machine further comprises a water baffle 14*d*. The water baffle 14*d* is arranged at the other end of the top surface of the dish discharging tray 13*d*, and at least one water through opening 140*d* is formed by the water baffle 14*d* and the top surface of the dish discharging tray 13*d*, so that water poured and splashed from the wok 20*c* can be blocked by the water baffle 14*d*, and water for flushing the top surface of the dish discharging tray 13*d* can flow into the opening in the top of the flow guiding shell 90*d* from the water through opening 140*d*.

In order to effectively clean the wok 20*c*, preferably, referring to FIG. 56, the automatic cooking machine further comprises a wok washing device 15*d*, and the wok washing device 15*d* comprises a wok washing spray head 150*d* arranged in the cooking cavity 100, so that the wok 20*c* can be cleaned by the wok washing spray head 150*d*. The wok washing device 15*d* further comprises a water pipe switch 151*d* and a water inlet pipe 152*d*, the water pipe switch 151*d* and the water inlet pipe 152*d* are arranged outside the cooking cavity 100; a water outlet pipe opening of the water inlet pipe 152*d* is connected with the wok washing spray head 150*d*, and a water inlet pipe opening of the water inlet pipe 152*d* is used for being communicated with an external water source; the water pipe switch 151*d* is arranged on the water inlet pipe 152*d* and is electrically connected with the control device 13*c*.

Preferably, referring to FIG. 56, the wok washing spray head 150 is arranged over the flow guiding shell 90*d* and used for spraying and washing the wok 20*c* with the wok opening facing the opening in the top of the flow guiding shell 90*d* after being turned, that is, the arrangement position of the wok washing spray head 150*d* enables the wok washing spray head 150*d* to be aligned with the opening of the wok 20*c* after being turned. After the intelligent cooking machine finishes the dish discharging process, if the wok 20*c* needs to be cleaned, the wok 20*c* can be turned by the wok working position controlling device 21*c*, so that the opening of the wok 20*c* faces the opening in the top of the flow guiding shell 90, and at the moment, the water pipe switch 151*d* can be turned on, so that the wok washing spray head 150*d* can perform high-pressure spray washing on the interior of the wok 20*c*, and the wok washing water after spray washing can fall into the flow guiding shell 90*d*. It should be noted that after the ingredient feeding mechanism 7*d* is cleaned and the wok 20*c* is in a water pouring work state, the water pipe switch 151*d* can also be turned on, so that the wok washing spray head 150*d* can perform high-pressure spray washing on the interior of the wok 20*c*, and the wok 20*c* is effectively cleaned.

It is worth noting that the water pipe switch 151*d* is an electrically controlled valve body switch. In addition, the wok washing device 15*d* can also be of other structures, and specific reference can be made to the prior art, which are not described herein again.

Preferably, referring to FIGS. 55 and 56, the cooking machine further comprises a fixing device 16*d* for fixing the food waste disposer 8*d*, and the fixing device 16*d* is arranged inside the inner shell 1*d* and the outer shell 1*c*, so that the food waste disposer 8*d* can be effectively fixed by the fixing device 16*d*. Specifically, referring to FIGS. 55 and 56, the fixing device 16*d* comprises a fixing frame 160*d*, the fixing frame 160*d* sleeves the food waste processor 8*d*, the bottom of the fixing frame 160*d* is connected with the bottom in the shell 1*c*, and the top of the fixing frame 160*d* is located above the top of the food waste processor 8*d* and clamped with the top of the food waste processor 8*d*, so that the food waste disposer 8*d* can be effectively fixed by the fixing frame 160*d*. It is to be noted that the fixing device 16*d* may also be a screw connection structure or a snap-fit structure or the like for connecting the food waste disposer 8*d* to the shell 1, which is not specifically limited herein.

The food waste disposer 8*d* may also be fixed in other forms, exemplarily, referring to FIGS. 55 and 56, the bottom of the flow guiding shell 90*d* is clamped into the inlet 81*d* at the top of the food waste disposer 8*d*, such that the food waste disposer 8*d* and the bottom of the flow guiding shell 90*d* are clamped together, and the food waste disposer 8*d* is effectively fixed. It will be appreciated that the connection relationship between the inlet 81*d* of the food waste disposer 8*d* and the opening at the bottom of the flow guiding shell 90*d* may also be: the inlet 81*d* of the food waste disposer 8*d* and opening at the bottom of the flow guiding shell 90*d* are of uniform size and are connected in alignment with each other, and the connection between the inlet 81*d* and the opening at the bottom of the flow guiding shell 90*d* is provided by waterproof sealing (reference may be made to the existing waterproof sealing technology).

Figure 62:
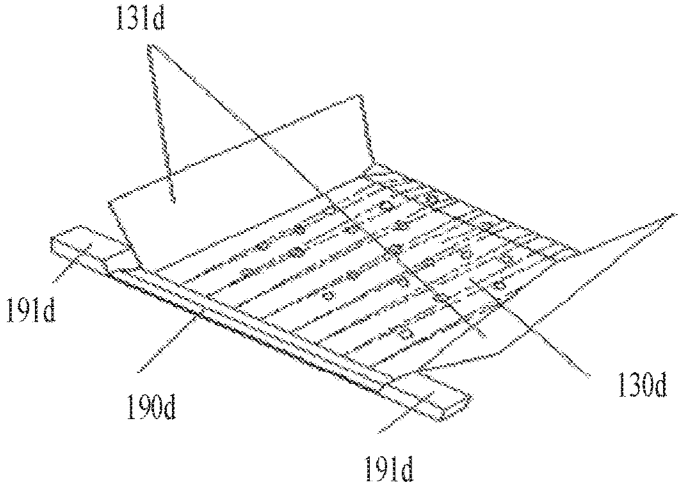
FIG. 62 is a schematic diagram of the structure of the dish discharging tray shown in FIG. 61.
Figure 64:
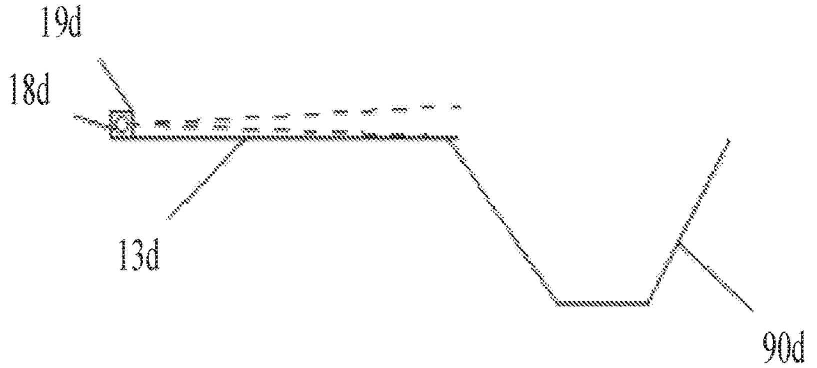
FIG. 64 is a cross-sectional view of the intelligent cooking machine shown in FIG. 63.
Figure 65:
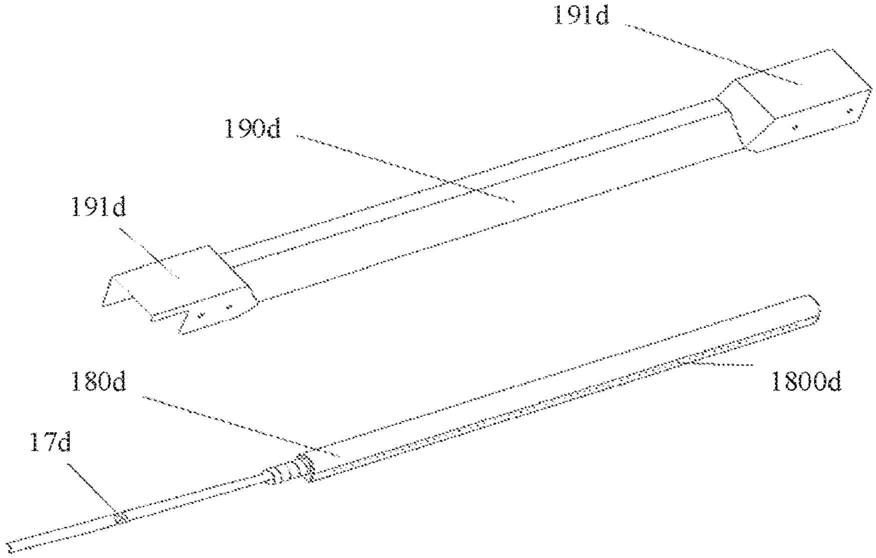
FIG. 65 is an assembled schematic view of the protective cover and the flushing tube shown in FIG. 64.

In the embodiment of the present invention, preferably, with reference to FIGS. 62, 64, and 65, the flushing piece 18*d* includes a flushing tube 180*d* for communicating with an external water source via the water inlet switch 17*d*, the outer sidewall of the flushing tube 180*d* is provided with a row of water outlet holes 1800*d* that faces the other end of the dish discharging tray 13*d*, and the row of water outlet holes 1800*d* are sequentially arranged from one end to the other end thereof. The row of water outlet holes 1800*d* are formed in the outer side wall of the flushing tube 180*d*, so that a flushing water curtain can be formed on the top surface of the dish discharging tray 13*d* during flushing, and the whole top surface of the dish discharging tray 13*d* can be better flushed. It should be noted that the flushing piece 18*d* may also be a spray head or the like, which is not specifically limited herein.

Figure 61:
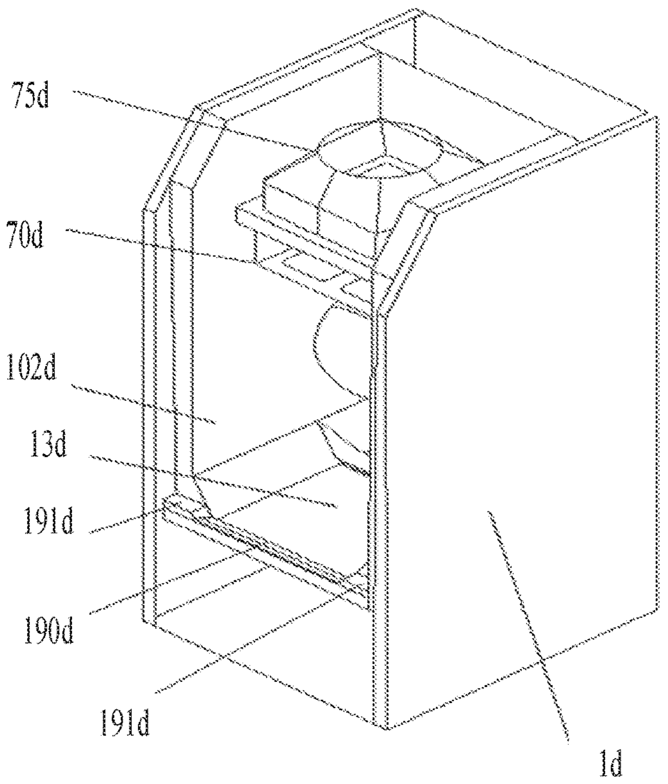
FIG. 61 is a schematic view of a partial structure of a cooking machine showing the internal structure of a cooking cavity in accordance with an embodiment of the present invention.

Further, referring to FIGS. 61, 62 and 65, the cooking machine further comprises a protective cover 19*d* for covering the flushing tube 180*d* on the top surface of the dish discharging tray 13*d*, so that the flushing tube 180*d* can be effectively protected by arranging the protective cover 19*d*. The protective cover 19*d* is provided with a side wall facing the other end of the dish discharging tray 13*d*, the bottom of the side wall is spaced from the top surface of the dish discharging tray 13*d*, and therefore water sprayed out of the flushing tube 180*d* can smoothly flow to the other end of the top surface of the dish discharging tray 13*d*. Preferably, when the bottom of the side wall of the protective cover 19*d* is higher than the set height of the row of water outlet holes 1800*d*, the side wall does not block the sprayed water of the row of water outlet holes 1800*d*, so that the row of water outlet holes 1800*d* can effectively form a flushing water curtain on the top surface of the dish discharging tray 13*d*.

Illustratively, referring to FIGS. 61 and 65, the protective cover 19*d* comprises an elongated main protective cover body 190*d* and two side limiting bodies 191*d*. The main protective cover body 190*d* covers the flushing tube 180*d* on the top surface of the dish discharging tray 13*d*, and the bottom of one side wall of the main protective cover body 190*d* is spaced from the top surface of the dish discharging tray 13*d*; and the side wall of the main protective cover body 190*d* faces the other end of the dish discharging tray 13*d*. The two side limiting bodies 191*d* are arranged at the two ends of the main protective cover body 190*d* respectively and further connected with two opposite inner side walls of the inner shell 1*d* of the cooking machine respectively, and therefore the protective cover 19*d* is fixed in the inner shell 1*d*. Preferably, the two side limiting bodies 191*d* are both of a cover-shaped structure communicated with the main protective cover body 190*d*, and certainly, the two side limiting bodies 191*d* can be of a cylindrical structure or a spherical structure or the like and are not specifically limited herein.

In the embodiment of the present invention described above, illustratively, with reference to FIGS. 61 and 62, the dish discharging tray 13*d* includes a base plate 130*d* and two side plates 131*d*. The base plate 130*d* gradually inclines downwards from one end to the other end thereof, and the flushing piece 18*d* is arranged at one end of the base plate 130*d*. Besides, the two side plates 131*d* are arranged on the two side parts of the base plate 130*d* respectively and used for being connected with the two opposite inner side walls of the inner shell 1*d* of the cooking machine respectively. The two side plates 131*d* can enable water sprayed by the flushing piece 18*d* to flow from one end to the other end of the top surface of the base plate 130*d* in a concentrated mode.

Figure 66:
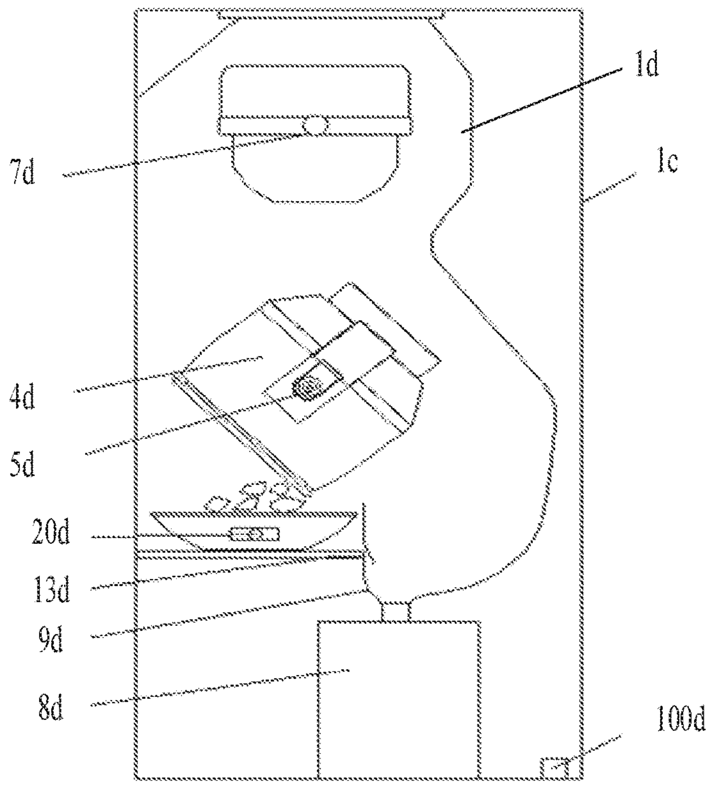
FIG. 66 is a simplified diagram of a cooking machine according to an embodiment of the present invention.

In the embodiment of the present invention, referring to FIG. 66, the cooking machine further comprises a dish position detector 20*d* for detecting the placement position of a dish containing plate on the dish discharging tray 13*d*; the dish position detector 20*d* is arranged on the inner shell and is electrically connected with the control device 13*c*; and the control device 13*c* controls the wok working position controlling device 21*c* to turn for dish pouring according to a detection signal of the dish position detector 20*d*. When a dish containing plate is placed on the dish discharging tray 13*d* and the cooking machine is in the dish pouring process, the control device 13*c* can judge whether the dish containing plate is aligned with the wok 20*c* or not according to a detection signal of the dish position detector 20*d*. And if yes, the control device 13*c* controls the wok working position controlling device 21*c* to turn the wok 20*c*, so that food in the wok 20*c* falls into the dish containing plate. And if not, the cooking machine gives a prompt and stops the dish pouring work. Illustratively, the dish position detector 20*d* is an infrared correlation detection device.

In an alternative embodiment, referring to FIGS. 39 and 40, the shell is further provided with a door plate 11*c* and a side door opening corresponding to the door plate 11*c* on the side of the inner shell 1*d* on which the dish discharging outlet 102*c* is provided, the door plate 11*c* being movably installed on the shell to open and close the side door opening. The door plate 11*c* and the opening are arranged in the shell, so that the internal devices such as the wok mechanism 2*c*, the cooking fume treatment device 3*c* and the automatic dish discharging device and the like in the inner shell 1*d* can be conveniently repaired and maintained. Preferably, the door plate 11*c* is provided with a transparent or semitransparent window 110*c*, so that a user can observe the working condition of the full-automatic cooking machine conveniently. More preferably, the door plate 11*c* can also open or close the dish discharging outlet 102*c*, so that the automatic dish discharging device can send out dishes loaded in dish the dish containing plate conveniently.

In an alternative embodiment, referring to FIGS. 39 and 40, the top of the shell 1 is provided with a top cover plate 12*c* and a top door opening corresponding to the top cover plate 12*c*, the top cover plate 12*c* is movably installed on the shell to open and close the top door opening. By arranging the top door opening and the top cover plate 12*c*, the ingredient feeding mechanism can be conveniently repaired and maintained.

It can be understood that the internal working space of an intelligent cooking machine is a high-temperature, high-humidity and high-acidity-alkalinity environment, the working structure and electrical components which are matched with the internal working space of an intelligent cooking machine are difficult to work effectively for a long time under such environment, in addition, food safety, sanitation and environmental protection are involved in the internal working space of an intelligent cooking machine, but according to the embodiment of the present invention, a closed cooking machine working space (cooking cavity) is constructed in the inner shell 1*d*, main cooking apparatuses in contact with food materials are placed in the closed space of the cooking cavity to realize main cooking functions such as feeding, cooking, heating and dish discharging, and a spraying piece is arranged in the cooking cavity to wash the cooking apparatuses; and meanwhile, accessory cooking apparatuses (including an electric appliance, a circuit, a power supply, a transmission line, a pipeline part and the like which are matched with the main cooking apparatuses to work) for assisting the main cooking equipment in realizing cooking functions are arranged outside the cooking cavity.

In addition to the cooking cavity structure shown in FIG. 61, the structure of the cooking cavity can also adopt other structures. For example, FIGS. 67-70 show another alternative structure of the cooking cavity 100. A cooking area 2*e* used for containing a wok (not shown) and a wok turning device (not shown) and a dish discharging area 3*e* located below the cooking area 2*e* and used for containing a dish discharging device (not shown) are arranged in the cooking cavity 100, and the dish discharging area 3 is located between the cooking area 2*e* and the bottom of the cooking cavity. The bottom of the cooking cavity 100 is provided with a dish discharging area drain outlet 4*e* for discharging sewage falling into the dish discharging area 3*e*, so that when sewage is accumulated at the bottom in the cooking cavity 100, the dish discharging area drain outlet 4*e* can discharge the sewage at the bottom in the cooking cavity 100, and therefore the interior of the cooking cavity of the cooking machine can be kept sanitary.

Figure 67:
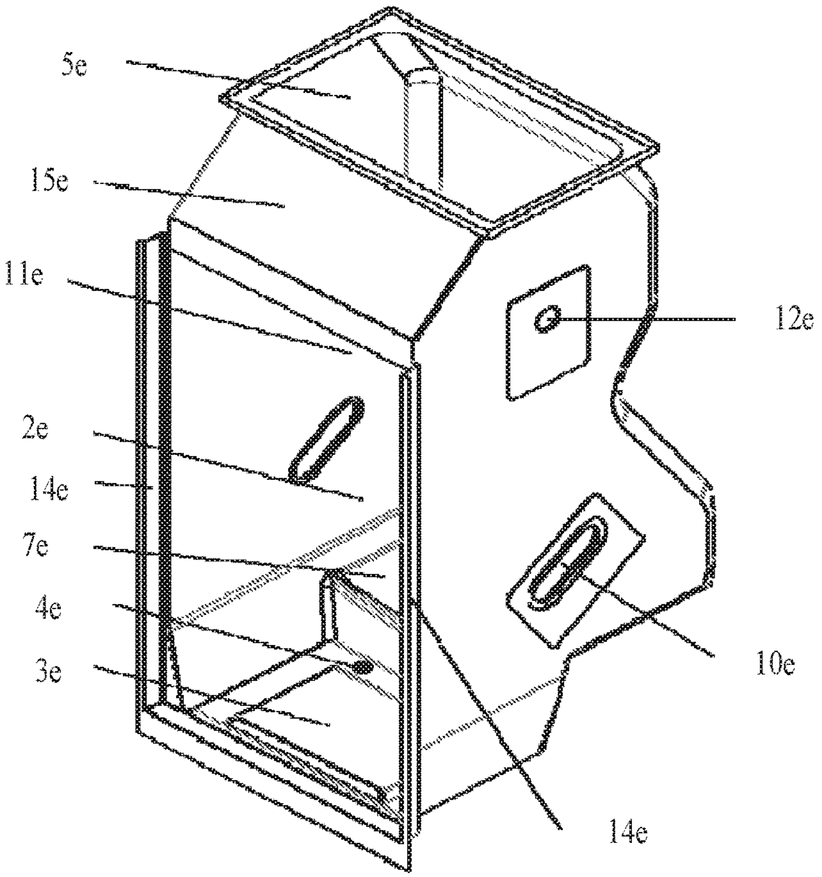
FIG. 67 is a perspective view of a cooking cavity according to an embodiment of the present invention.

Preferably, referring to FIG. 67, the top of the cooking cavity 100 is provided with a top cover opening 5*e* for installing an openable and closable top cover door panel (not shown). When a device (such as a wok or a wok turning mechanism) in the cooking cavity 100 needs to be maintained, the top cover door plate arranged at the top cover opening 5*e* can be opened. Therefore, by arranging the top cover opening 5*e* used for installing the top cover door plate in the top of the cooking cavity 100, the device in the cooking machine is convenient to maintain. Preferably, referring to FIGS. 67-70, the bottom of the cooking cavity 100 is further provided with a draining channel structure 6*e* which is of a hollow structure and used for draining sewage falling off when the wok is cleaned out of the cooking cavity 100, the top end of the draining channel structure 6*e* is provided with a sewage collecting opening 7*e* which is located in the cooking cavity 100 and faced the wok, and a draining opening 8*e* is formed in the bottom end of the draining channel structure 6*e*. When the wok needs to be cleaned, sewage falling from the wok flows into the draining channel structure 6*e* from the sewage collecting opening 7*e* and is guided by the draining channel structure 6*e* to the draining opening 8*e* to be drained out. By arranging the draining channel structure 6*e*, sewage generated by cleaning the wok can be conveniently drained out. Ideally, the draining channel structure 6*e* comprises a flow guiding shell of a funnel-shaped structure, and therefore sewage falling from the wok can be conveniently guided out of the shell. It should be noted that the draining channel structure 6*e* may also be of other structures, for example, the draining channel structure 6*e* may be of a hollow cylinder structure with the upper end and the lower end being provided with the sewage collecting opening 7*e* and the draining opening 8*e* respectively, or the draining channel structure 6*e* may be a hollow inverted pyramid structure with the upper end and the lower end being provided with the sewage collection port 7*e* and the draining port 8*e* respectively, and the like, which is not specifically limited herein.

Figure 68:
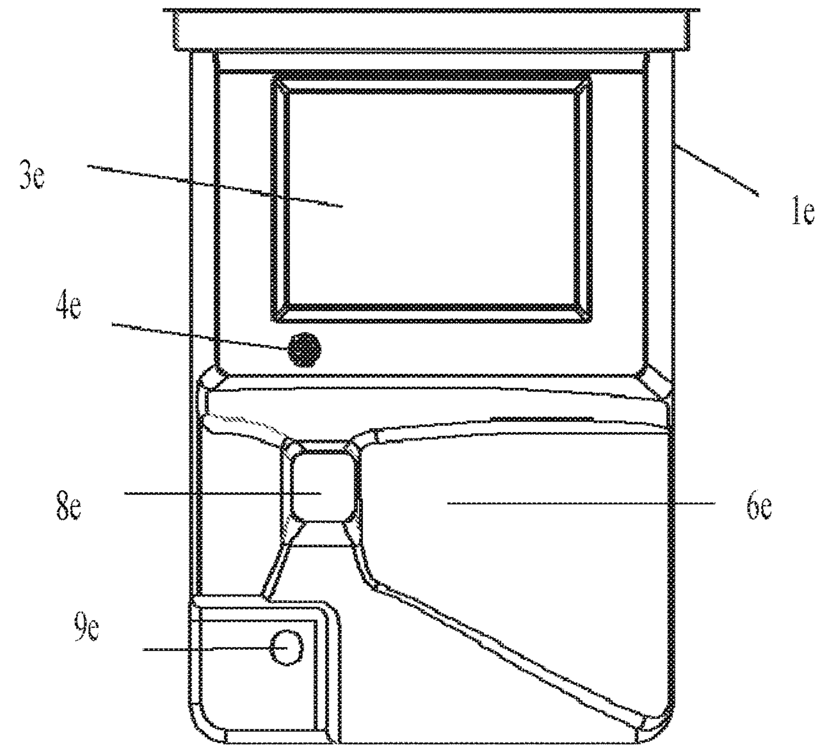
FIG. 68 is a bottom view of a cooking cavity according to an embodiment of the present invention.
Figure 69:
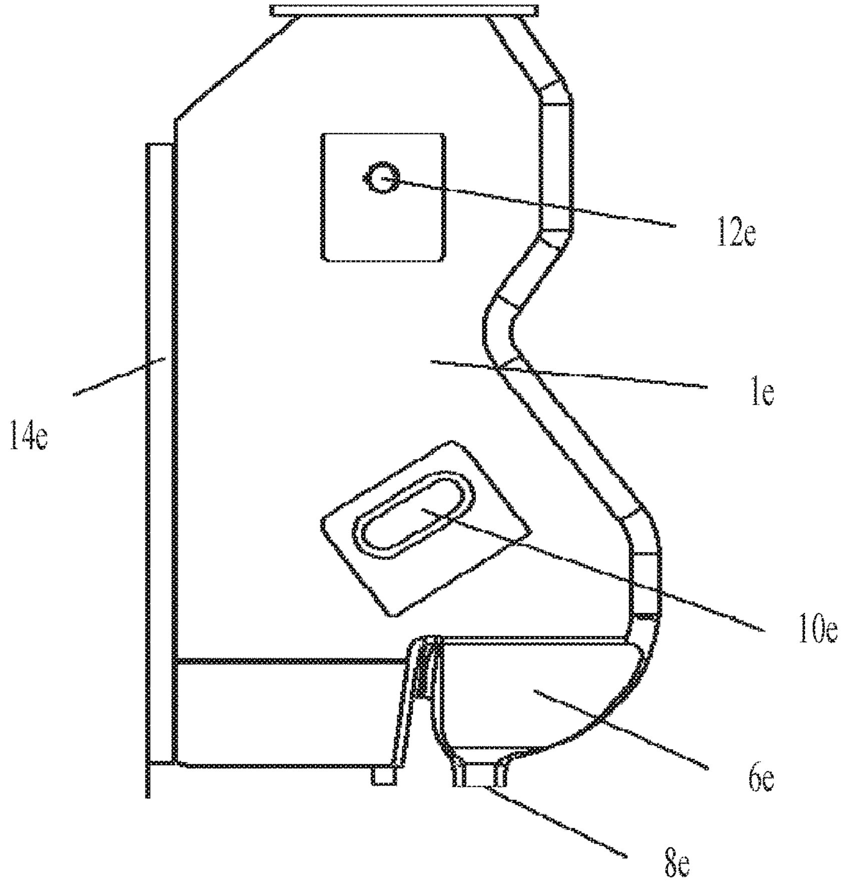
FIG. 69 is a side view of a cooking cavity according to an embodiment of the present invention.
Figure 70:
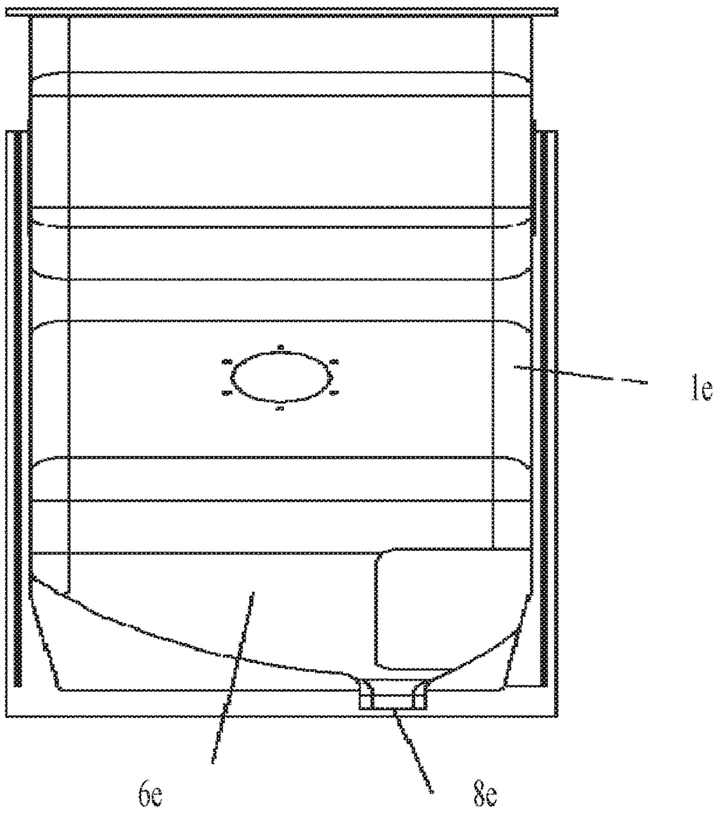
FIG. 70 is a rear view of a cooking cavity according to an embodiment of the present invention.
Figure 71:
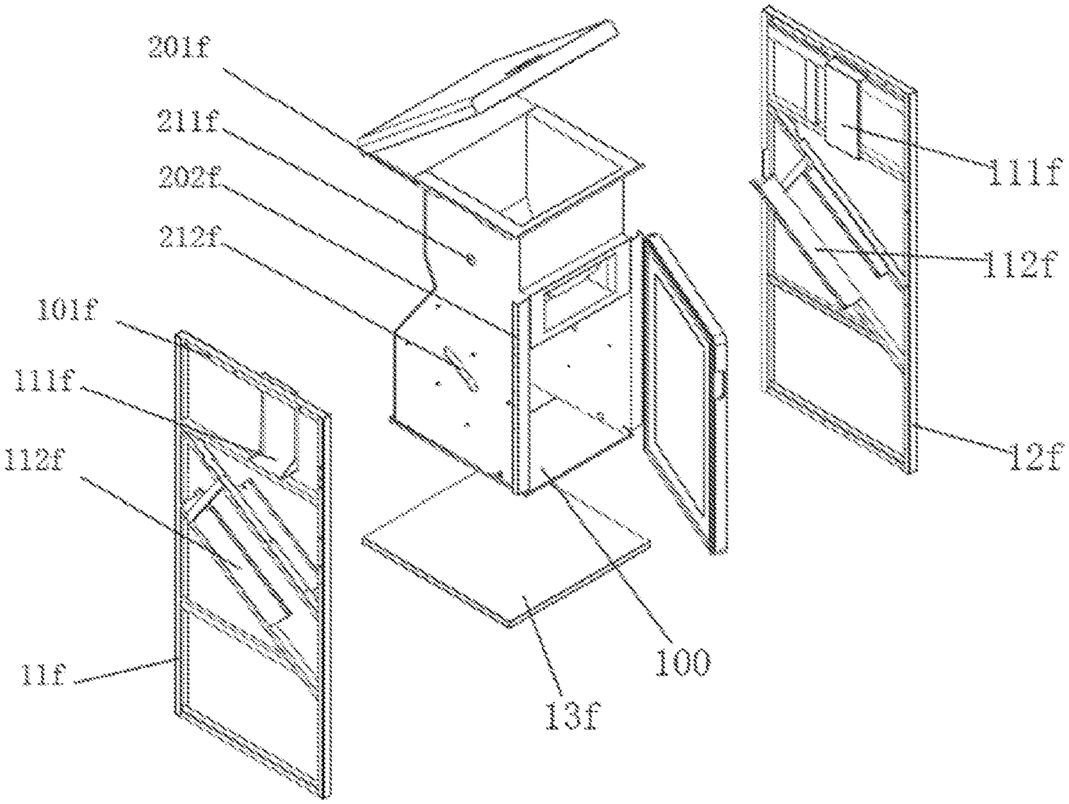
FIGS. 71-79 are schematic diagrams of structures of a cooking cavity and other functional assemblies of the cooking machine provided by the embodiment of the present invention.
Figure 72:
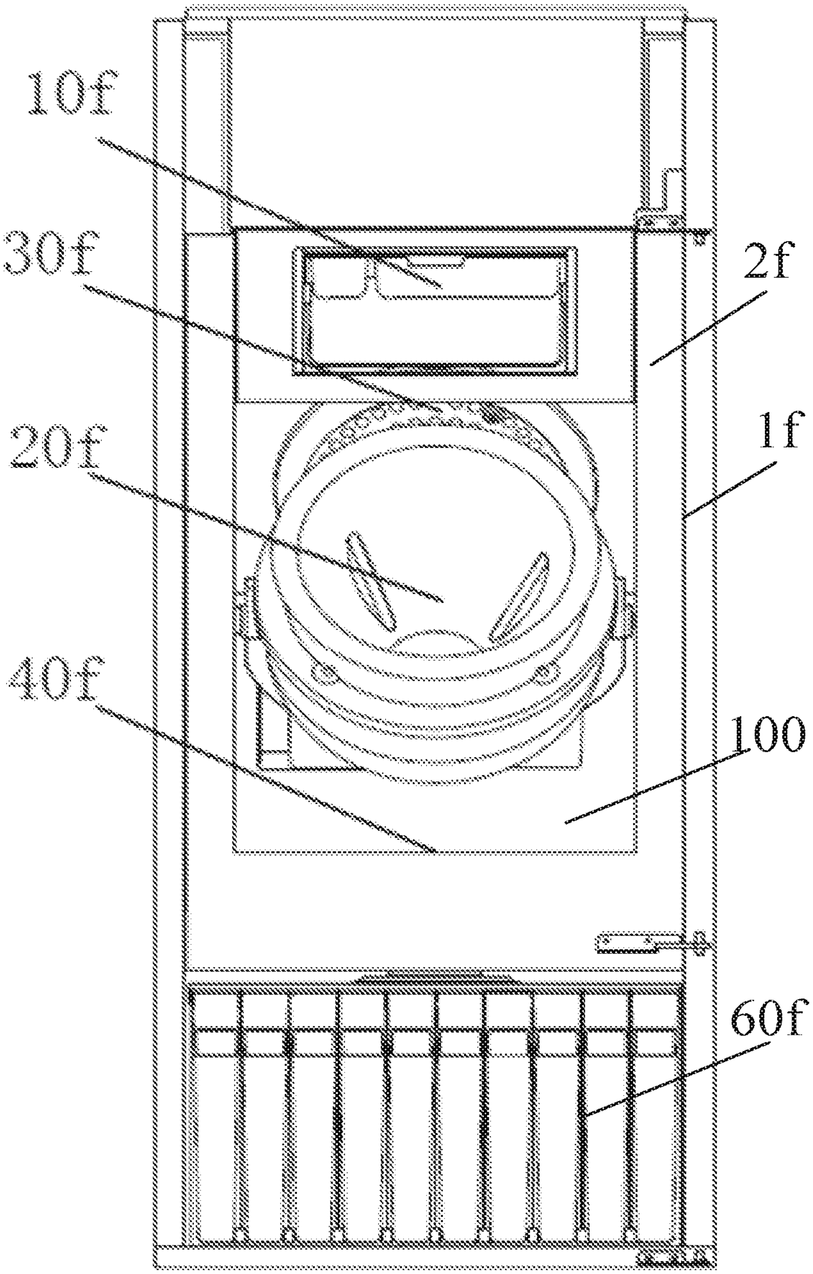
Figure 73:
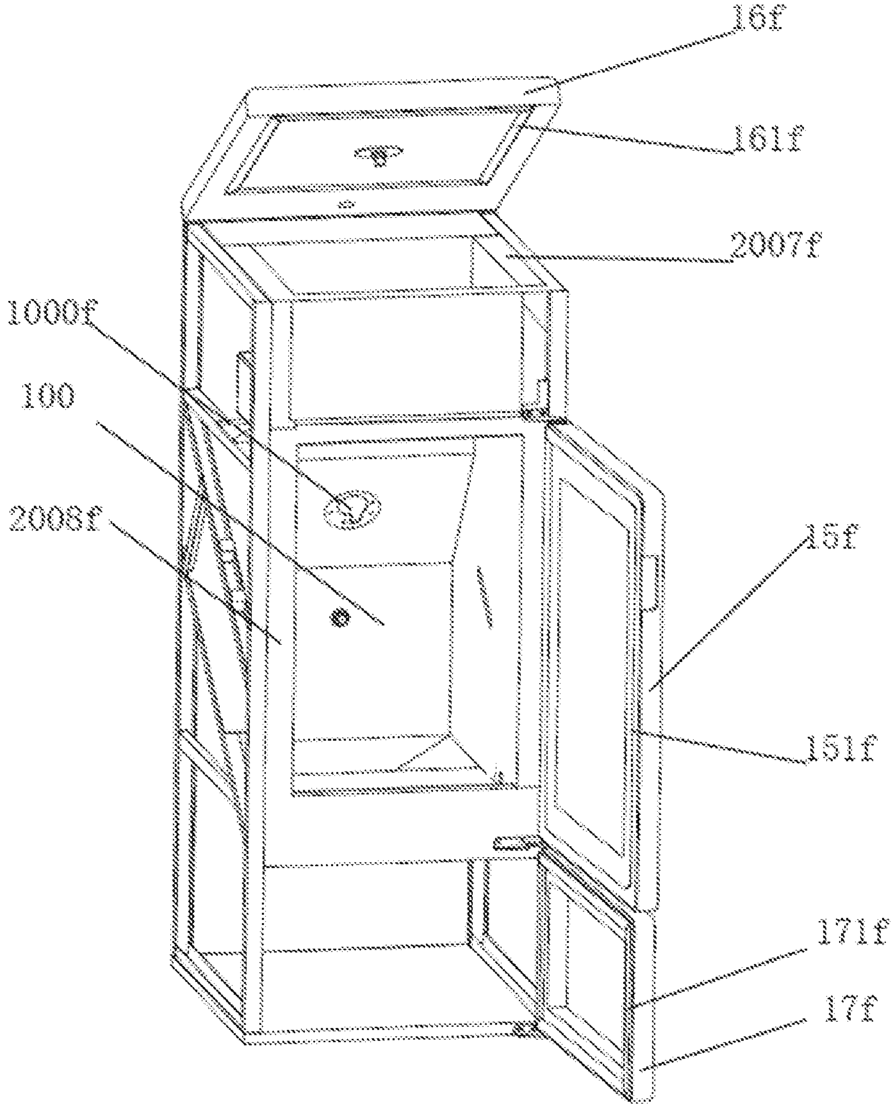
Figure 74:
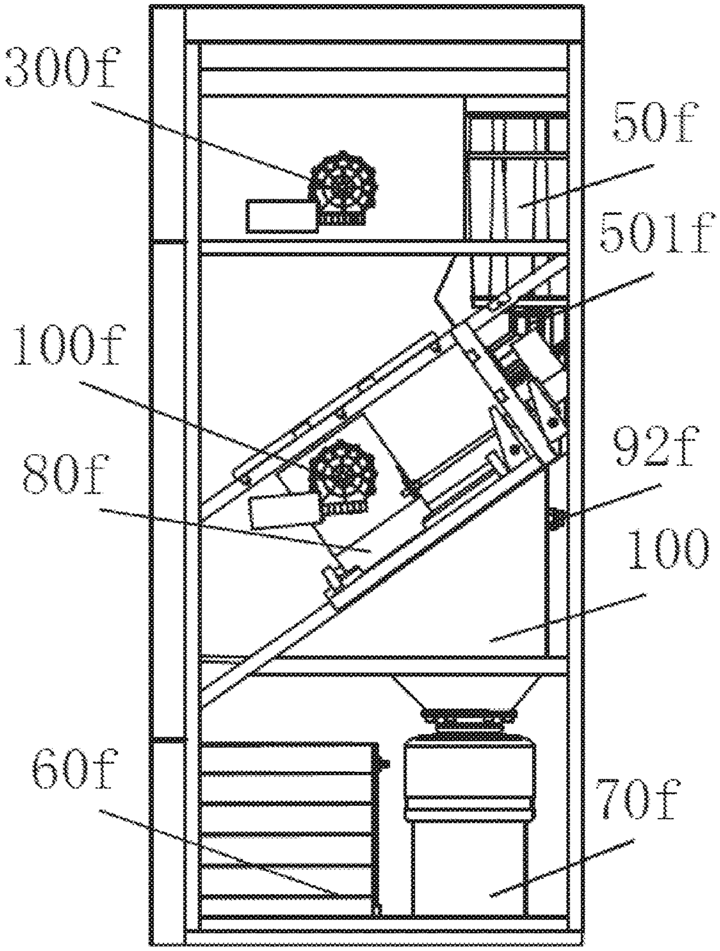
Figure 75:
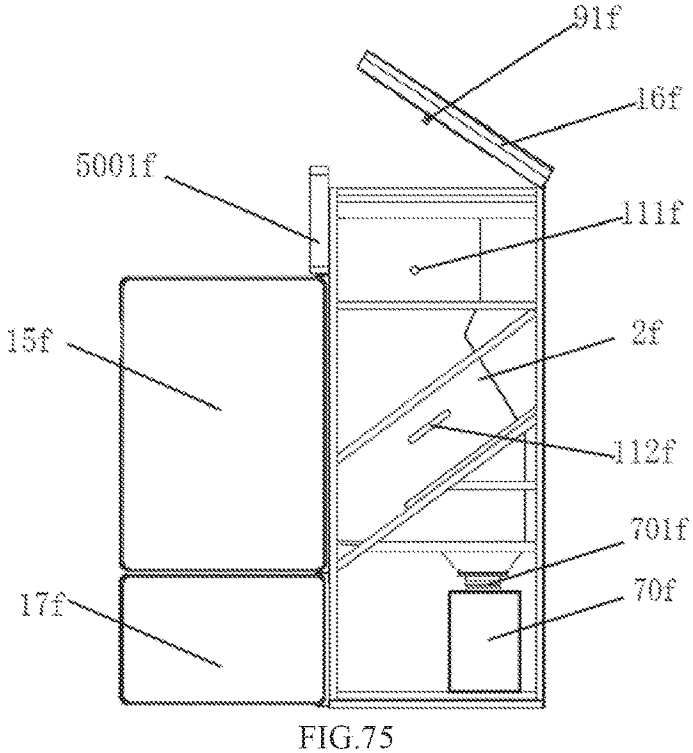
Figure 76:
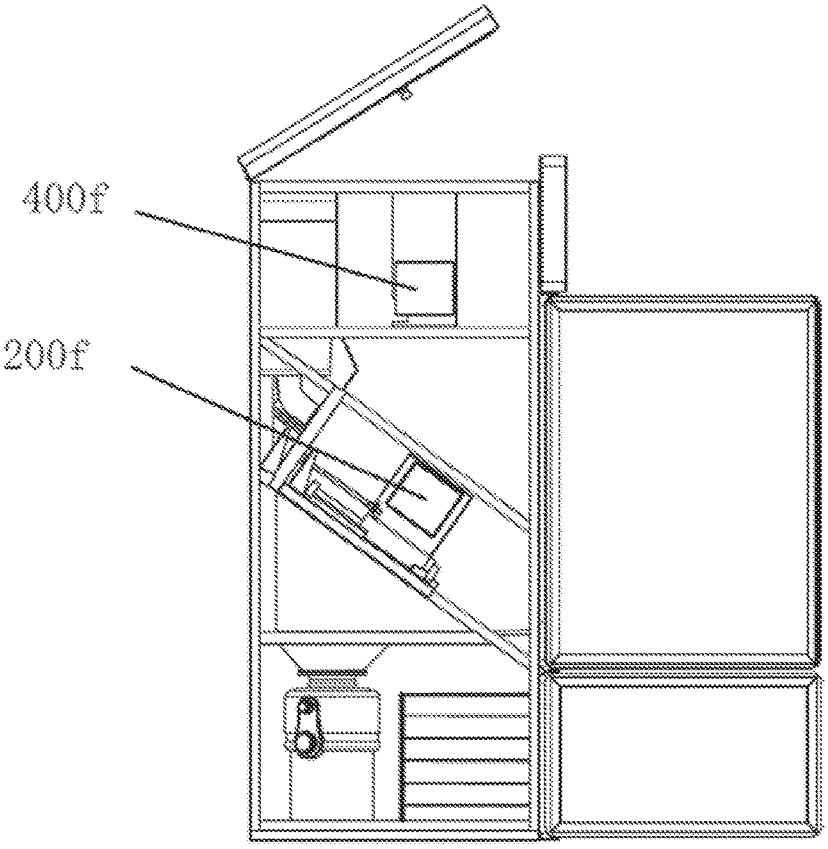
Figure 77:
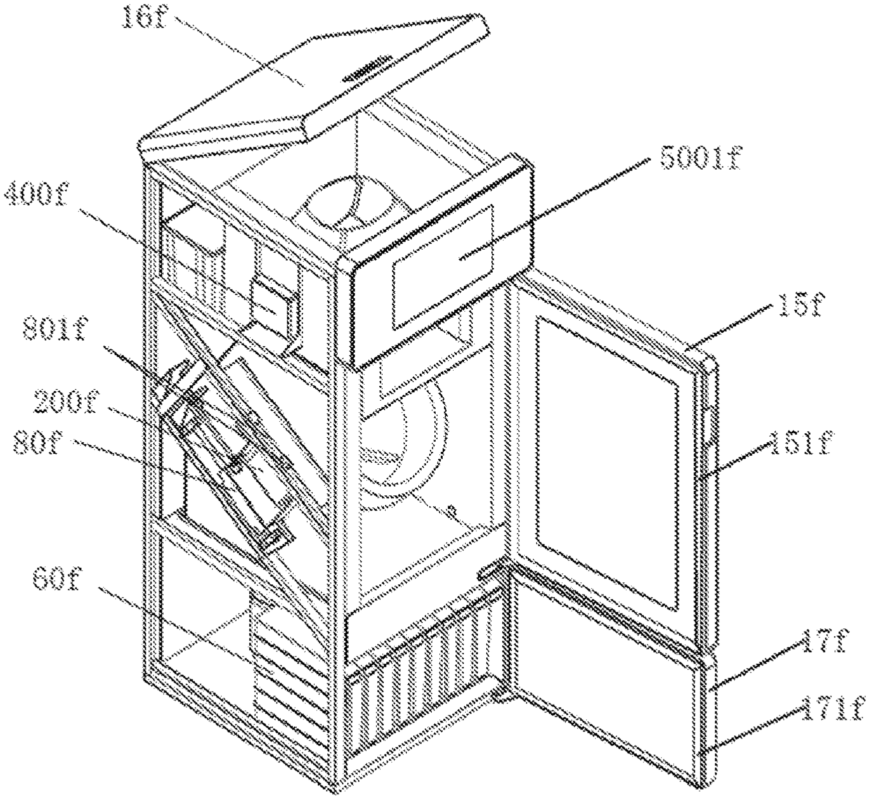
Figure 78:
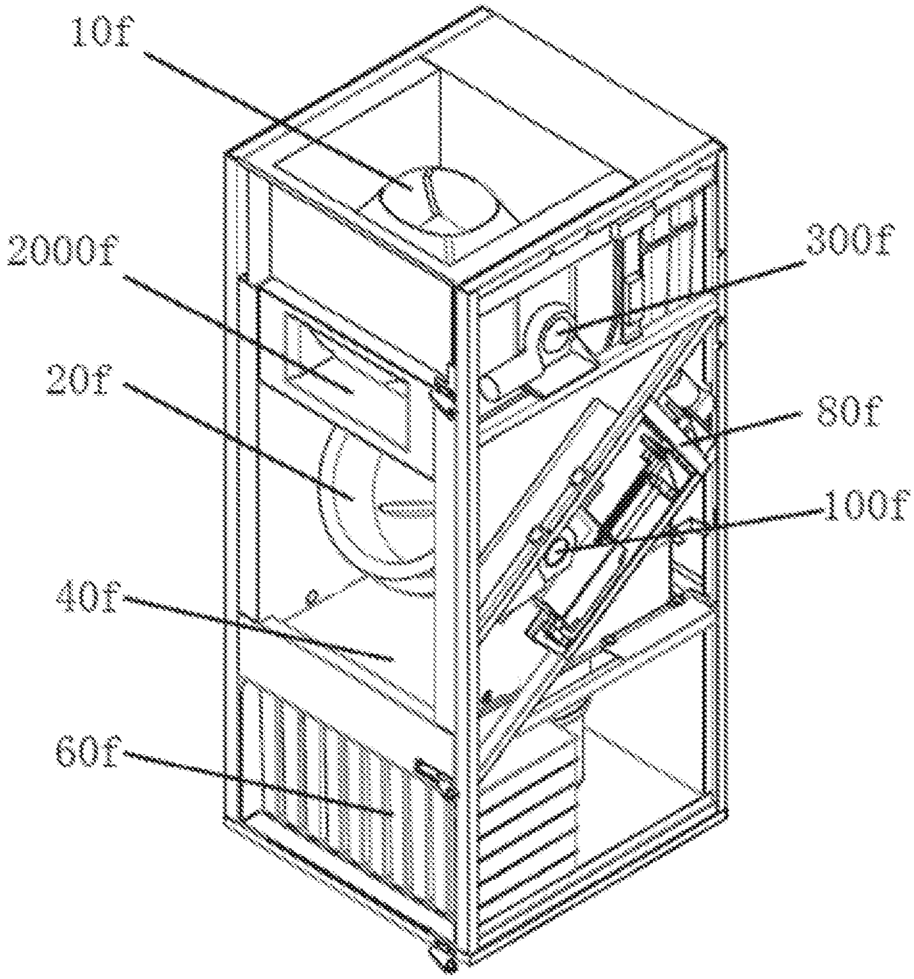
Figure 79:
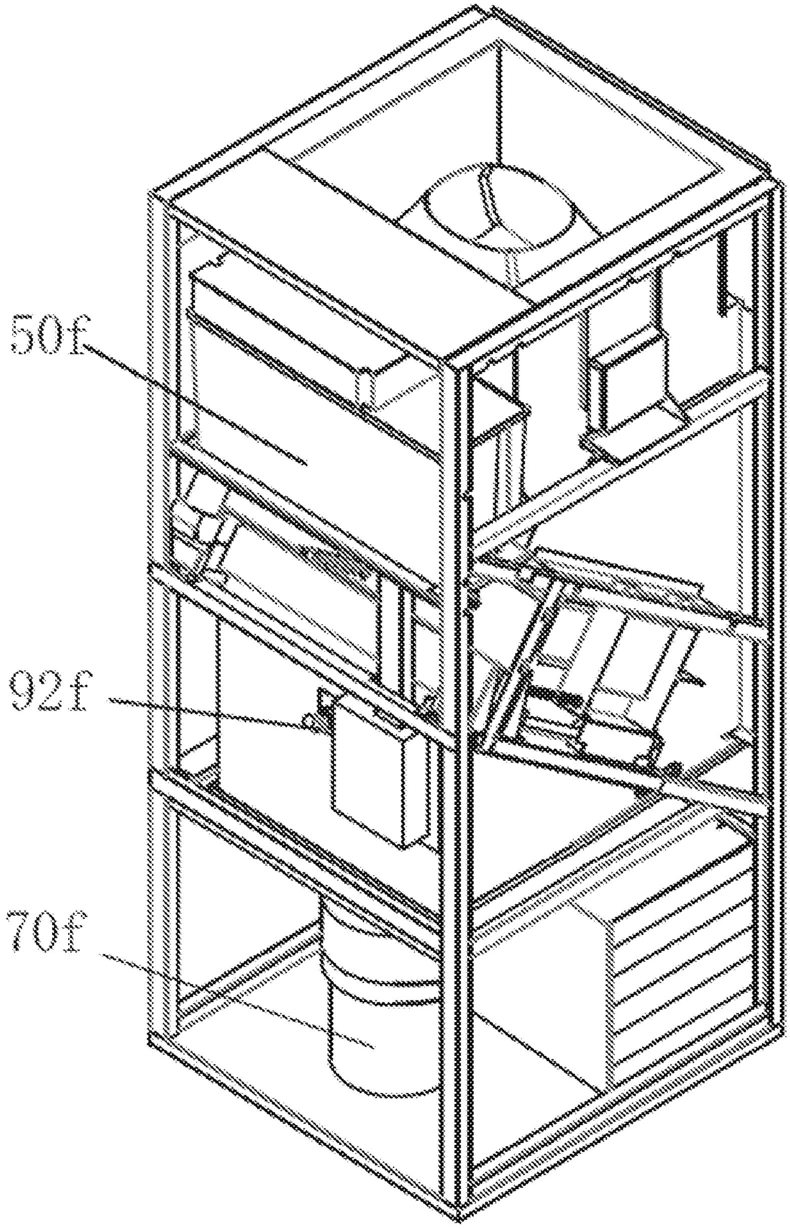

Referring to FIG. 68, the bottom of the shell 1 is further provided with a water inlet pipe installing hole 9 for a water inlet pipe (not shown) to penetrate into the shell 1, and the water inlet pipe penetrating into the shell 1 from the water inlet pipe installing hole 9 is used for cleaning the wok. Preferably, referring to FIGS. 67 and 69, the two side walls of the inner shell 1*e* constituting the cooking cavity 100 are each provided with a first installing hole 10*e* for installing a wok working position controlling device for controlling the wok to be turned in the cooking area 2*e*. Preferably, the first installing hole 10*e* can be a rotating shaft installing groove and used for installing a rotating shaft of a wok working position controlling device for controlling the wok to turn. The first installing hole 10*e* is also used as a wok moving installing groove and used for installing a connecting shaft of the wok moving device for driving the wok to move directionally, and the wok moving installing groove limits the movement range of the wok. An feeding area 11*e* located above the cooking area 2*e* and used for containing an ingredient feeding device (not shown) is further arranged in the cooking cavity 100, and the two side walls of the inner shell 1*e* forming the cooking cavity 100 are each provided with a second installing hole 12*e* used for installing the ingredient feeding device in the feeding area 11*e*. Preferably, the second installing hole 12*e* can be an ingredient feeding rotating shaft installing groove and used for installing a rotating shaft of the ingredient feeding device. It should be noted that the second installing hole 12*e* can also be an installing frame or an installing plate and the like and used for installing the ingredient feeding device, which is not specifically limited herein. Further, referring to FIG. 67, the first side of the inner shell 1*e* constituting the cooking cavity 100 is provided with an installing opening for installing an openable and closable door plate (not shown), and the left side, the right side and the bottom side of the installing opening are provided with sealing strips 14*e*. When the wok needs to be manually cleaned or devices in the cooking cavity 100 need to be maintained, the door plate arranged at the installing opening can be opened. In addition, the sealing strips 14*e* are arranged at the installing opening, so that the sealing strips 14*e* can better seal a gap between the door plate and the inner shell 1 when the door plate is closed, and the cooking cavity 100 can have better sealing performance; and therefore, external sundries (such as dust) are prevented from entering the cooking cavity 100 easily. The upper end part of the first side is further provided with a third installing position 15*e* which is located above the installing opening and is used for installing a human-computer interface device (not shown). Specifically, the third installing position 15*e* can be an installing groove which is formed in the upper end part of the first side and used for containing the human-computer interface, or the third installing position 15*e* can be an installing plate which is arranged at the upper end part of the first side and used for installing the human-computer interface and the like, which is not specifically limited herein.

It can be seen that cooking cavity 100 shown in FIGS. 67-70 is further provided with a dish discharging area drain outlet 4*e* at the bottom of the cooking cavity 100 on basis of previous embodiment, so that when sewage is accumulated at the bottom in the cooking cavity 100, the dish discharging area drain outlet 4*e* can discharge the sewage at the bottom in the cooking cavity 100, and the sewage in the dish discharging area drain outlet 4*e* can be discharged from the bottom in the cooking cavity 100, and therefore, the interior of the inner shell of the cooking machine can be more sanitary.

Therefore, in the first embodiment and the second embodiment of the present invention, the inner shell is disposed inside the outer shell, the sealed cooking cavity is formed in the inner shell, and the main cooking equipment making contact with food materials are placed in the closed space of the cooking cavity to achieve the main cooking functions of feeding, cooking, heating, dish discharging and the like, the spraying pieces are arranged in the cooking cavity to wash the cooking devices, and the accessory cooking equipment (including an electric appliance, a circuit, a power supply, a transmission line, a pipeline component and the like which is matched with the main cooking equipment to work) for assisting the main cooking equipment in realizing a cooking function are arranged outside the cooking cavity, so as to ensure the food safety and environmental sanitation. In addition, according to the cooking machine provided by the embodiments of the present invention, based on the cooking cavity arranged in the sealed manner, all the functional components are combined into a whole by taking the sealed cooking cavity as a core, the main cooking equipment such as the ingredient feeding device, the furnace body device, the wok lid device and the like which are directly contacted with food materials are arranged in the closed space of the cooking cavity, and the spraying pieces are arranged in the cooking cavity to wash the cooking devices, so that water and cooking fume are blocked in the sealed cooking cavity, the washed water is discharged in a unified manner after being treated, and environmental pollution caused by cooking fume discharge is avoided.

The following further describes how the cooking machine provided by the invention is based on the fact that all the functional components are combined into a whole with the sealed cooking cavity as the core. Referring to FIGS. 71-79, the cooking machine includes an outer shell if and an inner shell 2*f* disposed inside the outer shell, the interior of the cavity of the inner shell 2*f* forming a sealed cooking cavity 100. The specific structure of the cooking cavity in which the inner shell 2*f* is constructed may be omitted herein with reference to the foregoing description of the related embodiments. According to the cooking machine, the main cooking equipment comprising an ingredient feeding device 10*f*, a wok device 20*f*, a wok lid device 30*f* and a dish discharging device 40*f* are arranged in the sealed cooking cavity 100, and accessory cooking equipment for assisting the main cooking equipment in achieving the a cooking function is arranged outside the cooking cavity 100 and placed in a space area formed between the outer shell 1*f* and the inner shell 2*f* The wok device 20*f* comprises a wok, a furnace body device used for bearing and heating the wok, a wok rotating device used for controlling the wok to rotate, a wok working position controlling device used for driving the wok to turn, and the like, and the specific structure and function refer to the related description. The accessory cooking equipment comprises a cooking fume treatment device 50*f*, a seasoning adding device 60*f*, a garbage processor 70*f*, a wok moving control device 80*f*, a wok working position conversion motor 100*f*, a wok working position detection device 200*f*, an ingredient feeding device working position conversion motor 300*f*, an ingredient feeding device working position detection device 400*f*, an electric member, a circuit member, a power supply, a transmission line and a pipeline component.

The outer shell 1*f* comprises a left rack 11*f* and a right rack 12*f*, and the left rack 11*f* and the right rack 12*f* are connected with the inner shell 2*f* so that the inner shell 2*f* can be fixed into the outer shell 1*f*. Specifically, the tops of the two side walls of the inner shell 2*f* are each provided a connecting upper edge opening 201*f*, and the tops of the left rack and the top of the right rack are each provided with a first connecting hole position 101*f* correspondingly connected with one of the connecting upper edge openings 201*f* The two side parts of the front side wall 2008*f* of the inner shell 2*f* are each provided a connecting front edge opening 202*f*, and the side portions of the left rack and side portion of the right are each provided with a second connecting hole position 102*f* correspondingly connected with one of the connecting front edge openings 202*f* The inner shell 2*f* with the sealed cooking cavity is fixed to the left rack 11*f* and the right rack 12*f* through matched connection of the connecting upper edge openings 201*f* and the first connecting hole positions 101*f* and matched connection of the connecting front edge openings 202*f* and the second connecting hole positions 102*f* The left rack and the right rack are each provided with an ingredient feeding device installation position 111*f* correspondingly connected with an ingredient feeding mechanism installation hole 211*f* which is formed in the inner shell 2*f* and used for installing the ingredient feeding device in the feeding area. The ingredient feeding mechanism arranged in the feeding area of the cooking cavity penetrates through the installation holes 211*f* of the inner shell 2*f* and the ingredient feeding device installation positions 111*f* on the left rack and the right rack by supports/rotating shafts and is connected with the ingredient feeding device working position conversion motor 300*f* and the ingredient feeding device working position detection device 400*f* which are arranged on the ingredient feeding device installation positions 111*f* respectively. The left rack and the right rack are each provided with a wok device installation position 112*f*, and the wok device installation positions 112*f* correspond to installation grooves 212*f* which are formed in the inner shell 2*f* and used for installing the wok device 20*f* in the cooking area. A wok device arranged in a cooking area in the cooking cavity penetrates through an installation grooves 212*f* of the inner shell 2*f* and the wok device installation positions 112*f* by supports/rotating shafts and is connected with the wok working position conversion motor 100*f* and the wok working position detection device 200*f* which are respectively arranged on the wok device installation positions 112*f* In addition, the wok device installation positions 112*f* on the left rack and the right rack are further used for installing and fixing the wok moving control device 80*f* used for controlling the wok to do directional movement in the cooking area, and installation positions used for arranging wok moving limiting sensors 801*f* are further arranged close to the wok device installation positions 112*f*.

The outer shell 1*f* further comprises a bottom plate 13*f*, a left side plate (not shown), a right side plate (not shown) and a rear plate 14*f* which are fixedly connected with the left rack and the right rack. The outer shell 1*f* further comprises a middle door plate 15*f* used for opening and closing an ingredient container guiding opening 2000*f* and a dish discharging outlet 2001*f* of the inner shell 2*f*, a top cover door plate 16*f* used for opening and closing a top cover opening 2002*f* of the inner shell 2*f*, and a seasoning bin door plate 17*f* used for opening and closing a seasoning area which is used for containing a seasoning adding device 60*f* and is formed between the inner shell 2*f* and the bottom plate 13*f* A sealing strip 161*f* is arranged at the contact position of the top cover door plate 16*f* and the top wall 2007*f* of the inner shell 2*f*, a sealing strip 151*f* is arranged at the contact position of the middle door plate 15*f* and the front side wall 2008*f* of the inner shell 2*f*, and a sealing strip 171*f* is arranged at the contact position of the seasoning bin door plate 17*f* and the front side wall 2008*f* of the inner shell 2*f*, so as to achieving sealing and guarantee the sealing performance in the cooking cavity. It can be understood that the middle door plate 15*f* and the seasoning bin door plate 17*f* can be integrally formed. In addition, a human-machine panel installation position 500*f* is arranged on the upper portion of the front side wall 2008*f* of the inner shell 2*f* and used for installing a human-machine control panel 5001*f*, and therefore a user can operate the human-machine control panel 5001*f* conveniently.

In addition, spraying pieces capable of washing main cooking equipment are further arranged in the cooking cavity of the cooking machine, and the spraying pieces comprise an ingredient feeding device spraying piece 91*f* which is arranged at the top in the cooking cavity and used for directly washing the ingredient feeding device and a wok spraying piece 92*f* which is arranged at the side part or the bottom in the cooking cavity and is used for directly washing the interior of the wok. Reference is made to the previous related description regarding the specific structure and working principle of the ingredient feeding device spray piece 91*f* and the wok spraying piece 92*f*.

The cooking fume treatment device 50*f* is arranged between the outer shell 1*f* and the inner shell 2*f* and located on the upper portion of the rear wall of the inner shell 2*f*, the cooking fume treatment device 50*f* is communicated with the interior of the cooking cavity 100 (specifically communicated with a wok device in the cooking cavity, and a cooking fume treatment outlet 1000*f* is formed in the position, where a wok lid is arranged, of the inner shell 20 via a cooking fume pipeline 501*f*, the cooking fume in the cooking cavity (and in the wok) is discharged from the cooking fume treatment outlet 1000*f* so as to be treated by the cooking fume treatment device 50*f*. It can be understood that the inner shell 2*f* can also be provided with a cavity cooking fume outlet (not shown) communicated with the cooking fume treatment device 50*f* at other positions so that the cooking fume in the cooking cavity can be directly discharged to the cooking fume treatment device 50*f* from the cavity cooking fume outlet for cooking fume treatment. In addition, the cooking fume outlet of the cooking fume treatment device 50*f* can also be communicated with the interior of the cooking cavity, so that cooking fume treated by the cooking fume treatment device 50*f* is returned to the cooking cavity again to be circularly treated, and zero emission of cooking fume gas is achieved. The specific structure and treatment process that the cooking fume treatment device 50*f* can employ refer to the relevant description above. The seasoning adding device 60*f* is arranged below an inner shell forming the cooking cavity 100 and is far away from a bottom opening (the bottom opening is connected with the garbage processor 700 of the cooking cavity 100; the seasoning adding device 60*f* comprises seasoning bottles, and each seasoning bottle is communicated with the wok in the cooking cavity via a seasoning pipe and a seasoning pump (specifically via a connecting pipe communicated with the wok lid, the specific structure and implementation mode refer to the relevant description). The seasoning adding device adds seasoning into the wok via the seasoning pump, the seasoning pipe connecting with the seasoning bottle and an adding channel in the wok lid, and the seasoning can be added in the whole cooking process. The garbage processor **70*f* is arranged below the inner shell 2*f* forming the cooking cavity 100 and is in sealed connection with the bottom opening of the cooking cavity 100 through a garbage processor connecting piece 701*f***.

In the description of the present invention, it is to be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", and the like, indicate orientations or positional relationships based on those shown in the drawings, merely for convenience of description and simplification of the description, and do not indicate or imply that the device or element referred to must have a particular orientation, be constructed in a particular orientation, and be operated, and thus, are not to be construed as limiting the present invention.

Furthermore, the terms "first", "second" are used for descriptive purposes only and are not to be construed as indicating or implying relative importance or to implicitly indicate the number of technical features indicated. Thus, a feature defined as "first" or "second" may explicitly or implicitly include one or more of that features. In the description of the present invention, "a plurality" means at least two, e.g., two, three, etc., unless explicitly specified otherwise.

In the present invention, unless expressly specified and limited otherwise, the terms "installed", "jointed", "connected", "fixed" and the like are to be construed broadly, e.g., as being permanently connected, detachably connected, or integral; may be mechanically, electrically or otherwise in communication with each other; they may be directly connected or indirectly connected through intervening media, or may be connected through the use of two elements or the interaction of two elements. The specific meanings of the above terms in the present invention can be understood according to specific situations by those of ordinary skill in the art.

Those skilled in the art will appreciate that in one or more of the examples described above, the functions described herein may be implemented in hardware, software, firmware, or any combination thereof. When implemented in software, the functions may be stored on or transmitted over as one or more commands or code, on a computer-readable medium. Computer-readable media includes both computer storage media and communication media including any medium that facilitates transfer of a computer program from one place to another. Storage media may be any available media that can be accessed by a general purpose or special purpose computer.

The foregoing descriptions are merely exemplary embodiments of the present invention, but are not intended to limit the present disclosure. Any modifications, equivalent substitutions, and improvements made by those skilled in the art within the spirit and principle of the present disclosure shall fall within the protection scope of the present disclosure.

What is claimed is:

1. A full-closed cooking system, comprising a closed cooking cavity, a wok device arranged in the interior of the cooking cavity and a cooking fume treatment device arranged at the exterior of the cooking cavity, the cooking cavity is formed by means of a shell in a sealed manner, a side wall of the shell is provided with a first exhaust port for connecting the cooking fume treatment device;

the cooking fume treatment device is provided with a cooking fume inlet and a cooking fume outlet; the wok device comprises a wok and a wok lid for closing or opening the wok; the wok lid is provided with a smoke outlet corresponding to the first exhaust port; the smoke outlet is communicated with the cooking fume inlet via a cooking fume pipeline; the cooking fume generated in the cooking process with the wok being closed is discharged to the cooking fume treatment device from the smoke outlet to be treated; the cooking fume escaping into the cooking cavity is exhausted to the cooking fume treatment device from the smoke outlet to be treated when the wok is opened;

a side wall or bottom wall of the shell is provided with an exhaust gas return port communicated with the cooking fume outlet, and the cooking fume exhausted after being treated by the cooking fume treatment device enters the cooking cavity from the exhaust gas return port to be subjected to circulating cooking fume treatment so as to achieve zero emission of the cooking fume;

the cooking fume treatment device comprises:

a box body provided with a cooking fume channel formed therein, and an inlet and an outlet of the cooking fume channel are communicated with the cooking fume inlet and the cooking fume outlet respectively;

a fan adapted for sucking cooking fume into the box body from the inlet of the cooking fume channel and exhausting the cooking fume out from the outlet of the cooking fume channel; and a cooking fume filtering assembly arranged in the cooking fume channel, and the cooking fume filtering assembly comprises a plurality of filtering layers disposed within the cooking fume channel;

a water circulation pipeline provided with at least one first water outlet which is formed in a top portion of the box body and located above the cooking fume channel and at least one first water inlet which is formed in a lower portion of the box body;

a water pump arranged in the water circulation pipeline; and a spraying plate provided with a plurality of spraying holes, the spraying plate is arranged between and separate the cooking fume channel and the top portion of the box body, and the at least one first water outlet is located above the spraying plate; water sprayed from each first water outlet falls onto the spraying plate and then passes through the plurality of spraying holes of the spraying plate to spray the cooking fume channel.

2. The full-closed cooking system according to claim 1, further comprising an ingredient feeding device arranged in the interior of the cooking cavity, a cooking area for accommodating the wok device is arranged in a middle portion of the interior of the cooking cavity, and a feeding area for accommodating the ingredient feeding device is arranged at an upper portion of the interior of the cooking cavity and positioned above the cooking area; wherein the wok device comprises a wok, a furnace body device adapted for bearing and heating the wok with a heating coil, and a wok rotating device adapted for controlling the wok to rotate around its central axis by a motor; a side portion of the shell forming the cooking cavity is provided with an ingredient container guiding opening corresponding to the feeding area, the ingredient feeding device guides in food materials through the ingredient container guiding opening and feeds the food materials into the wok, the furnace body device heats the wok and the wok rotating device rotates the wok, thereby achieving cooking processing of the food materials in the wok;

wherein the ingredient feeding device comprises an ingredient-containing chamber used for containing food ingredients, a bottom wall of the ingredient-containing chamber is provided with at least one ingredient-dropping openings allowing the food ingredients to fall in the wok.

3. The full-closed cooking system according to claim 1, further comprising a wok moving control device arranged outside the cooking cavity and adapted for driving the wok to move up and down; the wok lid is fixed in the cooking cavity, and the opening of the wok is moved directionally towards or away from the wok lid by the wok moving control device so as to realize the closing or opening of the wok;

wherein the wok moving control device comprises a main driving screw rod, an auxiliary driving screw rod, a driving motor, a synchronous rotating assembly and two moving connecting pieces; the two moving connecting pieces are adapted for being connected with both sides of the wok; a first end of the main driving screw rod is connected with one of the two moving connecting pieces, and a first end of the auxiliary driving screw rod is connected with an other one of the two moving connecting pieces; a second end of the main driving screw rod is connected with a second end of the auxiliary driving screw rod through the synchronous rotating assembly; the driving motor is adapted for driving the main driving screw rod to rotate; the main driving screw rod and the auxiliary driving screw rod are maintained parallel to each other.

4. The full-closed cooking system according to claim 1, wherein the cooking fume treatment device further comprises a first filtering box provided with a fume inlet and a fume outlet, and at least one cooking fume filter layer is arranged between the fume inlet and the fume outlet; the outlet of the cooking fume channel is communicated with the cooking fume outlet through the first filtering box, the outlet of the cooking fume channel is communicated with the fume inlet of the first filtering box, and the fume outlet of the first filtering box is communicated with the cooking fume outlet.

5. The full-closed cooking system according to claim 4, wherein the box body is provided with a water adding opening formed in a top portion thereof and a water draining opening formed in a bottom portion thereof; water is added into the box body from the water adding opening to spray the cooking fume filtering assembly in the cooking fume channel to cool and clean the cooking fume filtering assembly; and water which is added into the box body and sprays the cooking fume filtering assembly is discharged from the water draining opening of the box body;

wherein the cooking fume treatment device further comprises:

a draining pipe; the first filtering box is located below the box body; the fume inlet is formed in the top portion of the first filtering box, and the fume outlet is formed in the bottom portion of the first filtering box; one end of the draining pipe is connected with the top portion of the first filtering box, and an other end of the draining pipe penetrates into and protrudes relative to the bottom portion of the box body; when a water level at the bottom portion of the box body is higher than a preset height of the other end of the draining pipe, the water in the box body flows down into the first filtering box through the draining pipe, and sequentially passes through each cooking fume filter layer in the first filtering box from top to bottom to cool and/or clean each cooking fume filter layer, the water flowing into the first filtering box is discharged from the fume outlet formed in the bottom portion of the first filtering box;

a cooking fume outlet pipe; and a second filtering box; the outlet of the cooking fume channel is communicated with the fume inlet of the first filtering box via the second filtering box, an inlet of the second filtering box is communicated with the outlet of the cooking fume channel via the fan, and an outlet of the second filtering box is communicated with the cooking fume inlet of the first filtering box via the cooking fume outlet pipe; and at least one cooking fume filtering layer is arranged in the second filtering box.

6. The full-closed cooking system according to claim 3, wherein the synchronous rotating assembly comprises a first synchronous wheel, a second synchronous wheel and a first synchronous belt; the first synchronous wheel is arranged on the main driving screw rod; the second synchronous wheel is arranged on the auxiliary driving screw rod; the first synchronous belt is connected with the first synchronous wheel and the second synchronous wheel, so that the first synchronous wheel drives the second synchronous wheel to rotate when rotating.

7. The full-closed cooking system according to claim 6, wherein the synchronous rotating assembly further comprises a third synchronous wheel, a fourth synchronous wheel and a second synchronous belt; a driving terminal of the driving motor is connected with the third synchronous wheel; the fourth synchronous wheel is arranged on the main driving screw rod; the second synchronous belt is connected with the third synchronous wheel and the fourth synchronous wheel, so that the third synchronous wheel drives the fourth synchronous wheel to rotate when rotating;

the wok moving control device further comprises two linear sliding rails fixed inside the cooking machine and parallel to each other; the two moving connecting pieces are movably arranged on the two linear sliding rails in a one-to-one correspondence mode.

* * * * *